United States Patent
Musha et al.

(10) Patent No.: US 11,495,248 B2
(45) Date of Patent: Nov. 8, 2022

(54) SIGNAL PROCESSING DEVICE, MAGNETIC TAPE CARTRIDGE, MAGNETIC TAPE READING APPARATUS, PROCESSING METHOD OF SIGNAL PROCESSING DEVICE, OPERATION METHOD OF MAGNETIC TAPE READING APPARATUS, AND NON-TRANSITORY COMPUTER-READABLE STORAGE MEDIUM

(71) Applicant: FUJIFILM Corporation, Tokyo (JP)

(72) Inventors: Atsushi Musha, Kanagawa (JP);
Yoshihiro Okamoto, Ehime (JP);
Yasuaki Nakamura, Ehime (JP);
Madoka Nishikawa, Ehime (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/353,820

(22) Filed: Jun. 22, 2021

(65) Prior Publication Data
US 2021/0398554 A1   Dec. 23, 2021

(30) Foreign Application Priority Data

Jun. 23, 2020 (JP) .............................. JP2020-108001
May 25, 2021 (JP) .............................. JP2021-087910

(51) Int. Cl.
*G11B 20/10* (2006.01)
*G11B 5/008* (2006.01)
(Continued)

(52) U.S. Cl.
CPC .......... *G11B 5/00821* (2013.01); *G06N 3/08* (2013.01); *G11B 5/4893* (2013.01)

(58) Field of Classification Search
None
See application file for complete search history.

(56) References Cited

U.S. PATENT DOCUMENTS 5,699,487 A * 12/1997 Richardson .............. G11B 5/09
706/20
5,808,988 A * 9/1998 Maeda .................... G11B 7/005
369/275.3

(Continued)

FOREIGN PATENT DOCUMENTS

JP   H04121803   4/1992
JP   H0567374    3/1993
(Continued)

*Primary Examiner* — Peter Vincent Agustin
(74) *Attorney, Agent, or Firm* — JCIPRNET

(57) ABSTRACT

A signal processing device includes a receiver that receives a plurality of playback signal sequence obtained by digitizing a plurality of reading results by a plurality of A/D converter, the plurality of reading results being obtained by reading data by a plurality of reading elements from a magnetic tape and a plurality of equalizers that perform waveform equalization of the plurality of playback signal sequence. The plurality of equalizers perform the waveform equalization by using a plurality of non-linear filters that have been learned to reduce distortion that occurs non-linearly in the plurality of playback signal sequence according to a condition under an environment in which the data is read from the magnetic tape. The plurality of non-linear filters being optimized to a suitable characteristic for the plurality of reading elements by optimization based on the plurality of reading results.

34 Claims, 31 Drawing Sheets

(51) Int. Cl.
*G06N 3/08* (2006.01)
*G11B 5/48* (2006.01)

(56) References Cited

U.S. PATENT DOCUMENTS

| | | | | |
|---|---|---|---|---|
| 6,201,839 | B1* | 3/2001 | Kavcic | H03M 13/3961 |
| | | | | 375/341 |
| 6,707,772 | B1* | 3/2004 | Marrec | G11B 7/0901 |
| | | | | 369/44.34 |
| 6,915,080 | B2* | 7/2005 | Heminger | B81B 3/0062 |
| | | | | 398/121 |
| 10,496,559 | B1* | 12/2019 | Bellorado | G06F 1/12 |
| 11,145,331 | B1* | 10/2021 | Nangare | G11B 5/035 |
| 2001/0043788 | A1* | 11/2001 | Kim | G11B 5/00813 |
| | | | | 386/314 |
| 2002/0110067 | A1* | 8/2002 | Kondo | G11B 20/10 |
| | | | | 369/47.54 |

FOREIGN PATENT DOCUMENTS

| | | |
|---|---|---|
| JP | H1091908 | 4/1998 |
| JP | 2004009596 | 1/2004 |
| JP | 2008282477 | 11/2008 |
| JP | 2020009517 | 1/2020 |

\* cited by examiner

[TRAINING PHASE]

[TRAINING PHASE]

[TRAINING PHASE]

[TRAINING PHASE]

[OPERATION PHASE]

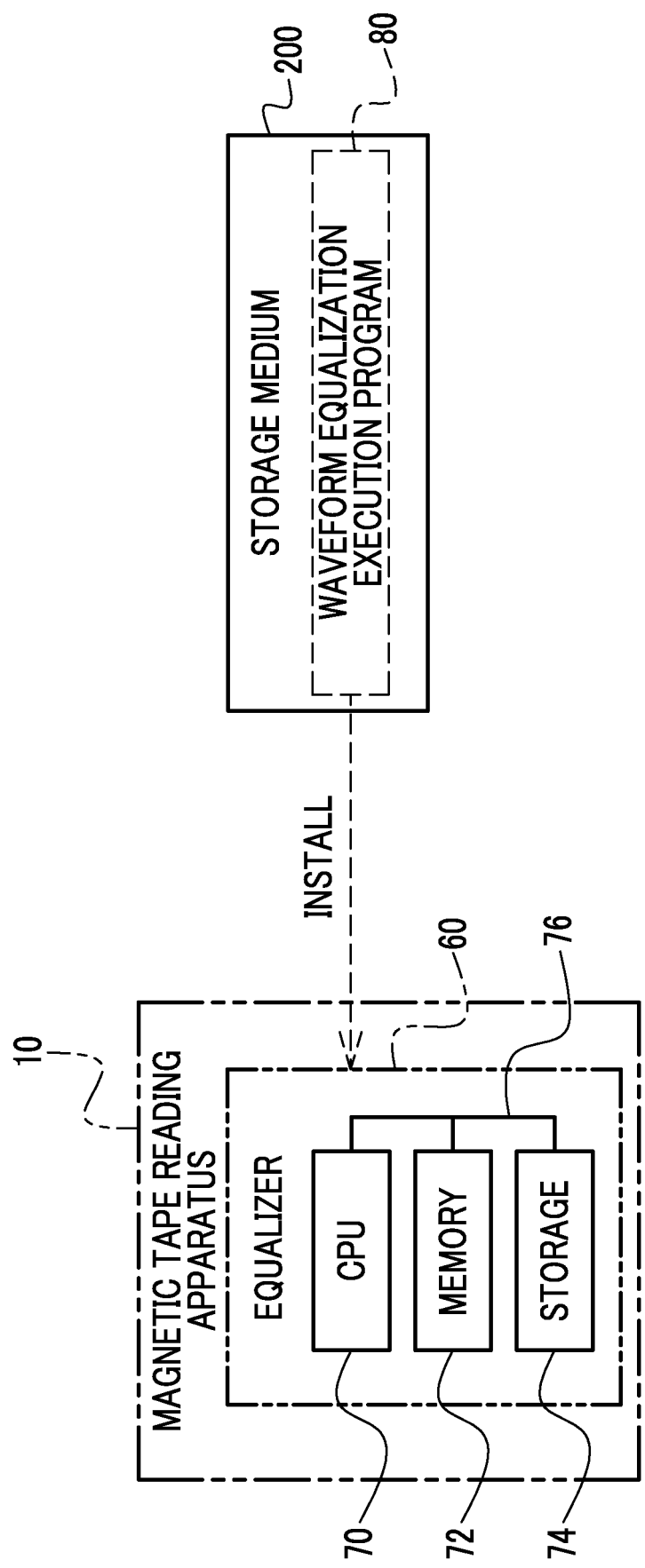

SIGNAL PROCESSING DEVICE, MAGNETIC TAPE CARTRIDGE, MAGNETIC TAPE READING APPARATUS, PROCESSING METHOD OF SIGNAL PROCESSING DEVICE, OPERATION METHOD OF MAGNETIC TAPE READING APPARATUS, AND NON-TRANSITORY COMPUTER-READABLE STORAGE MEDIUM

CROSS-REFERENCE TO RELATED APPLICATIONS

This application claims priority under 35 USC 119 from Japanese Patent Application No. 2020-108001 filed on Jun. 23, 2020, and Japanese Patent Application No. 2021-087910 filed on May 25, 2021, the disclosures of which are incorporated herein by reference in their entireties.

BACKGROUND

1. Technical Field

The technology of the disclosure relates to a signal processing device, magnetic tape cartridge, a magnetic tape reading apparatus, a processing method of a signal processing device, an operation method of a magnetic tape reading apparatus, and a non-transitory computer-readable storage medium.

2. Related Art

JP2004-009596A discloses a digital signal recording/playback device comprising a write head that writes data on a recording medium, a read head that reads out data written on the recording medium, an A/D converter that digitizes an analog playback signal read out by the read head and outputs a digital playback signal, and a signal equalization circuit that receives the digital playback signal. The digital signal recording/playback device described in JP2004-009596A reduces the influence of crosstalk that occurs in a case where the writing operation of the write head occurs at the same time as the readout operation of the read head by the signal equalization circuit performing non-linear equalization.

In the signal recording/playback device described in JP2004-009596A, the signal equalization circuit has a first input layer, a second input layer, an middle layer, and an output layer. The first input layer has a plurality of units that receive the digital playback signal, delay the playback signal by a predetermined time by a plurality of continuously connected first delay elements, and output each of the delayed digital playback signals. The second input layer has a plurality of units that receive a recording signal used in a case where the write head writes data, delay the recording signal by a predetermined time by a plurality of continuously connected second delay elements, and output each of the delayed recording signals. The middle layer consists of an n layer (n is natural number) that receives the output of each unit of the first input layer and the second input layer, converts a product sum of an n-th equalization coefficient determined by learning and the output of each unit of the input layers by a non-linear function, and outputs the converted sum. The output layer outputs a product sum of the output of each unit of the middle layer and an (n+1)-th equalization coefficient determined by learning. The first to (n+1)-th equalization coefficients are determined by learning performed so as to minimize an equalization error between the output of the output layer and a predetermined equalization target value.

JP1998-091908A (JP-H10-091908A) discloses a magnetic disk device having a head that records and plays back data on a disk which is a recording medium and a data recording/playback processing unit that performs processing of a recording/playback signal on the head.

In the magnetic disk device described in JP1998-091908A (JP-H10-091908A), the data recording/playback processing unit includes a storage unit that stores recording guarantee information for each predetermined data recording unit corresponding to a physical position on the disk and a recording compensation processing unit that reads out recording compensation information corresponding to a data recording region in the data recording unit which is an access target from the storage unit at the time of data recording operation and executes recording compensation processing for each data recording unit for the data recording region.

A multi-track reading circuit disclosed in JP1992-121803A (JP-H4-121803A) includes a plurality of adaptive equalizers that correspond to multiple tracks and equalize signals read from a storage medium using a head so as to match characteristics of a recording/playback system. The multi-track reading circuit also includes an input signal switching unit that is provided on the input side of the plurality of adaptive equalizers, and that corresponds each of the signals read with the head to the respective adaptive equalizer and connects the signals thereto. The input signal switching unit also includes functionality to change the correspondence relationships therebetween.

The multi-track reading circuit described in JP1992-121803A (JP-H4-121803A) includes a periodicity determination unit that performs adaptive learning to determine whether or not there is a periodicity in the signals input to the adaptive equalizers, and in cases in which there is a periodicity, that outputs a signal to interrupt the adaptive learning.

A data playback device disclosed in JP1993-067374A (JP-H5-067374A) reads recorded information that has been recorded on a magnetic recording medium, and reproduces input signal information while adjusting characteristics of a system using an adaptive equalization operation according to characteristics of the read input signal information. A control method for the adaptive equalizers is disclosed in which adaptive equalization is performed according to the results of adaptive learning. In this method a playback input signal of a specific region on the recording medium or a characteristic of a specific pattern region is extracted, and adaptive learning is performed for an adaptive waveform equalizer using a difference signal between an equalization output signal of the playback input signal of the specific region or of the specific pattern region, and an expected value signal of the specific region or of the specific pattern region.

A magnetic tape device disclosed in JP2020-009517A includes a magnetic tape, a reading element unit, and an extraction section. The magnetic tape includes a magnetic layer containing a ferromagnetic powder and a binding agent on a non-magnetic support. The magnetic layer has a servo pattern, and the ferromagnetic powder is a hexagonal ferrite powder. An Int(110)/Int(114) intensity ratio is from 0.5 to 4.0 for a ratio of a peak intensity Int(110) of a diffraction peak of a (110) face with respect to a peak intensity Int(114) of a diffraction peak of a (114) face in the hexagonal ferrite crystal structure, as derived by X-ray diffraction analysis of the magnetic layer using an in-plane method. A squareness ratio in a direction perpendicular to the magnetic tape is from 0.65 to 1.00. The reading element unit includes a plurality of reading elements that respectively read data using a linear scan method from a specific track region including the track to be read among track regions included in the magnetic tape. The extraction section performs waveform equalization processing according to a positional deviation amount between the magnetic tape and the reading element unit on respective read results from each of the reading elements, and from the results thereof extracts data in the track to be read. The deviation amount is determined according to a result obtained by reading the servo pattern in the magnetic layer of the magnetic tape using a servo element.

A data playback device disclosed in JP2008-282477A reads Nw recording tracks on a recording medium using Nr playback heads (Nw≤Nr), and separates and extracts the respective data in each of the Nw recording tracks. The data playback device includes a signal amplifier section, a quantification section, an equalization section, a synchronization section, a detection section, a gain control section, and an adaptive equalization control section. The signal amplifier section amplifies respective amplitudes of the Nr playback signals read from the Nr playback heads. The quantification section quantifies the Nr amplified playback signals. The equalization section uses a filter for equalization in a fixed state of frequency response of the Nr quantified playback signals, and outputs the Nw output signals. The synchronization section performs peak synchronization on the Nw equalized output signals. The detection section detects each of the Nw output signals that are peak synchronized. The gain control section controls the respective amplitudes of the playback signals read from the Nr playback heads based on the detection results of the detection section. The adaptive equalization control section computes respective filter coefficients of the filter based on the output signals that are peak synchronized and on the detection results of the detection section.

SUMMARY

However, the technology applied to the digital signal recording/playback device described in JP2004-009596A is to reduce the influence of crosstalk that occurs in a case where the writing operation of the write head occurs at the same time as the readout operation of the read head. Therefore, it is difficult to reduce the distortion that occurs non-linearly in the playback signal obtained by reading the magnetic tape by various magnetic tape reading apparatus under various environments.

The technology applied to the magnetic disk device described in JP1998-091908A (JP-H10-091908A) is to suppress unevenness of non-linear recording distortion. Therefore, it is also difficult to reduce the distortion that occurs non-linearly in the playback signal obtained by reading the magnetic tape by various magnetic tape reading apparatus under various environments.

One embodiment according to the technology of the disclosure provides a signal processing device, a magnetic tape cartridge, a magnetic tape reading apparatus, a processing method of a signal processing device, an operation method of a magnetic tape reading apparatus, and a non-transitory computer-readable storage medium capable of reducing distortion that occurs non-linearly in a plurality of playback signal sequence, as compared with a case where waveform equalization of a plurality of playback signal sequence is performed by using a linear filter.

A first aspect according to the technology of the disclosure is a signal processing device comprising a receiver that receives a plurality of playback signal sequence obtained by digitizing a plurality of reading results by a plurality of A/D converters, the plurality of reading results being obtained by reading data with a plurality of reading elements installed in a reading head from a magnetic tape on which the data is recorded, and a plurality of equalizers that perform waveform equalization of the plurality of playback signal sequence received by the receiver. The plurality of equalizers perform the waveform equalization by using a plurality of non-linear filters that have been learned to reduce distortion that occurs non-linearly in the plurality of playback signal sequence according to a condition under an environment in which the data is read from the magnetic tape. The plurality of non-linear filters are optimized to a suitable characteristic for the plurality of reading elements by optimization based on the plurality of reading results.

A second aspect according to the technology of the disclosure is the signal processing device according to the first aspect, in which the plurality of reading results are obtained by reading a specific pattern recorded as the data in a specific region of the magnetic tape by reading with the plurality of reading elements.

A third aspect according to the technology of the disclosure is the signal processing device according to the second aspect, in which the specific pattern is read by the plurality of data reading elements in parallel to an action of the specific pattern being recorded in the specific region by a plurality of recording elements arranged upstream of the plurality of reading elements in a forward direction of the magnetic tape.

A fourth aspect according to the technology of the disclosure is the signal processing device according to any one of the first to third aspects, in which the condition includes a condition caused by an individual difference in the reading head.

A fifth aspect according to the technology of the disclosure is the signal processing device according to any one of the first to fourth aspects, in which the condition includes a condition caused by an individual difference in the magnetic tape.

A sixth aspect of the technology of the disclosure is the signal processing device according to any one of the first to fifth aspects, in which the condition includes a speed condition regarding a speed at which the magnetic tape runs.

A seventh aspect of the technology of the disclosure is the signal processing device according to the sixth aspect, in which the speed condition includes a condition regarding a running speed of the magnetic tape for a case in which recording is performed on the magnetic tape An eighth aspect according to the technology of the disclosure is the signal processing device according to any one of the first to seventh aspects, in which the condition includes a condition caused by an individual difference in a processing circuit that affects the waveform equalization.

A ninth aspect according to the technology of the disclosure is the signal processing device according to any one of the first to eighth aspects, in which the non-linear filter is a filter having a neural network on which the learning has been performed.

A tenth aspect according to the technology of the disclosure is the signal processing device according to the ninth aspect comprising a plurality of storage elements that are each respectively provided for each of the reading elements and in which the playback signal sequence is stored in time-series. The neural network has a front-stage layer having a plurality of front-stage layer nodes corresponding to the plurality of storage elements and a back-stage layer. Each of the plurality of storage elements outputs the input playback signal sequence to a corresponding front-stage layer node among the plurality of front-stage layer nodes. Each of the plurality of front-stage layer nodes outputs the playback signal sequence input from a corresponding storage element among the plurality of storage elements to the back-stage layer. The back-stage layer converts a composite value obtained based on a product sum of the playback signal sequence input from the plurality of front-stage layer nodes and a back-stage layer coupling weight by an activation function, and outputs a back-stage layer value based on the converted value obtained by converting the composite value with the activation function. The back-stage layer coupling weight is determined by learning performed on the neural network to minimize a deviation amount between the back-stage layer value and a predetermined target value as the learning.

An eleventh aspect according to the technology of the disclosure is the signal processing device according to the tenth aspect, in which the neural network has an input layer as the front-stage layer and has an middle layer and an output layer as the back-stage layer, the plurality of front-stage layer nodes are a plurality of input layer nodes, the middle layer has a plurality of middle layer nodes, each of the plurality of input layer nodes outputs the playback signal sequence input from a corresponding storage element among the plurality of storage elements to the middle layer, the plurality of middle layer nodes convert an middle layer value obtained as the composite value based on a product sum of the playback signal sequence input from the plurality of input layer nodes and an middle layer coupling weight by the activation function to generate the converted value and output the converted value to the output layer, the output layer outputs an output layer value obtained as the back-stage layer value based on a product sum of the converted value input from the middle layer and an output layer coupling weight, and the middle layer coupling weight and the output layer coupling weight are determined by learning performed on the neural network to minimize a deviation amount between the output layer value and a predetermined target value as the learning.

A twelfth aspect according to the technology of the disclosure is the signal processing device according to the eleventh aspect, in which the middle layer value is a value based on the product sum of the playback signal sequence and the middle layer coupling weight and a first variable and the first variable is determined by the learning performed on the neural network.

A thirteenth aspect according to the technology of the disclosure is the signal processing device according to the tenth aspect, in which the neural network consists of two layers, the front-stage layer and the back-stage layer.

A fourteenth aspect according to the technology of the disclosure is the signal processing device according to any one of the tenth to thirteenth aspects, in which the back-stage layer value is a value based on a product sum of the converted value and the back-stage layer coupling weight and a second variable and the second variable is determined by the learning performed on the neural network.

A fifteenth aspect according to the technology of the disclosure is the signal processing device according to any one of the tenth to fourteenth aspects, in which the plurality of storage elements are a plurality of delay elements in which the playback signal sequence is input with a delay of a predetermined time and the back-stage layer value is a value regarding the playback signal sequence input first among the plurality of playback signal sequence stored in the plurality of delay elements.

A sixteenth aspect according to the technology of the disclosure is the signal processing device according to any one of the tenth to fifteenth aspects, in which the target value is teaching data set in advance based on at least one of an ideal playback signal sequence regarding known data recorded on a learning magnetic tape in a recording pattern set in advance along a longitudinal direction of the learning magnetic tape or an ideal playback signal sequence derived by computer simulation.

A seventeenth aspect according to the technology of the disclosure is a magnetic tape cartridge comprising a magnetic tape, in which the magnetic tape is recorded with a parameter related to the plurality of non-linear filters employed by the signal processing device of any one of the first to sixteenth aspects.

An eighteenth aspect according to the technology of the disclosure is a magnetic tape cartridge comprising a non-contact storage medium, in which the non-contact storage medium is stored with a parameter related to the plurality of non-linear filters employed by the signal processing device of any one of the first to sixteenth aspects.

A nineteenth aspect according to the technology of the disclosure is a magnetic tape reading apparatus comprising a reading head that is installed with a plurality of reading elements that read data from a magnetic tape on which the data is recorded, a receiver that receives a plurality of playback signal sequence obtained by digitizing a plurality of reading results by a plurality of A/D converters, the plurality of reading results being obtained by reading the data by the plurality of reading elements, and a plurality of equalizers that perform waveform equalization of the plurality of playback signal sequence received by the receiver. The plurality of equalizers perform the waveform equalization by using a plurality of non-linear filters that have been learned to reduce distortion that occurs non-linearly in the plurality of playback signal sequence according to a condition under an environment in which the data is read from the magnetic tape. The plurality of non-linear filters being optimized to a suitable characteristic for the plurality of reading elements based on the plurality of reading results.

A twentieth aspect according to the technology of the disclosure is the magnetic tape reading apparatus according to the nineteenth aspect, in which the plurality of reading results are obtained by reading a specific pattern recorded as the data in a specific region of the magnetic tape by reading with the plurality of reading elements.

A twenty-first aspect according to the technology of the disclosure is the magnetic tape reading apparatus according to the twentieth aspect, in which the specific pattern is read by the plurality of data reading elements in parallel to an action of the specific pattern being recorded in the specific region by a plurality of recording elements arranged upstream of the plurality of reading elements in a forward direction of the magnetic tape.

A twenty-second aspect according to the technology of the disclosure is the magnetic tape reading apparatus according to any one of the nineteenth to twenty-first aspects, in which the condition includes a condition caused by an individual difference in the reading head.

A twenty-third aspect according to the technology of the disclosure is the magnetic tape reading apparatus according to any one of the nineteenth to twenty-second aspects, in which the condition includes a condition caused by an individual difference in the magnetic tape.

A twenty-fourth aspect according to the technology of the disclosure is the magnetic tape reading apparatus according to any one of the nineteenth to twenty-third aspects, in which the condition includes a speed condition regarding a speed at which the magnetic tape runs.

A twenty-fifth aspect according to the technology of the disclosure is the magnetic tape reading apparatus according to the twenty-fourth aspect, in which the speed condition includes a condition regarding a running speed of the magnetic tape for a case in which recording is performed on the magnetic tape.

A twenty-sixth aspect according to the technology of the disclosure is the magnetic tape reading apparatus according to any one of the nineteenth to twenty-fifth aspects, in which the condition includes a condition caused by an individual difference in a processing circuit that affects the waveform equalization.

A twenty-seventh aspect according to the technology of the disclosure is the magnetic tape reading apparatus according to any one of the nineteenth to twenty-sixth aspects, in which the non-linear filter is a filter having a neural network on which the learning has been performed.

A twenty-eighth aspect according to the technology of the disclosure is the magnetic tape reading apparatus according to the twenty-seventh aspect comprising a plurality of storage elements that are provided to each of the reading elements and in which the playback signal sequence is stored in time-series, in which the neural network has a front-stage layer having a plurality of front-stage layer nodes corresponding to the plurality of storage elements and a back-stage layer, each of the plurality of storage elements outputs the input playback signal sequence to a corresponding front-stage layer node among the plurality of front-stage layer nodes, each of the plurality of front-stage layer nodes outputs the playback signal sequence input from a corresponding storage element among the plurality of storage elements to the back-stage layer, the back-stage layer converts a composite value obtained based on a product sum of the playback signal sequence input from the plurality of front-stage layer nodes and a back-stage layer coupling weight by an activation function and outputs a back-stage layer value based on the converted value obtained by converting the composite value with the activation function, and the back-stage layer coupling weight is determined by learning performed on the neural network to minimize a deviation amount between the back-stage layer value and a predetermined target value as the learning.

A twenty-ninth aspect of the technology of the disclosure is the magnetic tape reading apparatus according to the twenty-eighth aspect, in which the neural network has an input layer as the front-stage layer and has an middle layer and an output layer as the back-stage layer, the plurality of front-stage layer nodes are a plurality of input layer nodes, the middle layer has a plurality of middle layer nodes, each of the plurality of input layer nodes outputs the playback signal sequence input from a corresponding storage element among the plurality of storage elements to the middle layer, the plurality of middle layer nodes convert an middle layer value obtained as the composite value based on a product sum of the playback signal sequence input from the plurality of input layer nodes and an middle layer coupling weight by the activation function to generate the converted value and output the converted value to the output layer, the output layer outputs an output layer value obtained as the back-stage layer value based on a product sum of the converted value input from the middle layer and an output layer coupling weight, and the middle layer coupling weight and the output layer coupling weight are determined by learning performed on the neural network to minimize a deviation amount between the output layer value and a predetermined target value as the learning.

A thirtieth aspect according to the technology of the disclosure is the magnetic tape reading apparatus according to the twenty-ninth aspect, in which the middle layer value is a value based on the product sum of the playback signal sequence and the middle layer coupling weight and a first variable and the first variable is determined by the learning performed on the neural network.

A thirty-first aspect according to the technology of the disclosure is the magnetic tape reading apparatus according to the twenty-eighth aspect, in which the neural network consists of two layers, the front-stage layer and the back-stage layer.

A thirty-second aspect of the technology of the disclosure is the magnetic tape reading apparatus according to any one of the twenty-eighth to thirty-first aspects, in which the back-stage layer value is a value based on a product sum of the converted value and the back-stage layer coupling weight and a second variable and the second variable is determined by the learning performed on the neural network.

A thirty-third aspect according to the technology of the disclosure is the magnetic tape reading apparatus according to any one of the twenty-eighth to thirty-second aspects, in which the plurality of storage elements are a plurality of delay elements in which the playback signal sequence is input with a delay of a predetermined time and the back-stage layer value is a value regarding the playback signal sequence input first among the plurality of playback signal sequence stored in the plurality of delay elements.

A thirty-fourth aspect of the technology of the disclosure is the magnetic tape reading apparatus according to any one of the twenty-eighth to thirty-third aspects, in which the target value is teaching data set in advance based on at least one of an ideal playback signal sequence regarding known data recorded on a learning magnetic tape in a recording pattern set in advance along a longitudinal direction of the learning magnetic tape or an ideal playback signal sequence derived by computer simulation.

A thirty-fifth aspect according to the technology of the disclosure is a processing method of a signal processing device including a receiver that receives a plurality of playback signal sequence obtained by digitizing a plurality of reading results by a plurality of A/D converters, the plurality of reading results being obtained by reading data by a plurality of reading elements installed to a reading head from a magnetic tape on which the data is recorded and a plurality of equalizers that perform waveform equalization of the plurality of playback signal sequence received by the receiver. The processing method comprises performing the waveform equalization by using a plurality of non-linear filters that have been learned to reduce distortion that occurs non-linearly in the plurality of playback signal sequence according to a condition under an environment in which the data is read out from the magnetic tape, by the plurality of equalizers, the plurality of non-linear filters being optimized to a suitable characteristic for the plurality of reading elements based on the plurality of reading results.

A thirty-sixth aspect according to the technology of the disclosure is an operation method of a magnetic tape reading apparatus including a reading head installed with a plurality of reading elements that read data from a magnetic tape on which the data is recorded, a receiver that receives a plurality of playback signal sequence obtained by digitizing a plurality of reading results by a plurality of A/D converters, the plurality of reading results being obtained by reading the data by the plurality of reading elements, and a plurality of equalizers that perform waveform equalization of the plurality of playback signal sequence received by the receiver. The method comprises performing the waveform equalization by using a plurality of non-linear filters that have been learned to reduce distortion that occurs non-linearly in the plurality of playback signal sequence according to a condition under an environment in which the data is read out from the magnetic tape, by the plurality of equalizers, the plurality of non-linear filters being optimized to a suitable characteristic for the plurality of reading elements based on the plurality of reading results.

A thirty-seventh aspect according to the technology of the disclosure is a program causing a computer, which is applied to a signal processing device, to execute processing. The signal processing device includes a receiver that receives a plurality of playback signal sequence obtained by digitizing a plurality of reading results by a plurality of A/D converters, the plurality of reading results being obtained by reading data by a plurality of reading elements installed to a reading head from a magnetic tape on which the data is recorded, and includes a plurality of equalizers that perform waveform equalization of the plurality of playback signal sequence received by the receiver. The processing including performing the waveform equalization by using a plurality of non-linear filters that have been learned to reduce distortion that occurs non-linearly in the plurality of playback signal sequence according to a condition under an environment in which the data is read out from the magnetic tape. The plurality of non-linear filters are optimized to a suitable characteristic for the plurality of reading elements based on the plurality of reading results.

A thirty-eighth aspect according to the technology of the disclosure is a program causing a computer, which is applied to a magnetic tape reading apparatus, to execute processing. The magnetic tape reading apparatus includes a reading head installed with a plurality of reading elements that read data from a magnetic tape on which the data is recorded, a receiver that receives a plurality of playback signal sequence obtained by digitizing a plurality of reading results by a plurality of A/D converters, the plurality of reading results being obtained by reading the data by the plurality of reading elements, and a plurality of equalizers that perform waveform equalization of the plurality of playback signal sequence received by the receiver. The processing including performing the waveform equalization by using a plurality of non-linear filters that have been learned to reduce distortion that occurs non-linearly in the plurality of playback signal sequence according to a condition under an environment in which the data is read out from the magnetic tape. The plurality of non-linear filters being optimized to a suitable characteristic for the plurality of reading elements based on the plurality of reading results.

According to the embodiment of the technology of the disclosure, it is possible to obtain the effect that the distortion that occurs non-linearly in the plurality of playback signal sequence can be reduced as compared with a case where the waveform equalization of the plurality of playback signal sequence is performed by using a linear filter.

BRIEF DESCRIPTION OF THE DRAWINGS

Exemplary embodiments of the technology of the disclosure will be described in detail based on the following figures, wherein:

FIG. 31 is a block diagram showing an example of a mode in which a waveform equalization execution program is installed in an equalizer in the magnetic tape drive from a storage medium in which the waveform equalization execution program is stored.

DETAILED DESCRIPTION

Hereinafter, an example of an embodiment of a signal processing device, a magnetic tape cartridge, a magnetic tape reading apparatus, a processing method of a signal processing device, an operation method of a magnetic tape reading apparatus, and a non-transitory computer-readable storage medium according to the technology of the disclosure will be described with reference to accompanying drawings.

First, terms used in the following description will be described.

A CPU indicates an abbreviation of "central processing unit". A RAM indicates an abbreviation of "random access memory". An HDD indicates an abbreviation of "hard disk drive". An EEPROM indicates an abbreviation of "electrically erasable and programmable read only memory". An SSD indicates an abbreviation of "solid state drive". A USB indicates an abbreviation of "universal serial bus". An ASIC indicates an abbreviation of "application specific integrated circuit". An FPGA indicates an abbreviation of "field-programmable gate array". A PLD indicates an abbreviation of "programmable logic device". An SoC indicates an abbreviation of "system-on-a-chip". A UI indicates an abbreviation of "user interface". An I/F indicates an abbreviation of "interface". An A/D indicates an abbreviation of "analog/digital". An FIR indicates an abbreviation of "finite impulse response". An IIR indicates an abbreviation of "infinite impulse response". An LPF indicates an abbreviation of "low pass filter". A FIFO indicates an abbreviation of "first in first out". An SNR indicates an abbreviation of "signal-to-noise ratio". BOT indicates an abbreviation of "beginning of tape". EOT indicates an abbreviation of "end of tape". MSE indicates an abbreviation of "mean square error". Moreover, a range represented by using "~" in the following description means a range including elements described before and after "~" as a lower limit and an upper limit.

First Embodiment

Figure 1:
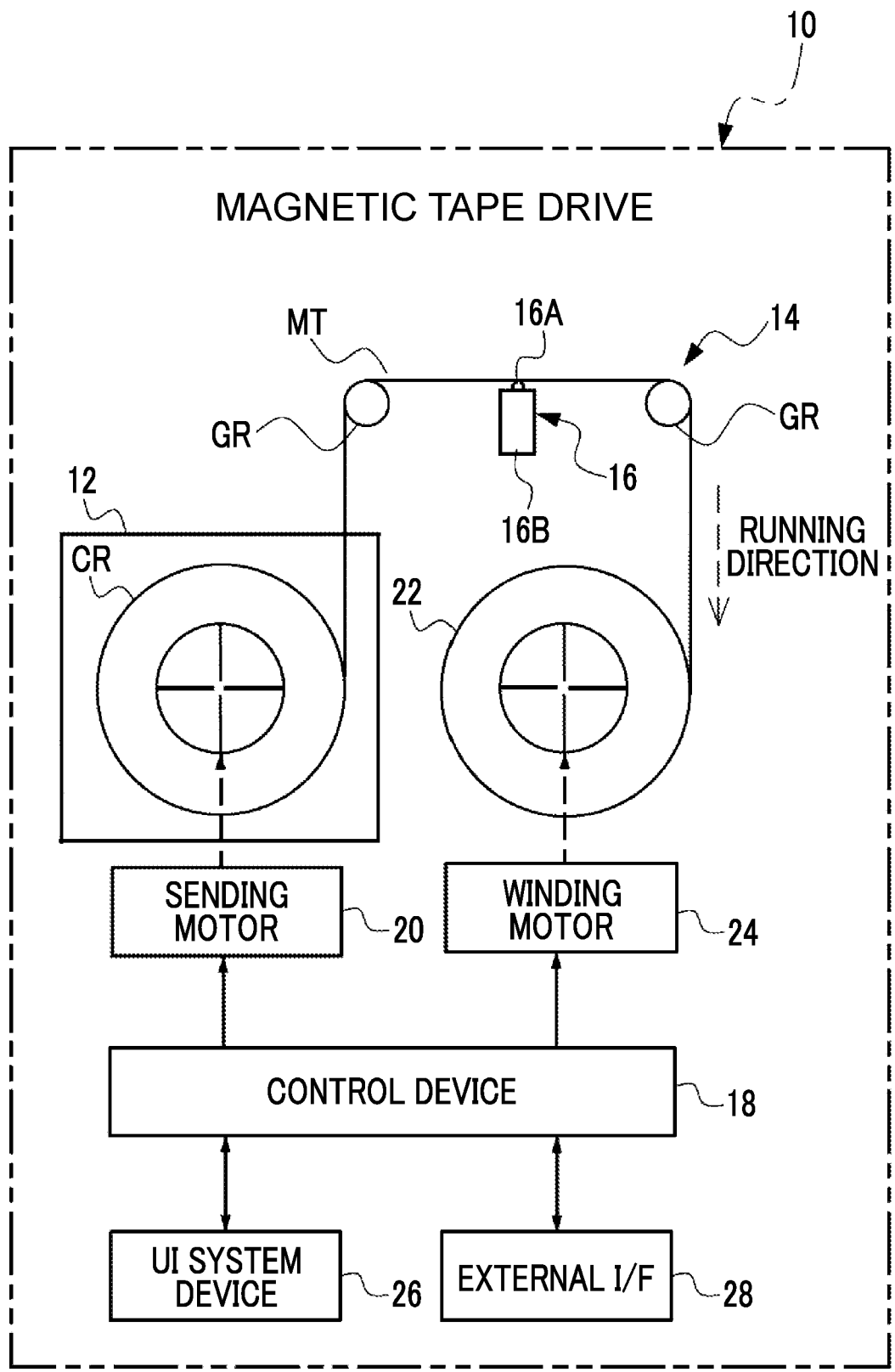
FIG. 1 is a schematic configuration diagram showing an example of overall configuration of a magnetic tape drive according to a first embodiment.

As shown in FIG. 1 as an example, a magnetic tape drive 10 serving as an example of a "magnetic tape reading apparatus" according to the technology of the disclosure comprises a magnetic tape cartridge 12, a transportation device 14, a reading head 16, a control device 18, a sending motor 20, a winding reel 22, a winding motor 24, a UI system device 26, and an external I/F 28. The magnetic tape cartridge 12 contains a magnetic tape MT. Data is recorded on the magnetic tape MT. The magnetic tape drive 10 is an apparatus that extracts the magnetic tape MT from the magnetic tape cartridge 12 and reads data from the extracted magnetic tape MT with a linear scan method using the reading head 16.

In the present first embodiment, the reading of data indicates the playback of data, in other words. In the following description, the data read by the reading head 16 is also referred to as a "playback signal". In a case where it is not necessary to distinguish between a test playback signal described below, a neural network signal described below, and a waveform equalized playback signal described below, the signals are also simply referred to as "playback signals".

The magnetic tape MT is generally manufactured by forming a magnetic layer including a ferromagnetic powder and any one or more kinds of additives on a non-magnetic support. Non alignment, longitudinal alignment, and vertical alignment can be applied to the magnetic layer. The magnetic layer and the like will be described in detail.

Magnetic Layer

Ferromagnetic Powder

The magnetic layer includes the ferromagnetic powder. One kind or a combination of two or more kinds of well-known ferromagnetic powders, as the ferromagnetic powder used in the magnetic layer of various magnetic tapes MT, can be used as the ferromagnetic powder included in the magnetic layer. It is preferable to use a ferromagnetic powder having a small average particle size, from a viewpoint of improvement in recording density. From this viewpoint, an average particle size of the ferromagnetic powder is preferably equal to or smaller than 50 nm, more preferably equal to or smaller than 45 nm, even more preferably equal to or smaller than 40 nm, still preferably equal to or smaller than 35 nm, still more preferably equal to or smaller than 30 nm, still even more preferably equal to or smaller than 25 nm, and still further more preferably equal to or smaller than 20 nm. On the other hand, the average particle size of the ferromagnetic powder is preferably equal to or greater than 5 nm, more preferably equal to or greater than 8 nm, even more preferably equal to or greater than 10 nm, still preferably equal to or greater than 15 nm, still more preferably equal to or greater than 20 nm, from a viewpoint of stability of magnetization.

Hexagonal Ferrite Powder

An example of a preferred specific example of the ferromagnetic powder includes a hexagonal ferrite powder. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the technology of the disclosure and the specification, the term "hexagonal ferrite powder" is a ferromagnetic powder in which a hexagonal ferrite type crystal structure is detected as a main phase by X-ray diffraction analysis. The main phase is a structure to which a diffraction peak of the highest intensity in the X-ray diffraction spectrum obtained by the X-ray diffraction analysis is belonged. For example, in a case where the diffraction peak of the highest intensity in the X-ray diffraction spectrum obtained by the X-ray diffraction analysis is belonged to the hexagonal ferrite type crystal structure, it is determined that the hexagonal ferrite type crystal structure is detected as the main phase. In a case where only a single structure is detected by the X-ray diffraction analysis, this detected structure is the main phase. The hexagonal ferrite type crystal structure includes at least an iron atom, a divalent metal atom, or an oxygen atom, as a constituent atom. The divalent metal atom is a metal atom that can be divalent cations as ions, and examples thereof include an alkali earth metal atom such as a strontium atom, a barium atom, or a calcium atom, and a lead atom. In the technology of the disclosure and the specification, a hexagonal strontium ferrite powder is a powder in which a main divalent metal atom included in this powder is a strontium atom, and a hexagonal barium ferrite powder is a powder in which the main divalent metal atom included in this powder is a barium atom. The main divalent metal atom is a divalent metal atom occupying the greatest content in the divalent metal atom included in the powder based on atom %. Here, a rare earth atom is not included in the divalent metal atom. The "rare earth atom" of the invention and the specification is selected from a group consisting of a scandium atom (Sc), an yttrium atom (Y), and a lanthanoid atom. The lanthanoid atom is selected from a group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder according to one aspect of the hexagonal ferrite powder will be described more specifically.

An activation volume of the hexagonal strontium ferrite powder is preferably in a range of 800 to 1500 $nm^3$. The particulate hexagonal strontium ferrite powder having the activation volume in the range described above is suitable for manufacturing the magnetic tape MT exhibiting excellent electromagnetic conversion characteristics. The activation volume of the hexagonal strontium ferrite powder is preferably equal to or greater than 800 $nm^3$ and can be, for example, equal to or greater than 850 $nm^3$. From a viewpoint of further improving the electromagnetic conversion characteristics, the activation volume of the hexagonal strontium ferrite powder is more preferably equal to or smaller than 1400 $nm^3$, even more preferably equal to or smaller than 1300 $nm^3$, still preferably equal to or smaller than 1200 $nm^3$, and still more preferably equal to or smaller than 1100 $nm^3$.

The term "activation volume" is a unit of magnetization reversal and an index indicating magnetic magnitude of a particle. The activation volume disclosed in the technology of the disclosure and the specification and an anisotropy constant Ku described below are measured at magnetic field sweep rates of 3 minutes and 30 minutes in a coercivity Hc measurement unit of a vibrating sample magnetometer (measurement temperature: 23° C.±1° C.) and are values obtained from a relational expression of Hc and an activation volume V shown below. A unit of the anisotropy constant Ku is 1 erg/cc=$1.0\times10^{-1}$ $J/m^3$.

$$Hc = 2Ku/Ms\{1-[(kT/KuV)\ln(At/0.693)]^{1/2}\}$$

[In the expression, Ku: anisotropy constant (unit: $J/m^3$), Ms: saturation magnetization (unit: kA/m), k: Boltzmann's constant, T: absolute temperature (unit: K), V: activation volume (unit: $cm^3$), A: spin precession frequency (unit: $s^{-1}$), and t: magnetic field reversal time (unit: s)]

An example of an index of the reduction of thermal fluctuation, that is, improvement in thermal stability includes the anisotropy constant Ku. The hexagonal strontium ferrite powder can preferably have Ku equal to or greater than $1.8\times10^5$ $J/m^3$ and more preferably have Ku equal to or greater than $2.0\times10^5$ $J/m^3$. In addition, Ku of the hexagonal strontium ferrite powder can be, for example, equal to or smaller than $2.5\times10^5$ $J/m^3$. However, since a higher Ku means that the thermal stability is higher, which is preferable, Ku is not limited to the exemplified value.

The hexagonal strontium ferrite powder may or may not include the rare earth atom. In a case where the hexagonal strontium ferrite powder includes the rare earth atom, a content (bulk content) of the rare earth atom is preferably 0.5 to 5.0 atom % with respect to 100 atom % of the iron atom. In one aspect, the hexagonal strontium ferrite powder including the rare earth atom can have rare earth atom surface layer portion uneven distribution. The term "rare earth atom surface layer portion uneven distribution" of the technology of the disclosure and the specification means that a content of rare earth atom with respect to 100 atom % of iron atom in a solution obtained by partially dissolving the hexagonal strontium ferrite powder with acid (hereinafter, referred to as a "rare earth atom surface layer portion content" or simply a "surface layer portion content" regarding the rare earth atom) and a content of rare earth atom with respect to 100 atom % of iron atom in a solution obtained by totally dissolving the hexagonal strontium ferrite powder with acid (hereinafter, referred to as a "rare earth atom bulk content" or simply a "bulk content" regarding the rare earth atom) satisfy a ratio of rare earth atom surface layer portion content/rare earth atom bulk content >1.0. The content of the rare earth atom of the hexagonal strontium ferrite powder described below is identical to the rare earth atom bulk content. On the contrary, since the partial dissolving using acid is to dissolve the surface layer portion of particles constituting the hexagonal strontium ferrite powder, the content of the rare earth atom in the solution obtained by the partial dissolving is the content of rare earth atom in the surface layer portion of the particles constituting the hexagonal strontium ferrite powder. The fact that the rare earth atom surface layer portion content satisfies the ratio of "rare earth atom surface layer portion content/rare earth atom bulk content >1.0" means that the rare earth atoms are unevenly distributed in the surface layer portion (that is, there are more rare earth atoms than inside) in the particles constituting the hexagonal strontium ferrite powder. The surface layer portion of the technology of the disclosure and the specification means a partial region from the surface of the particles constituting the hexagonal strontium ferrite powder toward the inside.

In a case where the hexagonal strontium ferrite powder includes the rare earth atom, the rare earth atom content (bulk content) is preferably in a range of 0.5 to 5.0 atom % with respect to 100 atom % of the iron atom. The fact that the rare earth atom having the bulk content in the range described above is included and the rare earth atoms are unevenly distributed in the surface layer portion of the particles constituting the hexagonal strontium ferrite powder is considered to contribute to suppression of the reduction in playback output during the repeated playback. It is surmised that this is because the anisotropy constant Ku can be increased due to the hexagonal strontium ferrite powder including the rare earth atom having the bulk content in the range described above and uneven distribution of the rare earth atoms in the surface layer portion of the particles constituting the hexagonal strontium ferrite powder. It is possible to suppress occurrence of a phenomenon called thermal fluctuation (that is, thermal stability can be improved) as the value of the anisotropy constant Ku is higher. With the suppression of the occurrence of thermal fluctuation, it is possible to suppress the reduction in the playback output during the repeated playback. It is surmised that the uneven distribution of the rare earth atoms in the particle surface layer portion of the hexagonal strontium ferrite powder contributes to stabilization of a spin at an iron (Fe) site in a crystal lattice of the surface layer portion, thereby increasing the anisotropy constant Ku.

It is surmised that the use of the hexagonal strontium ferrite powder having the rare earth atom surface layer portion uneven distribution as the ferromagnetic powder of the magnetic layer contributes to the suppression of chipping of the surface of the magnetic layer due to the sliding with the magnetic head. That is, it is surmised that the hexagonal strontium ferrite powder having the rare earth atom surface layer portion uneven distribution also contributes to the improvement in running durability of the magnetic tape MT. It is surmised that this is because the uneven distribution of the rare earth atom on the surface of the particles constituting the hexagonal strontium ferrite powder contributes to improvement in an interaction between the surface of the particles and an organic substance (for example, binding agent and/or additive) included in the magnetic layer, thereby improving hardness of the magnetic layer.

From a viewpoint of further suppressing the reduction in the playback output during the repeated playback and/or a viewpoint of further improving the running durability, the content of rare earth atom (bulk content) is more preferably in a range of 0.5 to 4.5 atom %, even more preferably in a range of 1.0 to 4.5 atom %, and still preferably in a range of 1.5 to 4.5 atom %.

The bulk content is a content obtained by totally dissolving the hexagonal strontium ferrite powder. In the technology of the disclosure and the specification, the content of the atom is a bulk content obtained by totally dissolving the hexagonal strontium ferrite powder, unless otherwise noted. The hexagonal strontium ferrite powder including the rare earth atom may include only one kind of rare earth atom or may include two or more kinds of rare earth atoms, as the rare earth atom. In a case where two or more kinds of the rare earth atoms are included, the bulk content is obtained from the total of the two or more kinds of the rare earth atoms. The same also applies to the other components of the technology of the disclosure and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes the rare earth atom, the rare earth atom included therein may be any one or more kinds of the rare earth atoms. Examples of the rare earth atom preferable from a viewpoint of further suppressing the reduction in the playback output during the repeated playback include a neodymium atom, a samarium atom, an yttrium atom, and a dysprosium atom, a neodymium atom, a samarium atom, an yttrium atom are more preferable, and a neodymium atom is even more preferable.

In the hexagonal strontium ferrite powder having the rare earth atom surface layer portion uneven distribution, a degree of uneven distribution of the rare earth atom is not limited, as long as the rare earth atoms are unevenly distributed in the surface layer portion of the particles constituting the hexagonal strontium ferrite powder. For example, regarding the hexagonal strontium ferrite powder having the rare earth atom surface layer portion uneven distribution, "surface layer portion content/bulk content", which is a ratio of the surface layer portion content of the rare earth atom obtained by partial dissolving performed under a dissolving condition described below and the bulk content of the rare earth atom obtained by total dissolving performed under a dissolving condition described below, is greater than 1.0 and can be equal to or greater than 1.5. The fact that the "surface layer portion content/bulk content" is greater than 1.0 means that the rare earth atoms are unevenly distributed in the surface layer portion (that is, there are more rare earth atoms than inside) in the particles constituting the hexagonal strontium ferrite powder. The "surface layer portion content/bulk content", which is the ratio of the surface layer portion content of the rare earth atom obtained by partial dissolving performed under the dissolving condition described below and the bulk content of the rare earth atom obtained by total dissolving performed under the dissolving condition described below, can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, in the hexagonal strontium ferrite powder having the rare earth atom surface layer portion uneven distribution, the "surface layer portion content/bulk content" is not limited to the exemplified upper limit or the lower limit, as long as the rare earth atoms are unevenly distributed in the surface layer portion of the particles constituting the hexagonal strontium ferrite powder.

The partial dissolving and the total dissolving of the hexagonal strontium ferrite powder will be described below. Regarding the hexagonal strontium ferrite powder present as the powder, sample powders for the partial dissolving and the total dissolving are collected from the powder of the same batch. On the other hand, regarding the hexagonal strontium ferrite powder included in the magnetic layer of the magnetic tape MT, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by a method disclosed in a paragraph 0032 of JP2015-091747A.

The partial dissolving means that the hexagonal strontium ferrite powder remains in the solution to the extent that the powder can be visually checked at the time of the completion of the dissolving. For example, with the partial dissolving, it is possible to dissolve a region of the particles constituting the hexagonal strontium ferrite powder that is 10% to 20% by mass with respect to 100% by mass of a total of the particles. On the other hand, the total dissolving means that dissolving is performed until the remaining of the hexagonal strontium ferrite powder in the solution is not visually checked at the time of the completion of the dissolving.

The partial dissolving and the measurement of the surface layer portion content are performed, for example, by the following method. However, dissolving conditions such as an amount of sample powder and the like described below are merely examples, and the dissolving conditions capable of performing the partial dissolving and the total dissolving can be randomly employed.

A vessel (for example, beaker) containing 12 mg of sample powder and 10 mL of hydrochloric acid having a concentration of 1 mol/L is held on a hot plate at a set temperature of 70° C. for one hour. The obtained solution is filtered with a membrane filter having a hole diameter of 0.1 μm. The element analysis of the solution obtained as described above is performed by an inductively coupled plasma (ICP) analysis device. As described above, it is possible to obtain the surface layer portion content of the rare earth atom with respect to 100 atom % of the iron atom. In a case where a plurality of kinds of the rare earth atoms are detected from the element analysis, a total content of all rare earth atoms is the surface layer portion content. The same applies to the measurement of the bulk content.

On the other hand, the total dissolving and the measurement of the bulk content are performed, for example, by the following method.

A vessel (for example, beaker) containing 12 mg of sample powder and 10 mL of hydrochloric acid having a concentration of 4 mol/L is held on a hot plate at a set temperature of 80° C. for three hours. After that, the process is performed in the same manner as in the partial dissolving and the measurement of the surface layer portion content, and then it is possible to obtain the bulk content with respect to 100 atom % of the iron atom.

From a viewpoint of increasing the playback output in a case of playing back the data recorded on the magnetic tape MT, it is desirable that the mass magnetization σs of the ferromagnetic powder included in the magnetic tape MT is high. In regards to this point, in the hexagonal strontium ferrite powder which includes the rare earth atom but does not have the rare earth atom surface layer portion uneven distribution, σs tends to significantly decrease as compared with that in the hexagonal strontium ferrite powder not including the rare earth atom. On the contrary, it is considered that the hexagonal strontium ferrite powder having the rare earth atom surface layer portion uneven distribution is preferable for suppressing such a significant decrease in σs. In one aspect, σs of the hexagonal strontium ferrite powder can be equal to or greater than 45 A·m$^2$/kg and can also be equal to or greater than 47 A·m$^2$/kg. On the other hand, from a viewpoint of noise reduction, σs is preferably equal to or smaller than 80 A·m$^2$/kg and more preferably equal to or smaller than 60 A·m$^2$/kg. It is possible to measure σs by using a well-known measurement device capable of measuring magnetic properties such as the vibrating sample magnetometer. In the technology of the disclosure and the specification, the mass magnetization σs is a value measured at magnetic field strength of 1194 kA/m (15 kOe), unless otherwise noted.

Regarding the content (bulk content) of the constituting atom in the hexagonal strontium ferrite powder, a content of the strontium atom can be, for example, in a range of 2.0 to 15.0 atom % with respect to 100 atom % of the iron atom. In one aspect, in the hexagonal strontium ferrite powder, the divalent metal atom included in this powder can be only the strontium atom. In another aspect, the hexagonal strontium ferrite powder can also include one or more kinds of other divalent metal atoms, in addition to the strontium atom. For example, the barium atom and/or the calcium atom can be included. In a case where the other divalent metal atoms other than the strontium atom are included, a content of the barium atom and a content of the calcium atom in the hexagonal strontium ferrite powder respectively can be, for example, in a range of 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be checked by the X-ray diffraction analysis. In the hexagonal strontium ferrite powder, a single crystal structure or two or more kinds of crystal structures can be detected by the X-ray diffraction analysis. For example, in one aspect, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents the divalent metal atom. In a case where the hexagonal strontium ferrite powder has the M type, A is only the strontium atom (Sr). Alternatively, in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of the iron atom and a content of the oxygen atom. The hexagonal strontium ferrite powder includes at least the iron atom, the strontium atom, or the oxygen atom, and can further include the rare earth atom. Further, the hexagonal strontium ferrite powder may or may not include an atom other than these atoms. An example of the hexagonal strontium ferrite powder may include an aluminum atom (Al). A content of the aluminum atom can be, for example, 0.5 to 10.0 atom % with respect to 100 atom % of the iron atom. From a viewpoint of further suppressing the reduction in the playback output during the repeated playback, the hexagonal strontium ferrite powder includes the iron atom, the strontium atom, the oxygen atom, and the rare earth atom. A content of the atom other than these atoms is preferably equal to or smaller than 10.0 atom %, more preferably in a range of 0 to 5.0 atom %, and may be 0 atom % with respect to 100 atom % of the iron atom. That is, in one aspect, the hexagonal strontium ferrite powder may not include the atom other than the iron atom, the strontium atom, the oxygen atom, and the rare earth atom. The content shown with atom % described above is obtained by converting a value of the content (unit: % by mass) of each atom obtained by totally dissolving the hexagonal strontium ferrite powder into a value shown as atom % by using the atomic weight of each atom. In the technology of the disclosure and the specification, the term "not included" for a given atom means that the content thereof obtained by performing the total dissolving and the measurement by using the ICP analysis device is 0% by mass. A detection limit of the ICP analysis device is generally equal to or smaller than 0.01 ppm (parts per million) based on mass. The term "not included" is used as a meaning including that a given atom is included with an amount smaller than the detection limit of the ICP analysis device. In one aspect, the hexagonal strontium ferrite powder does not include a bismuth atom (Bi).

Metal Powder

A preferred specific example of the ferromagnetic powder includes a ferromagnetic metal powder. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

A preferred specific example of the ferromagnetic powder includes an ε-iron oxide powder. In the technology of the disclosure and the specification, the term "ε-iron oxide powder" is a ferromagnetic powder having an ε-iron oxide type crystal structure detected as a main phase by the X-ray diffraction analysis. For example, in a case where the diffraction peak of the highest intensity in the X-ray diffraction spectrum obtained by the X-ray diffraction analysis is belonged to the ε-iron oxide type crystal structure, it is determined that the ε-iron oxide type crystal structure is detected as the main phase. As a method of producing the ε-iron oxide powder, a producing method from a goethite, a reverse micelle method, or the like is known. All of the producing methods are well known. For example, for a method of producing the ε-iron oxide powder in which a part of Fe is substituted with a substitutional atom such as Ga, Co, Ti, Al, or Rh, a description disclosed in J. Jpn. Soc. Powder Metallurgy Vol. 61 Supplement, No. 51, pp. S280-S284, J. Mater. Chem. C, 2013, 1, pp. 5200-5206 can be referred to, for example. However, the method of producing the ε-iron oxide powder that can be used as the ferromagnetic powder in the magnetic layer of the magnetic tape MT is not limited to the method described here.

An activation volume of the ε-iron oxide powder is preferably in a range of 300 to 1500 $nm^3$. The particulate ε-iron oxide powder having the activation volume in the range described above is suitable for manufacturing the magnetic tape MT exhibiting excellent electromagnetic conversion characteristics. The activation volume of the ε-iron oxide powder is preferably equal to or greater than 300 $nm^3$, and can be, for example, equal to or greater than 500 $nm^3$. From a viewpoint of further improving the electromagnetic conversion characteristics, the activation volume of the ε-iron oxide powder is preferably equal to or smaller than 1400 $nm^3$, more preferably equal to or smaller than 1300 $nm^3$, even more preferably equal to or smaller than 1200 $nm^3$, still preferably equal to or smaller than 1100 $nm^3$.

An example of an index of the reduction of thermal fluctuation, that is, improvement in thermal stability includes the anisotropy constant Ku. The ε-iron oxide powder can preferably have Ku equal to or greater than $3.0 \times 10^4$ $J/m^3$, and more preferably have Ku equal to or greater than $8.0 \times 10^4$ $J/m^3$. In addition, Ku of the ε-iron oxide powder can be, for example, equal to or smaller than $3.0 \times 10^5$ $J/m^3$. However, since a higher Ku means that the thermal stability is higher, which is preferable, Ku is not limited to the exemplified value.

From a viewpoint of increasing the playback output in a case of playing back the data recorded on the magnetic tape MT, it is desirable that the mass magnetization σs of the ferromagnetic powder included in the magnetic tape MT is high. In regards to this point, in one aspect, σs of the ε-iron oxide powder can be equal to or greater than 8 $A \cdot m^2/kg$ and equal to or greater than 12 $A \cdot m^2/kg$. On the other hand, from a viewpoint of noise reduction, the σs of the ε-iron oxide powder is preferably equal to or smaller than 40 $A \cdot m^2/kg$ and more preferably equal to or smaller than 35 $A \cdot m^2/kg$.

In the technology of the disclosure and the specification, average particle sizes of various powders such as the ferromagnetic powder and the like are values measured by the following method with a transmission electron microscope, unless otherwise noted.

The powder is imaged at an imaging magnification ratio of 100,000 with the transmission electron microscope and the image is printed on photographic paper or displayed on a display so as to have a total magnification ratio of 500,000 to obtain a photograph of particles constituting the powder. A target particle is selected from the obtained photograph of the particles and an outline of the particle is traced with a digitizer to measure a size of the particle (primary particle). The primary particle is an independent particle that is not aggregated.

The measurement described above is made on 500 particles randomly extracted. An arithmetical mean of the particle sizes of 500 particles obtained as described above is an average particle size of the powder. As the transmission electron microscope, a transmission electron microscope H-9000 manufactured by Hitachi, Ltd. can be used, for example. The measurement of the particle size can be performed by well-known image analysis software, for example, image analysis software KS-400 manufactured by Carl Zeiss. The average particle size shown in the example described below is a value measured by using the transmission electron microscope H-9000 manufactured by Hitachi, Ltd. as the transmission electron microscope and the image analysis software KS-400 manufactured by Carl Zeiss as the image analysis software, unless otherwise noted. In the technology of the disclosure and the specification, the powder means an aggregate of a plurality of particles. For example, the ferromagnetic powder means an aggregate of a plurality of ferromagnetic particles. The aggregate of the plurality of particles is not limited to an aspect in which particles constituting the aggregate directly contact with each other, but also includes an aspect in which a binding agent, an additive, or the like described below is interposed between the particles. The term of particle may be used for representing the powder.

As a method of collecting the sample powder from the magnetic tape MT in order to measure the particle size, a method disclosed in a paragraph 0015 of JP2011-048878A can be employed, for example.

In the technology of the disclosure and the specification, the size of the particle (particle size) constituting the powder is represented by (1) a length of a long axis constituting the particle, that is, a long axis length in a case where a shape of the particle observed in the above particle photograph is needle-shaped, spindle-shaped, columnar, or the like (however, a height is larger than a maximum long diameter of a bottom surface), (2) a maximum long diameter of a plate surface or a bottom surface in a case where the shape of the particle observed in the above particle photograph is plate-shaped or columnar (however, a thickness or a height is smaller than the maximum long diameter of the plate surface or the bottom surface), (3) a circle equivalent diameter in a case where the shape of the particle observed in the above particle photograph is spherical, polyhedral, unspecified, or the like and the long axis constituting the particle cannot be specified from the shape, unless otherwise noted. The circle equivalent diameter is a value obtained by a circle projection method.

An average needle-shaped ratio of the powder indicates an arithmetical mean of values obtained for 500 particles by measuring a length of a short axis, that is, a short axis length of the particle in the measurement described above and by obtaining a value of (long axis length/short axis length) of each particle. Unless otherwise noted, the short axis length is the length of the short axis constituting the particle in the case of (1) as the definition of the particle size and is a thickness or a height in the case of (2) as the same definition. In the case of (3) as the same definition, since there is no distinction between the long axis and the short axis are not distinguished, the value of (long axis length/short axis length) is assumed as one, for convenience.

Unless otherwise noted, in a case where the shape of the particle is specified, for example, the average particle size is an average long axis length in the case of (1) as the definition of the particle size and the average particle size is an average plate diameter in the case of (2) as the same definition. In the case of (3) as the same definition, the average particle size is an average diameter (also referred to as an average particle diameter).

The content (filling percentage) of the ferromagnetic powder in the magnetic layer is preferably in a range of 50% to 90% by mass and more preferably in a range of 60% to 90% by mass. The magnetic layer includes the ferromagnetic powder, can include the binding agent, and can also include any one or more kinds of additives. A high filling percentage of the ferromagnetic powder in the magnetic layer is preferable from a viewpoint of improvement in the recording density.

Binding Agent and Curing Agent

The magnetic tape MT can be a coating type magnetic tape and can include the binding agent in the magnetic layer. The binding agent is one or more kinds of resins. Various resins generally used as the binding agent of the coating type magnetic tape can be used as the binding agent.

For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed to be used. Among these, the polyurethane resin, the acrylic resin, the cellulose resin, and the vinyl chloride resin are preferable. These resins may be homopolymers or copolymers. These resins can be used as the binding agent even in a non-magnetic layer and/or a back coating layer described below. For the binding agent described above, description disclosed in paragraphs 0028 to 0031 of JP2010-024113A can also be referred to. A content of the binding agent in the magnetic layer can be, for example, 1.0 to 30.0 parts by mass with respect to 100.0 parts by mass of the ferromagnetic powder. An average molecular weight of the resin used as the binding agent can be, for example, 10,000 to 200,000 as a weight-average molecular weight.

A curing agent can also be used together with a resin that can be used as the binding agent. In one aspect, the curing agent can be a thermosetting compound that is a compound in which a curing reaction (crosslinking reaction) proceeds due to heating. In another aspect, the curing agent can be a photocurable compound in which the curing reaction (crosslinking reaction) proceeds due to light irradiation. At least a part of the curing agent may be included in the magnetic layer in a state of being reacted (crosslinked) with other components such as the binding agent, by proceeding the curing reaction in a magnetic layer formation step. In a case where a composition used for forming other layers includes the curing agent, the same applies to the layer formed by using this composition. The preferred curing agent is the thermosetting compound, and polyisocyanate is suitable. For details of the polyisocyanate, descriptions disclosed in paragraphs 0124 and 0125 of JP2011-216149A can be referred to, for example. A content of the curing agent in a magnetic layer forming composition can be, for example, 0 to 80.0 parts by mass with respect to 100.0 parts by mass of the binding agent and can be 50.0 to 80.0 parts by mass, from a viewpoint of improvement in hardness of the magnetic layer.

Additive

The magnetic layer may include one or more kinds of additives, as necessary. An example of the additive includes the curing agent. Examples of the additive included in the magnetic layer include a non-magnetic powder, a lubricant, a dispersing agent, a dispersing assistant, an antibacterial agent, an antistatic agent, and an antioxidant. As the lubricant, for example, fatty acid amide that may function as a boundary lubricant can be used. It is considered that the boundary lubricant is a lubricant that can be adsorbed to a surface of powder (for example, ferromagnetic powder) and form a rigid lubricant film to decrease contact friction. Examples of the fatty acid amide include amide of various fatty acids such as lauric acid, myristic acid, palmitic acid, stearic acid, oleic acid, linoleic acid, linolenic acid, behenic acid, erucic acid, and elaidic acid, and specific examples thereof include lauric acid amide, myristic acid amide, palmitic acid amide, and stearic acid amide. A content of the fatty acid amide in the magnetic layer is, for example, 0 to 3.0 parts by mass, preferably 0 to 2.0 parts by mass, and more preferably 0 to 1.0 parts by mass with respect to 100.0 parts by mass of the ferromagnetic powder. The fatty acid amide may also be included in the non-magnetic layer. A content of the fatty acid amide in the non-magnetic layer is, for example, 0 to 3.0 parts by mass and preferably 0 to 1.0 parts by mass with respect to 100.0 parts by mass of the non-magnetic powder. For the dispersing agent, a description disclosed in paragraphs 0061 and 0071 of JP2012-133837A can be referred to. The dispersing agent may be included in a non-magnetic layer forming composition. For the dispersing agent that may be added in the non-magnetic layer forming composition, a description disclosed in a paragraph 0061 of JP2012-133837A can be referred to. Examples of the non-magnetic powder that may be included in the magnetic layer include a non-magnetic powder that can function as an abrasive and a non-magnetic powder that can function as a projection formation agent which forms a projection suitably protruded from the surface of the magnetic layer. Examples of the abrasive include powders of alumina ($Al_2O_3$), silicon carbide, boron carbide ($B_4C$), TiC chromium oxide ($Cr_2O_3$), cerium oxide, zirconium oxide ($ZrO_2$), iron oxide, and diamond that are materials normally used as the abrasive of the magnetic layer. The powders of alumina such as α-alumina, silicon carbide, and diamond are preferable among the above. A content of the abrasive in the magnetic layer is preferably 1.0 to 20.0 parts by mass, more preferably 3.0 to 15.0 parts by mass, and even more preferably 4.0 to 10.0 parts by mass with respect to 100.0 parts by mass of the ferromagnetic powder. The average particle size of the abrasive is, for example, in a range of 30 to 300 nm and preferably in a range of 50 to 200 nm. As the projection formation agent, carbon black and colloidal particles can be used. A content of the projection formation agent in the magnetic layer is preferably 0.1 to 10.0 parts by mass, more preferably 0.1 to 5.0 parts by mass, and even more preferably 0.5 to 5.0 parts by mass with respect to 100.0 parts by mass of the ferromagnetic powder. An average particle size of the colloidal particles is, for example, preferably in a range of 90 to 200 nm and more preferably in a range of 100 to 150 nm. The average particle size of the carbon black is preferably in a range of 5 to 200 nm and more preferably in a range of 10 to 150 nm.

The magnetic layer described above can be provided on a surface of the non-magnetic support directly or indirectly through the non-magnetic layer.

Non-Magnetic Layer

Next, the non-magnetic layer will be described. The magnetic tape MT may include the magnetic layer directly on the surface of the non-magnetic support or may include the magnetic layer on the surface of the non-magnetic support through the non-magnetic layer including the non-magnetic powder. The non-magnetic powder used in the non-magnetic layer may be an inorganic powder or an organic powder. The carbon black and the like can be used. Examples of the inorganic powder include powders of metal, metal oxide, metal carbonate, metal sulfate, metal nitride, metal carbide, and metal sulfide. These non-magnetic powder can be purchased as a commercially available product or can be produced by a well-known method. For details thereof, descriptions disclosed in paragraphs 0146 to 0150 of JP2011-216149A can be referred to. For the carbon black that can be used in the non-magnetic layer, descriptions disclosed in paragraphs 0040 and 0041 of JP2010-024113A can be referred to. The content (filling percentage) of the non-magnetic powder of the non-magnetic layer is preferably in a range of 50% to 90% by mass and more preferably in a range of 60% to 90% by mass.

The non-magnetic layer can be a layer including the non-magnetic powder and the binding agent and can further include one or more kinds of additives. In regards to other details of the binding agent and the additive of the non-magnetic layer, the well-known technology regarding the non-magnetic layer can be applied. In regards to the type and the content of the binding agent and the type and the content of the additive, for example, the well-known technology regarding the magnetic layer can be applied.

In the technology of the disclosure and the specification, the non-magnetic layer also includes a substantially non-magnetic layer including a small amount of ferromagnetic powder as impurities or intentionally, together with the non-magnetic powder. The substantially non-magnetic layer is a layer having residual magnetic flux density equal to or smaller than 10 mT, having coercivity equal to or smaller than 100 Oe, or having residual magnetic flux density equal to or smaller than 10 mT and coercivity equal to or smaller than 100 Oe. 1 [kOe]=$10^6/4\pi$ [A/m]. It is preferable that the non-magnetic layer does not have the residual magnetic flux density and the coercivity.

In one aspect, a compound having an ammonium salt structure of alkyl ester anion represented by Formula 1 may be included in the non-magnetic layer. A content of the compound having an ammonium salt structure of alkyl ester anion represented by Formula 1 is preferably equal to or greater than 0.01 parts by mass, more preferably equal to or greater than 0.1 parts by mass, and even more preferably equal to or greater than 0.5 parts by mass with respect to 100.0 parts by mass of the non-magnetic powder in the non-magnetic layer. The content of the compound in the non-magnetic layer is preferably equal to or smaller than 15.0 parts by mass, more preferably equal to or smaller than 10.0 parts by mass, and even more preferably equal to or smaller than 8.0 parts by mass with respect to 100.0 parts by mass of the non-magnetic powder. The same also applies to a preferred range of the content of the compound in the non-magnetic layer forming composition used for forming the non-magnetic layer. The compound included in the non-magnetic layer can move to the magnetic layer and may further move to the surface of the magnetic layer to form a liquid film. Details of the compound that may be included in the non-magnetic layer or the non-magnetic layer forming composition are as described above.

Non-Magnetic Support

Next, the non-magnetic support (hereinafter, also simply referred to as a "support") will be described. Examples of the non-magnetic support include well-known components such as polyethylene terephthalate, polyethylene naphthalate, polyamide, polyamide imide, and aromatic polyamide that are subjected to biaxial stretching. Among the above, polyethylene terephthalate, polyethylene naphthalate, and polyamide are preferable. Corona discharge, plasma treatment, easy-bonding treatment, or heat treatment may be performed on these supports in advance.

Back Coating Layer

The magnetic tape MT can also include the back coating layer including the non-magnetic powder on a surface side of the non-magnetic support opposite to the surface side having the magnetic layer. The back coating layer preferably includes any one or both of the carbon black and the inorganic powder. The back coating layer can be a layer including the non-magnetic powder and the binding agent and can further include one or more additives. In regards to the binding agent of the back coating layer and various additives that may be randomly included therein, a well-known technology regarding the back coating layer can be applied, and a well-known technology regarding formulation of the magnetic layer and/or the non-magnetic layer can also be applied. For example, for the back coating layer, descriptions disclosed in paragraphs 0018 to 0020 of JP2006-331625A and column 4, line 65 to column 5, line 38 of U.S. Pat. No. 7,029,774B can be referred to.

Various Thicknesses

A thickness of the non-magnetic support is, for example, 3.0 to 80.0 μm, preferably 3.0 to 20.0 μm, more preferably 3.0 to 10.0 μm, and even more preferably 3.0 to 6.0 μm.

A thickness of the magnetic layer can be optimized according to a saturation magnetization amount of the magnetic head used, a head gap length, a recording signal band, and the like. The thickness of the magnetic layer is preferably 10 nm to 150 nm, and is more preferably 20 nm to 120 nm, and even more preferably 30 nm to 100 nm from a viewpoint of realization of high-density recording. The magnetic layer can be separated into two or more layers having magnetic properties as long as the magnetic layer has at least one layer, and a configuration regarding a well-known multilayered magnetic layer can be applied. A thickness of the magnetic layer in a case where the magnetic layer is separated into two or more layers is a total thickness of the layers.

A thickness of the non-magnetic layer is, for example, 0.1 to 3.0 μm, preferably 0.1 to 2.0 μm, and more preferably 0.1 to 1.5 μm.

A thickness of the back coating layer is preferably equal to or smaller than 0.9 μm and even more preferably in a range of 0.1 to 0.7 μm.

The thicknesses of various layers of the magnetic tape MT and the non-magnetic support can be obtained by a well-known film thickness measurement method. As an example, a cross section of the magnetic tape in a thickness direction is, for example, exposed by a well-known method of ion beams or microtome, and the exposed cross section is observed with a scanning electron microscope. In the cross section observation, it is possible to obtain various thicknesses as a thickness obtained at any one portion, or an arithmetical mean of thicknesses obtained at a plurality of portions of two or more portions, for example, two portions that are randomly extracted. Alternatively, the thickness of each layer may be obtained as a designed thickness calculated according to a manufacturing condition.

The control device 18 controls the entire magnetic tape drive 10. The control device 18 is formed by a plurality of hardware resources including a computer including a CPU, a memory, and a storage, an ASIC, and an FPGA. In the present first embodiment, the memory temporarily stores various pieces of information and is used as a work memory. An example of the memory is a RAM, but the memory is not limited thereto, and other types of storage devices may be used. The storage stores various parameters and various programs. The storage is a non-volatile storage device. An EEPROM is employed as an example of the storage. The EEPROM is only an example, and an HDD and/or SSD or the like may be applied as the storage instead of or together with the EEPROM.

As the control device 18, the plurality of hardware resources including the computer, the ASIC, and the FPGA are exemplified, but the technology of the disclosure is not limited thereto. For example, the control device 18 may be formed by hardware resources including a computer, an ASIC, an FPGA, or a PLD. The control device 18 may be formed by a hardware resource that combines any one or more of ASIC, FPGA, and PLD with the computer. As described above, the control device 18 may be any device as long as it is a device formed by a hardware resource having a function as a computer.

The transportation device 14 is a device that selectively transports the magnetic tape MT in a forward direction and a backward direction. The device comprises the sending motor 20, the winding reel 22, the winding motor 24, a plurality of guide rollers GR, and the control device 18.

A cartridge reel CR is provided in the magnetic tape cartridge 12. The magnetic tape MT is wound around the cartridge reel CR. The sending motor 20 causes the cartridge reel CR in the magnetic tape cartridge 12 to be rotatably driven under the control of the control device 18. The control device 18 controls the sending motor 20 to control a rotation direction, a rotation rate, a rotation torque, and the like of the cartridge reel CR.

In a case where the magnetic tape MT is wound around the winding reel 22, the control device 18 rotates the sending motor 20 such that the magnetic tape MT runs in the forward direction. The rotation rate, the rotation torque, and the like of the sending motor 20 are adjusted in accordance with a speed of the magnetic tape MT wound around the winding reel 22.

The winding motor 24 causes the winding reel 22 to be rotatably driven under the control of the control device 18. The control device 18 controls the winding motor 24 to control a rotation direction, a rotation rate, a rotation torque, and the like of the winding reel 22.

In a case where the magnetic tape MT is wound around the winding reel 22, the control device 18 rotates the winding motor 24 such that the magnetic tape MT runs in the forward direction. The rotation rate, the rotation torque, and the like of the winding motor 24 are adjusted in accordance with the speed of the magnetic tape MT wound around the winding reel 22.

With the adjustment of the rotation rate, the rotation torque, and the like of each of the sending motor 20 and the winding motor 24 as described above, a tension in a predetermined range is applied to the magnetic tape MT. The predetermined tension range indicates a range from a lower limit to an upper limit of the tension obtained from a computer simulation and/or a test performed with a real machine, as a range of the tension in which data can be read by the reading head 16 from the magnetic tape MT, for example.

In a case where the magnetic tape MT is rewound to the cartridge reel CR, the control device 18 rotates the sending motor 20 and the winding motor 24 such that the magnetic tape MT runs in the backward direction.

In the present first embodiment, the tension of the magnetic tape MT is controlled by controlling the rotation rate, the rotation torque, and the like of the sending motor 20 and the winding motor 24, but the technology of the disclosure is not limited thereto. For example, the tension of the magnetic tape MT may be controlled by using a dancer roller or may be controlled by drawing the magnetic tape MT to a vacuum chamber.

Each of the plurality of guide rollers GR is a roller guiding the magnetic tape MT. A running path of the magnetic tape MT is determined by extending the magnetic tape MT at a plurality of portions (two portions in the example shown in FIG. 1) between the magnetic tape cartridge 12 and the winding reel 22.

The reading head 16 is disposed in a running direction of the magnetic tape MT (hereinafter, also simply referred to as "running direction"). The running direction is a direction corresponding to the forward direction of the magnetic tape MT. The reading head 16 comprises a reading element 16A and a holder 16B. The reading element 16A is, for example, an element having a magnetoresistive element. The reading element 16A is held by the holder 16B at a position where the data can be read from the magnetic tape MT. The reading head 16 reads the data from the magnetic tape MT using the reading element 16A in a state where the magnetic tape MT runs.

The UI system device 26 and the external I/F 28 are connected to the control device 18. The UI system device 26 comprises a display and a receiving device. The display displays various pieces of information such as an image and the like under the control of the control device 18. The receiving device has a hard key, a touch panel, and the like, and receives an instruction from a user or the like of the magnetic tape drive 10. The control device 18 operates according to the instruction received by the receiving device.

The external I/F 28 controls the exchange of various pieces of information between the device outside the magnetic tape drive 10 (hereinafter, also referred to as "external device") and the control device 18. An example of the external I/F 28 is a USB interface. External devices (not shown) such as a smart device, a personal computer, a server, a USB memory, a memory card, and/or a printer are directly or indirectly connected to the USB interface.

Figure 2:
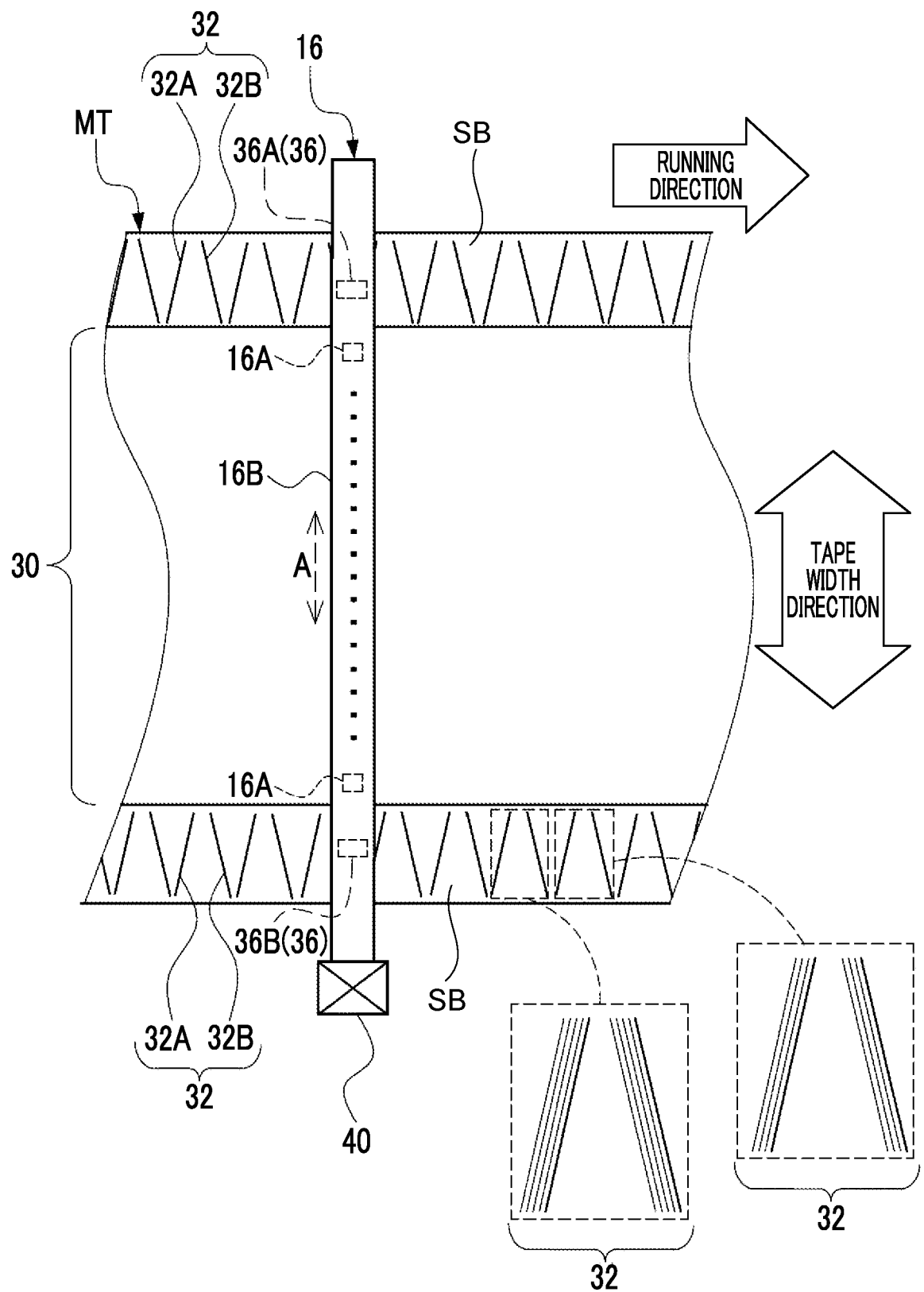
FIG. 2 is a schematic plan view of an example of a configuration of a plan view of a reading head and a magnetic tape included in the magnetic tape drive according to the first embodiment.

As shown in FIG. 2 as an example, the magnetic tape MT comprises a track region 30 and a servo pattern 32. The servo pattern 32 is a pattern used for detection of a position of the reading head 16 on the magnetic tape MT. The servo pattern 32 is a pattern in which a plurality of first diagonal lines 32A at a first predetermined angle (for example, six degrees) and a plurality of second diagonal lines 32B at a second predetermined angle (for example, 174 degrees) are alternately disposed on both ends in a width direction of the magnetic tape MT (hereinafter, also simply referred to as a "tape width direction") along a running direction of the magnetic tape MT.

The servo pattern 32 in the magnetic tape MT shown in FIG. 2 is simplified, for convenience of description. The first diagonal line 32A shown in the magnetic tape MT shown in FIG. 2 is the first diagonal line 32A on the most downstream side in the running direction among the plurality of first diagonal lines 32A in one servo pattern 32. The second diagonal line 32B shown in the magnetic tape MT shown in FIG. 2 is the second diagonal line 32B on the most downstream side in the running direction among the plurality of second diagonal lines 32B in one servo pattern 32.

Specifically, for example, as shown in an enlarged view of FIG. 2, five first diagonal lines 32A and four first diagonal lines 32A are present as the first diagonal lines 32A, and five second diagonal lines 32B and four second diagonal lines 32B are present as the second diagonal lines 32B. That is, the five first diagonal lines 32A, the five second diagonal lines 32B, the four first diagonal lines 32A, and the four second diagonal lines 32B are disposed in this order along the running direction of the magnetic tape MT.

The track region 30 is a region where the data which is a reading target is written, and is formed on the center of the magnetic tape MT in the tape width direction. The term "center in the tape width direction" here indicates, for example, a region between the servo pattern 32 on one end and the servo pattern 32 on the other end of the magnetic tape MT in the tape width direction.

The reading head 16 comprises a servo element pair 36. The servo element pair 36 comprises servo elements 36A and 36B. Each of the servo elements 36A and 36B is, for example, an element having the magnetoresistive element. The servo element 36A is disposed at a position facing the servo pattern 32 which is an end portion of the magnetic tape MT in the tape width direction. The servo element 36B is disposed at a position facing the servo pattern 32 which is the other end portion of the magnetic tape MT in the tape width direction. The servo element 36A and 36B are shown as an example, but the technology of the disclosure is satisfied, even in a case of using only any one of the servo element 36A or 36B. That is, the number of servo elements necessary for realizing the data reading by the reading head 16 by the linear scan method may be used with respect to the reading head 16.

The reading head 16 comprises a plurality of reading elements 16A. The plurality of reading elements 16A are disposed at positions facing the track region 30, in a default state of the magnetic tape drive 10.

The default state of the magnetic tape drive 10 indicates a state where the magnetic tape MT is not deformed and a positional relationship between the magnetic tape MT and the reading head 16 is in a correct positional relationship. The correct positional relationship indicates, for example, a positional relationship in which the center of the track region 30 in the tape width direction and the center of the reading head 16 in a longitudinal direction match. The meaning of "match" in the present first embodiment indicates a match in the sense including an error generally allowed in the technical field to which the technology of the disclosure belongs, in addition to the meaning of perfect match.

The track region 30 comprises a plurality of tracks, and the plurality of tracks are disposed in the tape width direction at regular intervals. The reading elements 16A are, for example, disposed in the tape width direction at regular intervals every few or several tens of tracks along the tape width direction. In the present first embodiment, 32 reading elements 16A are employed.

That is, the reading elements 16A are disposed at positions respectively corresponding to 32 tracks included in the magnetic tape MT. In other others, the reading elements 16A are disposed at positions corresponding to each single track of the 32 tracks included in the magnetic tape MT. Each number of tracks and the reading elements 16A is described as 32, but this is merely an example, and the number thereof may be more than or less than 32. The meaning of "regular interval" in the present first embodiment indicates a regular interval in the sense including an error generally allowed in the technical field to which the technology of the disclosure belongs, in addition to the meaning of perfect regular interval.

Hereinafter, for convenience of description, one track to which the reading element 16A is assigned among 32 tracks included in the track region 30 is also referred to as a "single track".

A movement mechanism 40 is provided on an end portion of the reading head 16. The movement mechanism 40 moves the reading head 16 in the tape width direction in accordance with power applied from the outside. Specifically, the movement mechanism 40 selectively moves the reading head 16 to one side and the other side in the tape width direction in accordance with the power applied from the outside. In the example shown in FIG. 2, the one side and the other side in the tape width direction are shown as an arrow A direction.

In the present first embodiment, the reading head 16 reads the data on the single track by the linear scan method in a state where the magnetic tape MT runs under the control of the control device 18 (refer to FIG. 1). In the linear scan method, the servo pattern 32 is read by the servo element pair 36 in synchronous with the reading operation of the reading element 16A. That is, in the linear scan method according to the present first embodiment, the reading for the magnetic tape MT is performed in parallel by the reading element 16A and the servo element pair 36.

Figure 3:
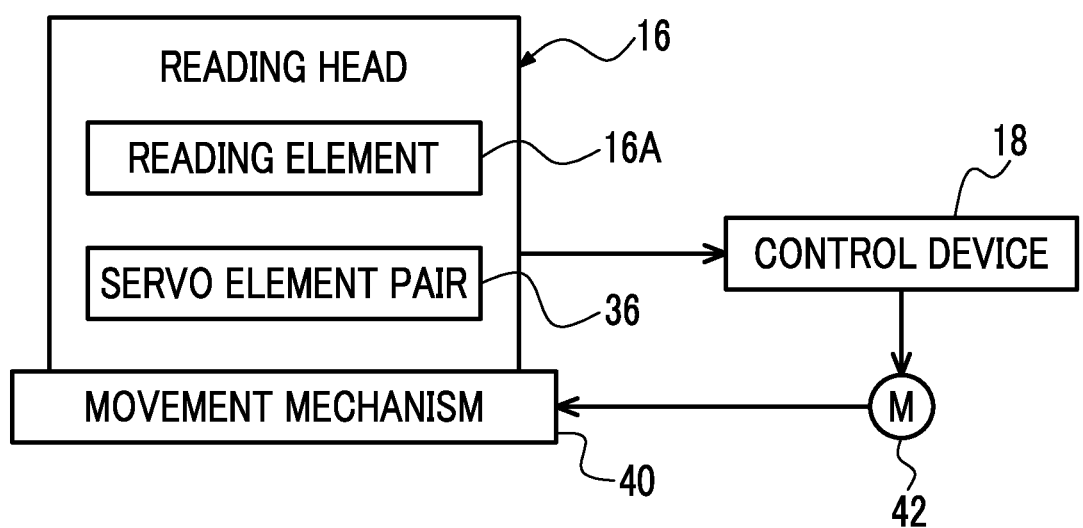
FIG. 3 is a block diagram showing an example of a mutual relationship between the reading head, a movement mechanism, a motor, and a control device included in the magnetic tape drive according to the first embodiment.

As shown in FIG. 3 as an example, the reading head 16 is connected to the control device 18. The playback signal obtained from the single track by the reading element 16A is output to the control device 18 as a playback signal sequence that is a time-series signal. A plurality of the reading elements 16A are provided to the reading head 16, and so playback signals are obtained from the track region 30 (for example, each of the single tracks corresponding to each of the reading elements 16A) by each of the plurality of reading elements 16A, and the obtained playback signals are output to the control device 18 as a plurality of playback signal sequence. An analog servo signal obtained by reading of the servo pattern 32 (hereinafter, referred to as an "analog servo signal") by the servo element pair 36 is output to the control device 18.

A motor 42 is connected to the control device 18. An example of the motor 42 includes a voice coil motor. The voice coil motor generates power by converting electric energy based on a current flowing through a coil into kinetic energy with energy of magnet as a medium. The motor 42 is connected to the movement mechanism 40. The movement mechanism 40 receives the power from the motor 42 under the control of the control device 18 to move the reading head 16 in the tape width direction.

The voice coil motor is used as an example of the motor 42, but the technology of the disclosure is not limited thereto. For example, a motor that is a different type from the voice coil motor may be used. Instead of the motor, a piezoelectric element and/or a solenoid may be used. The power applied to the reading head 16 may be power generated by a device obtained by combining a plurality of elements of the motor, the piezoelectric element, and the solenoid.

Figure 4:
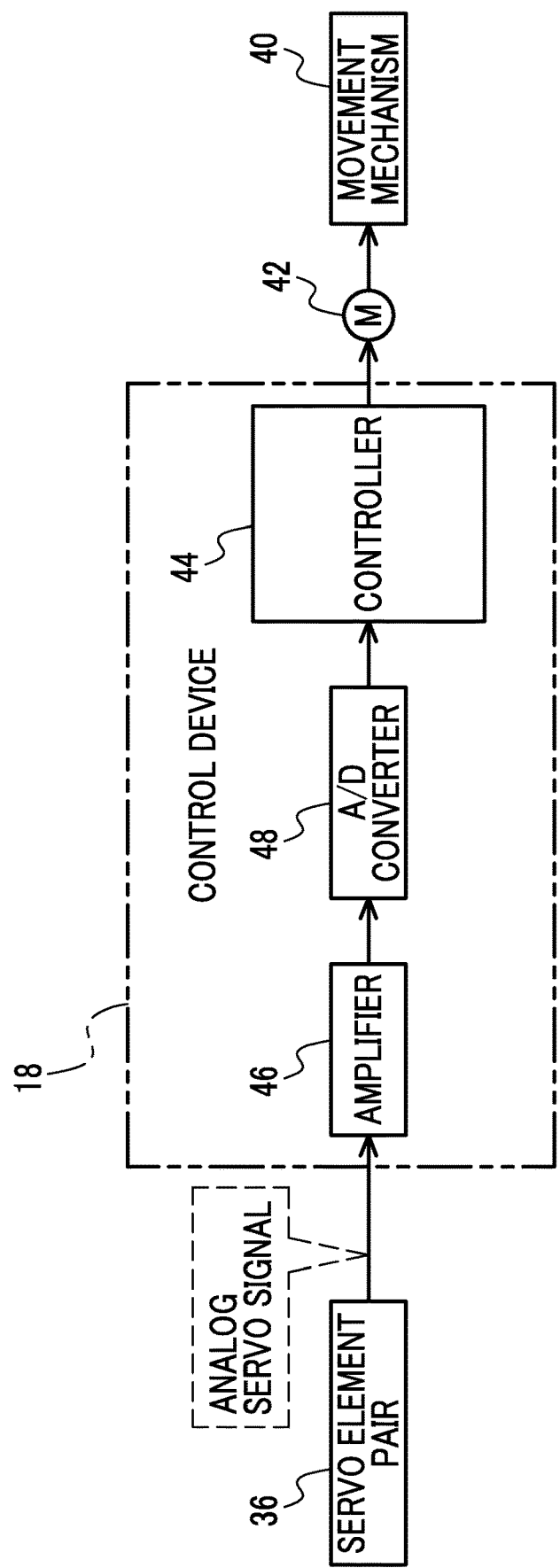
FIG. 4 is a block diagram showing an example of a mutual relationship between a servo element pair, the control device, the movement mechanism, and the motor included in the magnetic tape drive according to the first embodiment.

As shown in FIG. 4 as an example, the control device 18 comprises a controller 44, an amplifier 46, and an A/D converter 48. The servo element pair 36 is connected to the controller 44 through the amplifier 46 and the A/D converter 48. The controller 44 is connected to the motor 42.

The amplifier 46 receives the analog servo signal from the servo element pair 36, amplifies the input analog servo signal, and outputs the amplified analog servo signal to the A/D converter 48. The A/D converter 48 converts the analog servo signal input from the amplifier 46 into a digital signal. The digital signal obtained by the A/D converter 48 is output to the controller 44 by the A/D converter 48 as a digital servo signal (hereinafter, referred to as a "servo signal").

A positional deviation amount between the single track and the reading element 16A (hereinafter, referred to as a "deviation amount") is determined in accordance with the servo signal which is a result obtained by reading the servo pattern 32 by the servo element pair 36.

The positional deviation between the single track and the reading element 16A indicates, for example, a deviation between the center of the single track in the tape width direction and the center of the reading element 16A in the tape width direction.

The controller 44 is a device that includes a computer. The computer has a CPU, a memory, and a storage, as described above. The controller 44 controls the entire magnetic tape drive 10.

The controller 44 controls the motor 42 to apply the power according to the deviation amount to the movement mechanism 40. The movement mechanism 40 changes the position of the reading head 16 in the tape width direction according to the power applied from the motor 42 to adjust the position of the reading head 16 to a proper position. The term "proper position" of the reading head 16 indicates, for example, a position where the deviation between the center of the single track in the tape width direction and the center of the reading element 16A in the tape width direction is "0".

The deviation amount is calculated, for example, based on a ratio of a second distance to a first distance. The second distance indicates, for example, a distance calculated from a result obtained by reading the first diagonal line 32A on the most downstream side (refer to FIG. 2) and the second diagonal line 32B on the most downstream side (refer to FIG. 2) in one servo pattern 32 by the servo element 36A. The first distance indicates, for example, a distance calculated from a result obtained by reading the second diagonal line 32B on the most downstream side in one servo pattern 32 and the second diagonal line 32B on the most downstream side in the other servo pattern 32 among the adjacent servo patterns 32 by the servo element 36A.

Specifically, for example, the deviation amount is calculated by the following formula (1). As an "angle α of diagonal line" of formula (1), the first predetermined angle and the second predetermined angle are applied. The first predetermined angle is an angle of the first diagonal line 32A formed with a straight line along the tape width direction. The second predetermined angle is an angle of the second diagonal line 32B formed with the straight line along the tape width direction. In other others, the first predetermined angle is an angle of the first diagonal line 32A formed in a front-view clockwise direction in the drawing with respect to the straight line along the tape width direction. The second predetermined angle is "180 degrees—first predetermined angle".

Figure 5:
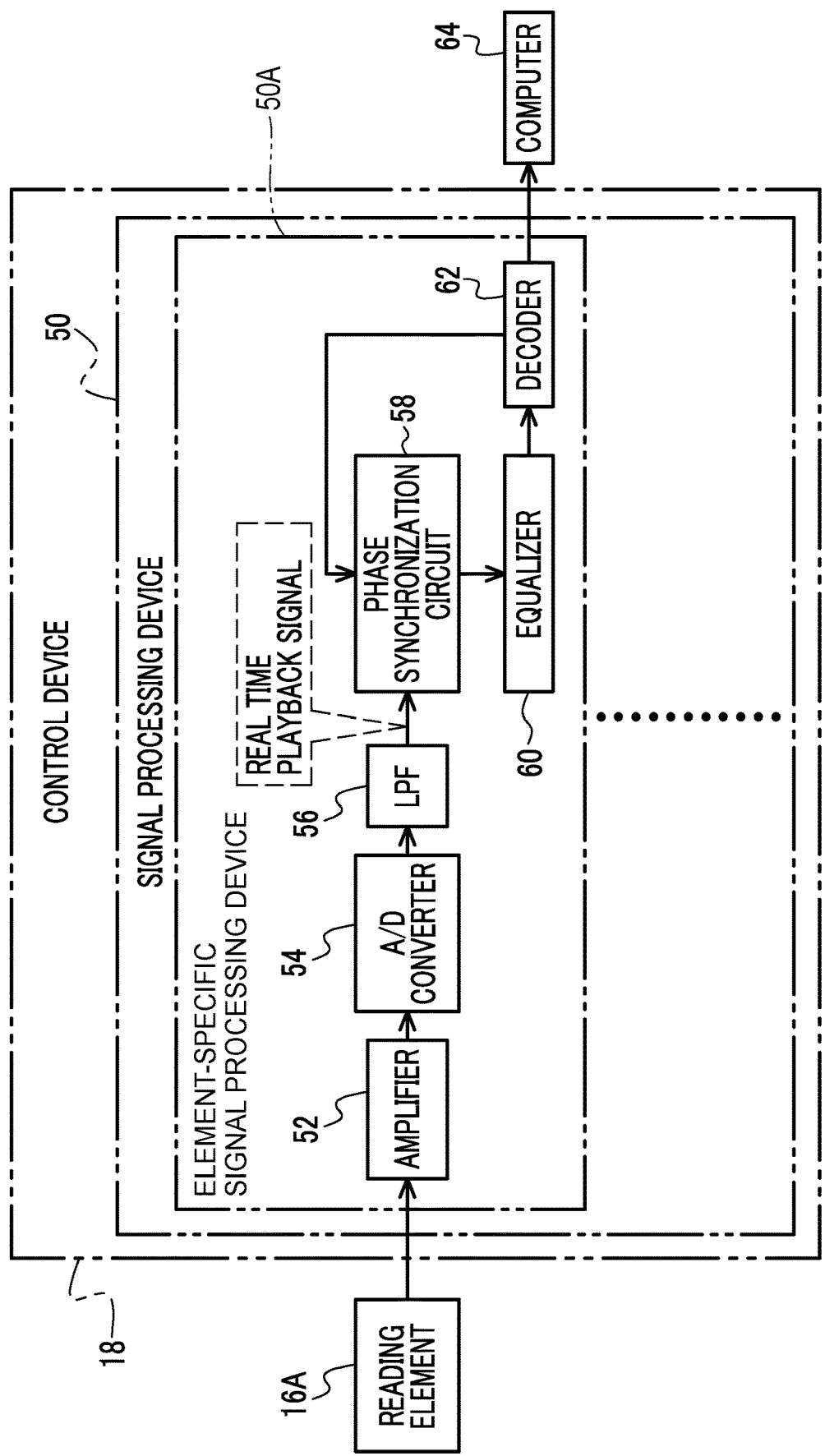
FIG. 5 is a block diagram showing an example of a mutual relationship between the reading element, an amplifier, an A/D converter, an LPF, a phase synchronization circuit, an equalizer, a decoder, and a computer included in the magnetic tape drive according to the first embodiment.

Formula 1

$$y1 = \frac{d}{2\tan(\alpha)} \left( \frac{1}{2} - \frac{\sum A_i}{\sum B_i} \right) \tag{1}$$

y1: Deviation amount
d: Pitch width in running direction of servo pattern 32
α: angle of diagonal line (for example, angle of first diagonal line 32A or "180 degrees—angle of second diagonal line 32B")
X: "angle of first diagonal line 32A"="180 degrees—angle of second diagonal line 32B"
$A_i$: Second distance
$B_i$: First distance As shown in FIG. 5 as an example, the control device 18 comprises a signal processing device 50. The signal processing device 50 performs signal processing on an analog playback signal which is data read by the reading element 16A from the single track (hereinafter, also referred to as "analog playback signal").

The signal processing device 50 comprises a plurality of element-specific signal processing devices 50A. There is one of the element-specific signal processing devices 50A provided for each of the plurality of reading elements 16A. The element-specific signal processing devices 50A each comprise an amplifier 52, an A/D converter 54, an LPF 56, a phase synchronization circuit 58, an equalizer 60, and a decoder 62.

The reading element 16A is connected to the LPF 56 through the amplifier 52 and the A/D converter 54. The LPF 56 is connected to the equalizer 60 through the phase synchronization circuit 58. The equalizer 60 is connected to the decoder 62. The decoder 62 is connected to the phase synchronization circuit 58. A computer 64 is provided outside of the control device 18, and the decoder 62 is connected to the computer 64.

The reading element 16A outputs the analog playback signal to the amplifier 52. That is, the analog playback signal obtained by being read from the single track by the reading element 16A is input to the signal processing device 50 in real time. The analog playback signal is an example of a "reading result" according to the technology of the disclosure.

The amplifier 52 amplifies the input playback signal and outputs the amplified playback signal to the A/D converter 54. The A/D converter 54 is an example of a "processing circuit" according to the technology of the disclosure. The A/D converter 54 digitizes the input analog playback signal to convert the input analog playback signal into a digital signal. The digital signal obtained by the A/D converter 54 is input to the LPF 56. The LPF 56 generates a real-time playback signal and outputs the signal to the phase synchronization circuit 58. The real-time playback signal indicates a signal obtained by removing a high frequency component by the LPF56 with respect to the digital signal input to the LPF56.

Meanwhile, a deviation in phase of the real-time playback signal in the running direction may occur due to deformation of the magnetic tape MT, sharp vibration applied to the magnetic tape MT and/or the reading head 16, jitter during the running of the magnetic tape MT, and the like.

Therefore, the phase synchronization circuit 58 performs phase synchronization processing on the real-time playback signal input from the LPF 56. The phase synchronization processing indicates processing of keeping the deviation in phase of the real-time playback signal in the running direction within an allowable certain error range based on a decoding result obtained by the decoder 62.

The phase synchronization circuit 58 is fed back with the decoding result (for example, decoded signal described below) of the past real-time playback signal (for example, past real-time playback signal for several bits) by the decoder 62. The phase synchronization circuit 58 specifies the deviation in phase generated in the past from the decoding result fed back, and corrects the specified deviation in phase after a delay of several bits to the present. As described above, the phase synchronization circuit 58 repeats the feedback and the correction after the delay of several bits to maintain the deviation in phase within the allowable certain error range.

The example in which the phase synchronization processing using the decoding result of the decoder 62 is executed by the phase synchronization circuit 58 has been used, but the technology of the disclosure is not limited thereto. For example, processing of synchronizing the phase deviated by a slight deviation occurring in the running direction due to sharp vibration and/or jitter applied to the magnetic tape MT and/or the reading element 16A with a phase of a reference clock set in advance with respect to the control device 18 (hereinafter, simply referred to as a "reference clock") may be performed.

The equalizer 60 performs waveform equalization of the real-time playback signal. That is, the equalizer 60 performs waveform equalization processing on the real-time playback signal subjected to the phase synchronization processing by the phase synchronization circuit 58. The playback signal after the waveform equalization processing which is obtained by subjecting the real-time playback signal to the waveform equalization processing by the equalizer 60 is output to the decoder 62.

The decoder 62 decodes the playback signal after the waveform equalization processing which is input from the equalizer 60 and outputs the decoded signal (for example, a signal indicating either "0" or "1") obtained by decoding to the phase synchronization circuit 58 and the computer 64. The computer 64 executes various pieces of processing with respect to the decoded signal input from the decoder 62.

Meanwhile, the data is recorded in bit units on the single track in a recording pattern set in advance along the running direction. In recent years, distortion that occurs in the waveform equalized playback signal increases due to narrowing of a bit interval associated with densification of data recorded on the magnetic tape MT (for example, interval between positions where the data is recorded in 1-bit units along the running direction with respect to the magnetic tape MT) and increase in a data transfer rate.

As the bit interval becomes narrower, a magnetic field that leaks from adjacent bit recording positions at the time of recording the data interferes with a magnetic field generated by the recording head, and thus the data may be recorded at a position deviated from a bit recording position required to be originally recorded on the magnetic tape MT.

Figure 6:
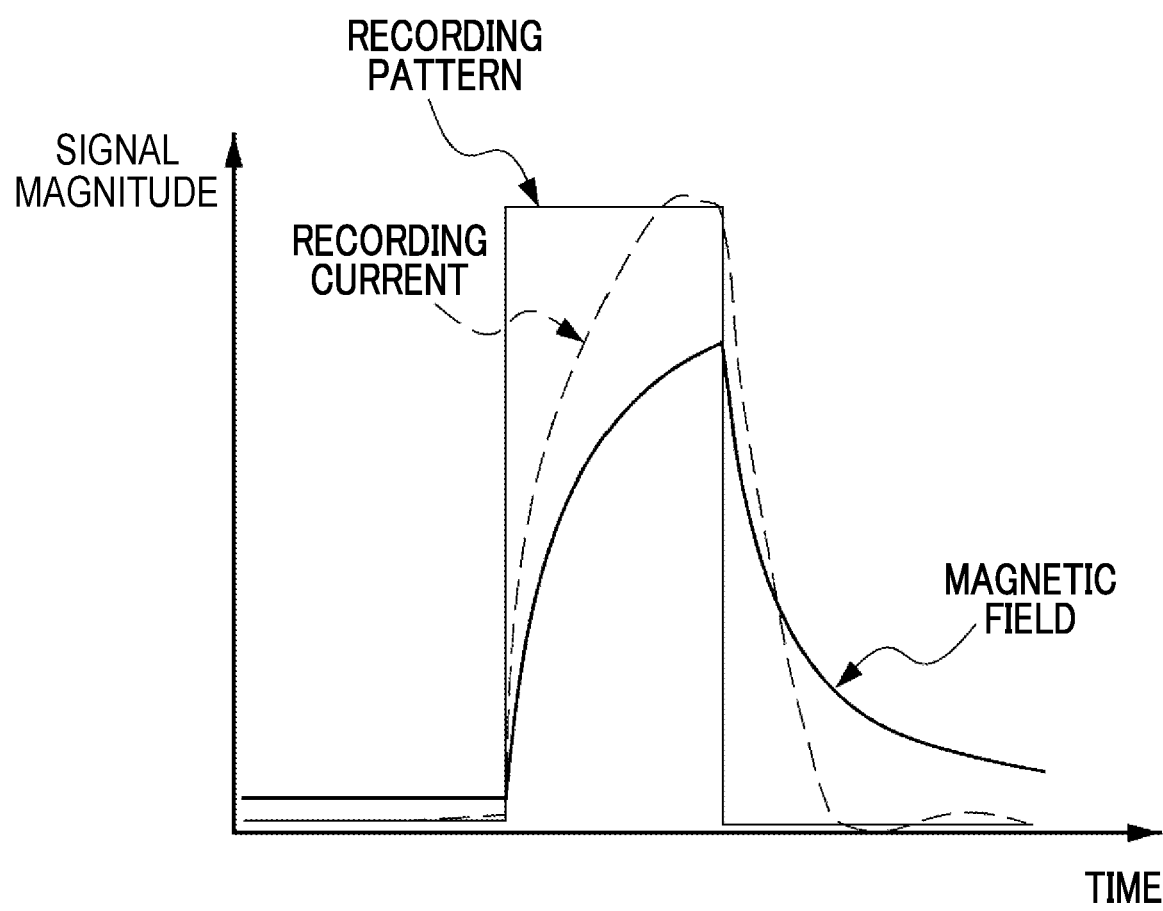
FIG. 6 is a graph showing an example of correlations between a waveform of a current supplied to a recording head at the time of recording data of a recording pattern for one bit on a magnetic tape, a waveform of a magnetic field generated by the recording head, and the recording pattern of the data recorded on the magnetic tape.

As shown in FIG. 6 as an example, it takes a certain amount of time for a current supplied to the recording head at the time of recording the data of the recording pattern for one bit on the magnetic tape MT ("recording current" in the example shown in FIG. 6) to rise, and the magnetic field generated by the recording current has a rise time longer than a fall time. As the rise time of the magnetic field becomes longer than the fall time of the magnetic field, an inversion position of the magnetization on the magnetic tape MT becomes asymmetrical. As a result, the data is recorded at the position that deviates from the bit recording position required to be originally recorded on the magnetic tape MT.

On the other hand, the distortion of the waveform equalized playback signal is caused not only at the time of recording the data on the magnetic tape MT but also due to the characteristics of the magnetic tape drive 10. Examples of the characteristics of the magnetic tape drive 10 include the characteristics of the reading head 16 (for example, non-linearity of the magnetoresistive elements), the characteristics of the magnetic tape MT, the characteristics of the running speed of the magnetic tape MT, and the characteristics of the A/D converter 54.

In a case where the distortion of the waveform equalized playback signal is caused only at the time of recording the data on the magnetic tape MT, it can be dealt with by adjusting a recording condition. However, it is difficult to reduce the distortion caused by the characteristics of the magnetic tape drive 10 merely by adjusting the recording condition. There is a concern that the adjustment of the recording condition might be over-adjusted, and distortion actually increased, in a case where the data is read from the magnetic tape MT by a magnetic tape drive 10 in good condition. In particular, there are significant problems in a case where the data on a removable medium such as the magnetic tape MT is recorded and read by separate heads. This is because the cause of distortion in the waveform equalized playback signal differs between at the time of recording the data and at the time of reading the data with respect to the magnetic tape MT. An FIR filter works effectively for distortion that occurs linearly, namely regular distortion. However, an FIR filter does not work effectively for distortion in the waveform equalized playback signal that occurs non-linearly, namely irregular distortion, according to the condition under the environment where the data is read from the magnetic tape MT (hereinafter, "non-linear distortion" or "non-linear noise"), as compared with the distortion that occurs linearly.

Therefore, in the magnetic tape drive 10, the equalizer 60 uses a non-linear filter that has been learned to reduce the non-linear distortion to perform the waveform equalization of the real-time playback signal. An example of the non-linear filter includes a filter having a learned neural network. An example of the learned neural network includes a trained model 82 shown in FIG. 15.

Figure 7:
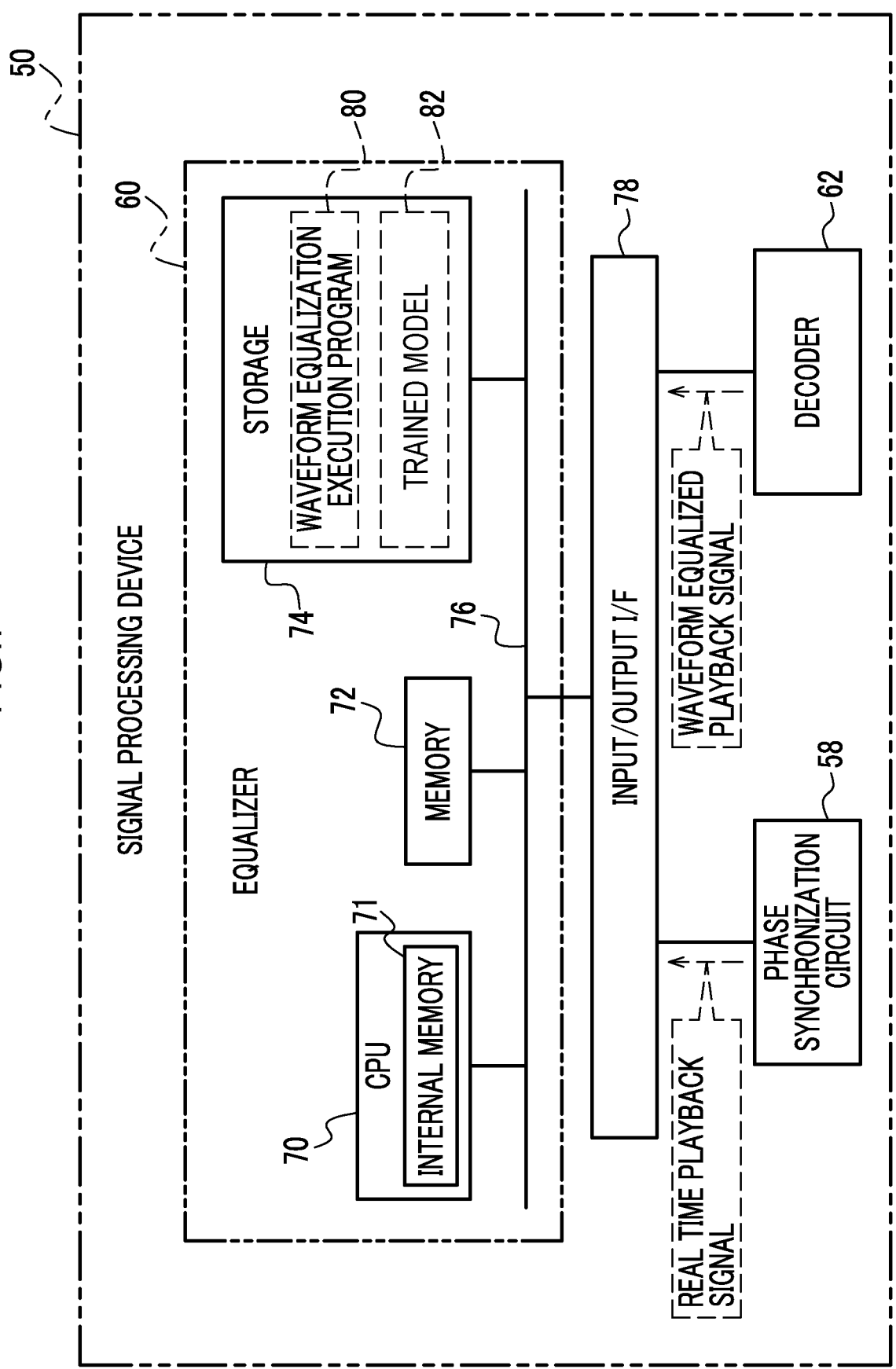
FIG. 7 is a block diagram showing an example of a hardware configuration of an electric system of a signal processing device according to the first embodiment.

As shown in FIG. 7 as an example, the equalizer 60 is an example of a "computer" according to the technology of the disclosure and comprises a CPU 70, a memory 72, and a storage 74. The CPU 70, the memory 72, and the storage 74 are the same hardware resources as the CPU, the memory, and the storage of the computer included in the controller 44 described above.

The CPU 70 has an internal memory 71. The CPU 70, the memory 72, and the storage 74 are connected to a bus 76. In the example shown in FIG. 7, one bus is illustrated as the bus 76 for convenience of illustration, but a plurality of buses may be used. The bus 76 may be a serial bus or a parallel bus including a data bus, an address bus, a control bus, and the like.

The signal processing device 50 comprises an input/output I/F 78, and the phase synchronization circuit 58 and the decoder 62 are connected to the input/output I/F 78. The input/output I/F 78 is connected to the bus 76, and the input/output I/F 78 exchanges various pieces of information between the CPU 70 and the phase synchronization circuit 58 and exchanges various pieces of information between the CPU 70 and the decoder 62.

The input/output I/F 78 is an example of a "receiver" according to the technology of the disclosure and receives the real-time playback signal from the phase synchronization circuit 58. The equalizer 60 performs the waveform equalization of the real-time playback signal received by the input/output I/F 78. The waveform equalized playback signal obtained by performing the waveform equalization by the equalizer 60 is output to the decoder 62 through the input/output I/F 78.

A waveform equalization execution program 80 and a trained model 82 are stored in the storage 74. That is, the waveform equalization execution program 80 is an example of a "program" according to the technology of the disclosure. The CPU 70 reads out the waveform equalization execution program 80 from the storage 74 and executes the read-out waveform equalization execution program 80 on the memory 72. The waveform equalization execution program 80 is executed by the CPU 70 to realize waveform equalization execution processing (refer to FIG. 17) described below.

Figure 13:
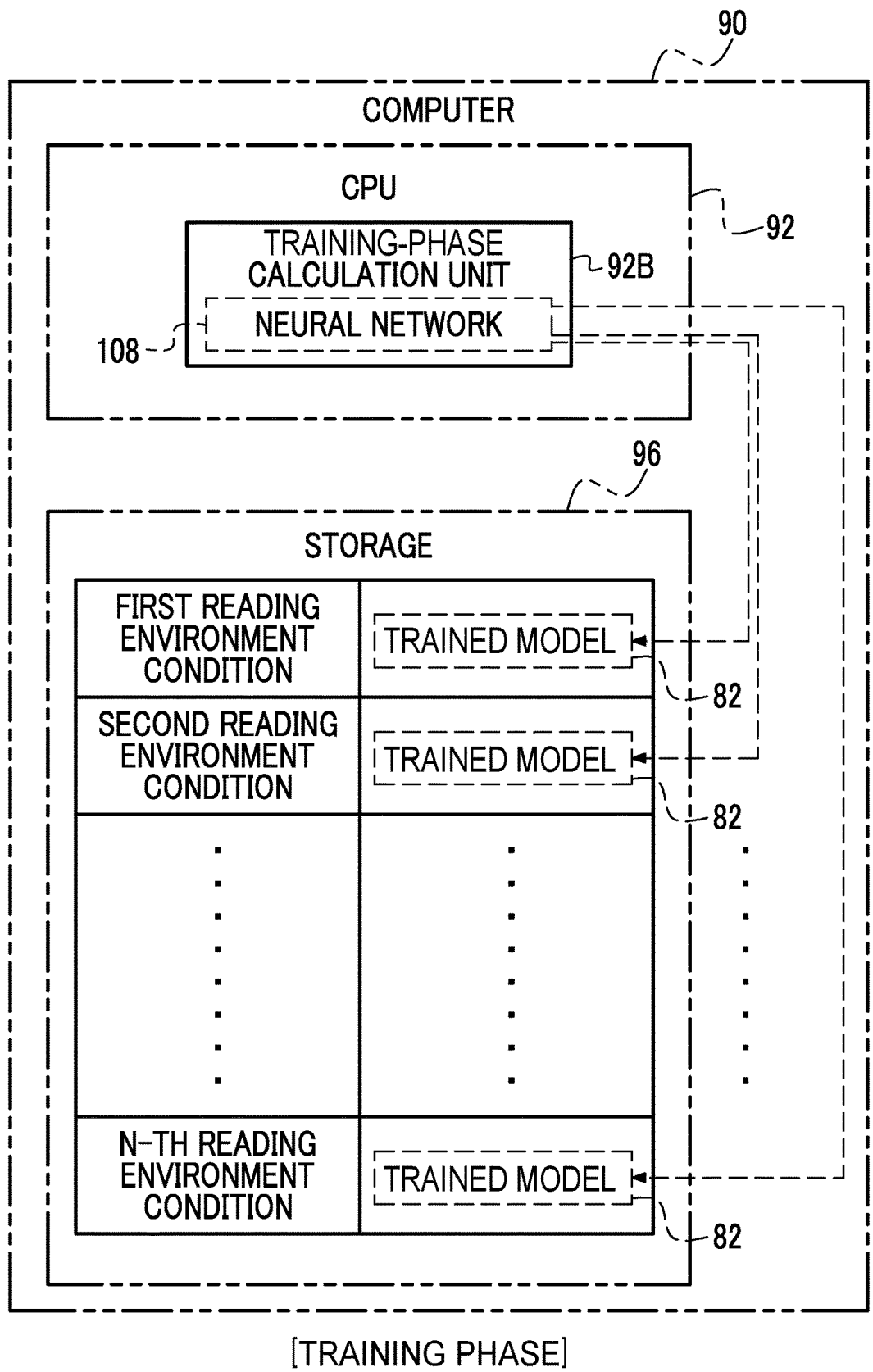
FIG. 13 is a conceptual diagram showing an example of a mode in which a trained model obtained by training the neural network according to the first embodiment is stored in a storage.
Figure 14:
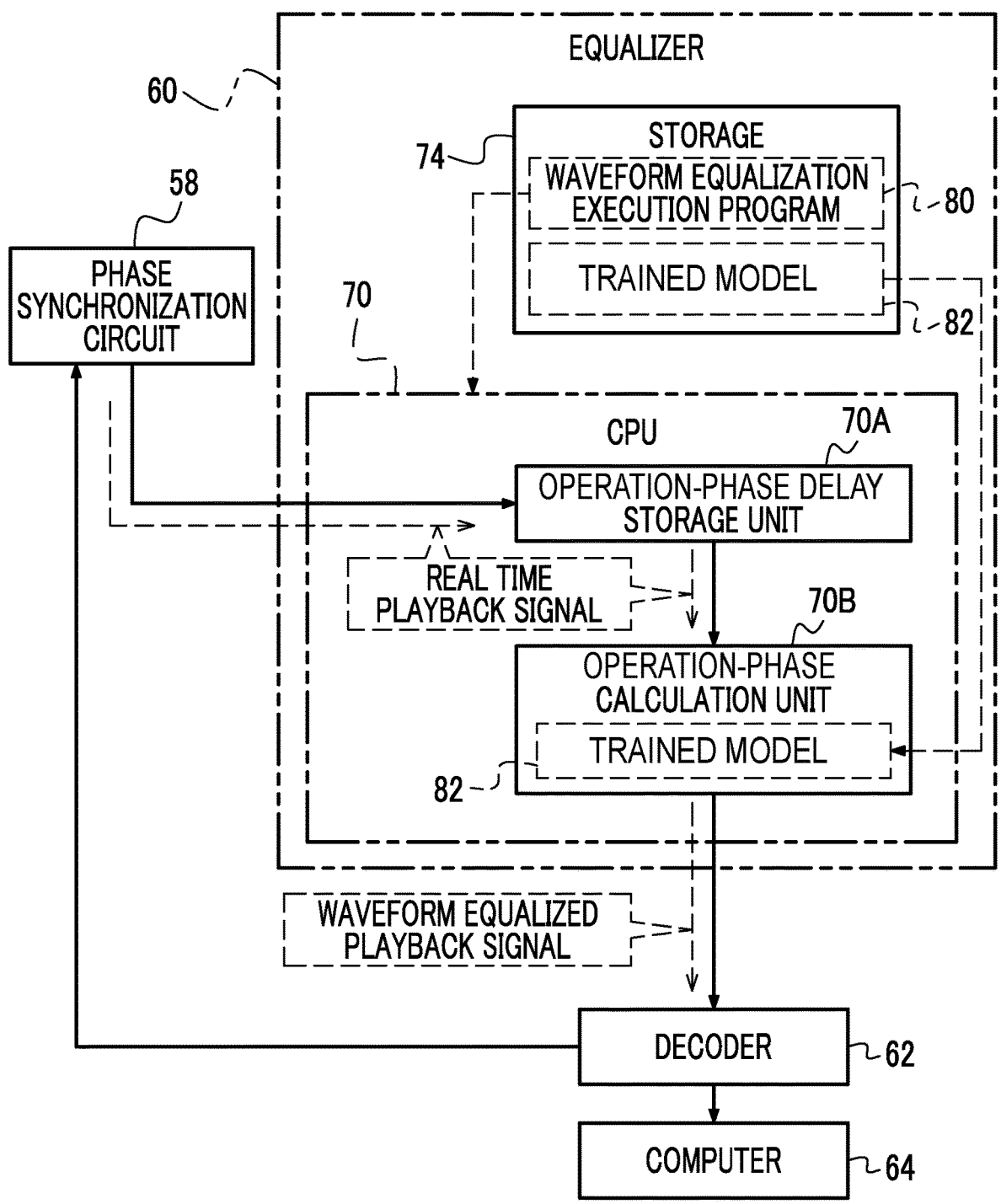
FIG. 14 is a block diagram showing an example of relevant functions of a CPU in an operation phase of the trained model according to an first embodiment.
Figure 15:
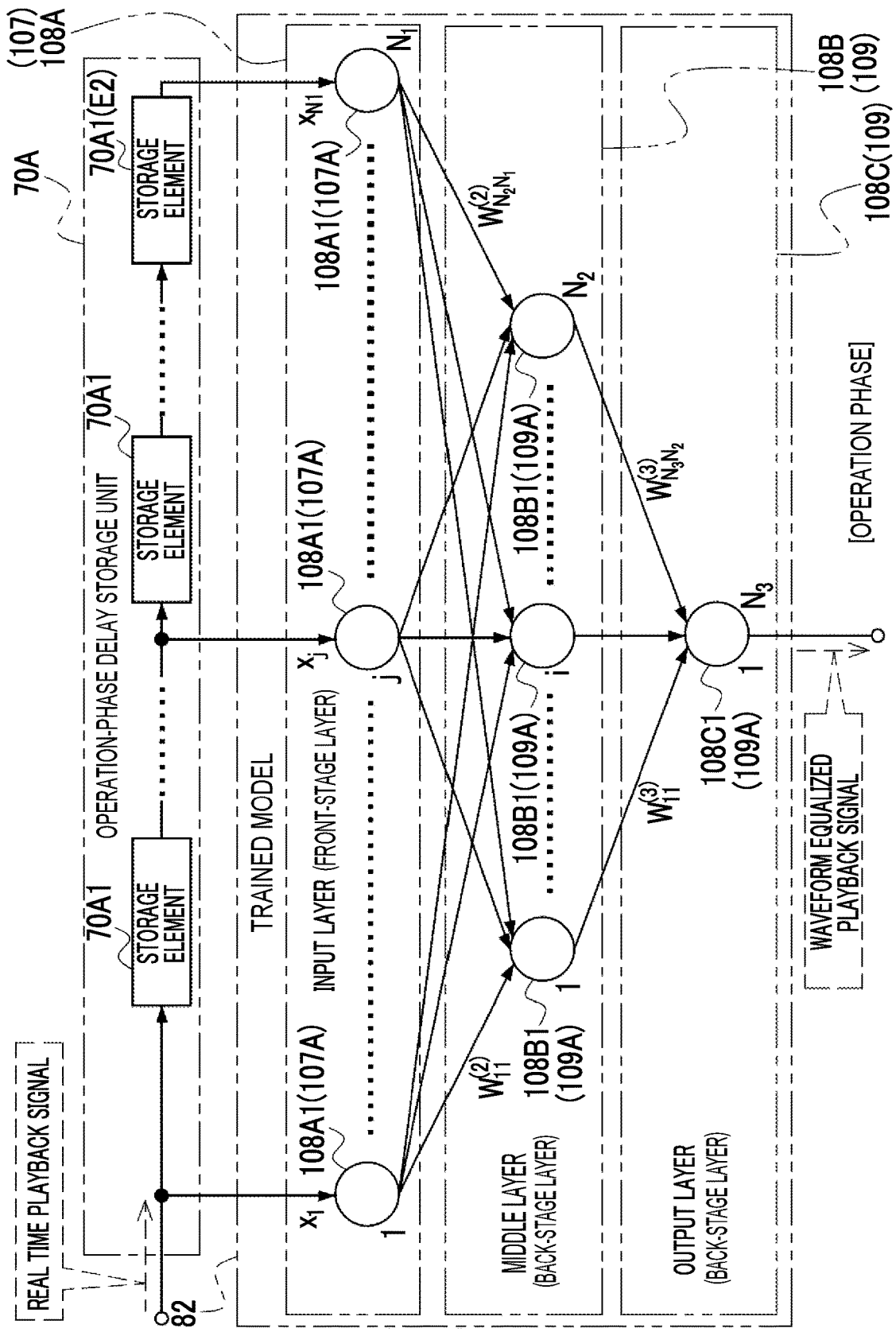
FIG. 15 is a conceptual diagram showing an example of a hierarchical structure of the trained model according to the first embodiment.

How to make the trained model 82 and how to use the trained model will be described with reference to FIGS. 8 to 15. FIGS. 8 to 13 show an example of a configuration of a training phase (hereinafter, also simply referred to as "training phase") for causing the neural network 108 (refer to FIG. 11) to learn. FIGS. 14 and 15 show an example of a configuration of an operation phase (hereinafter, also simply referred to as "operation phase") in which the trained model 82 is operated.

Figure 8:
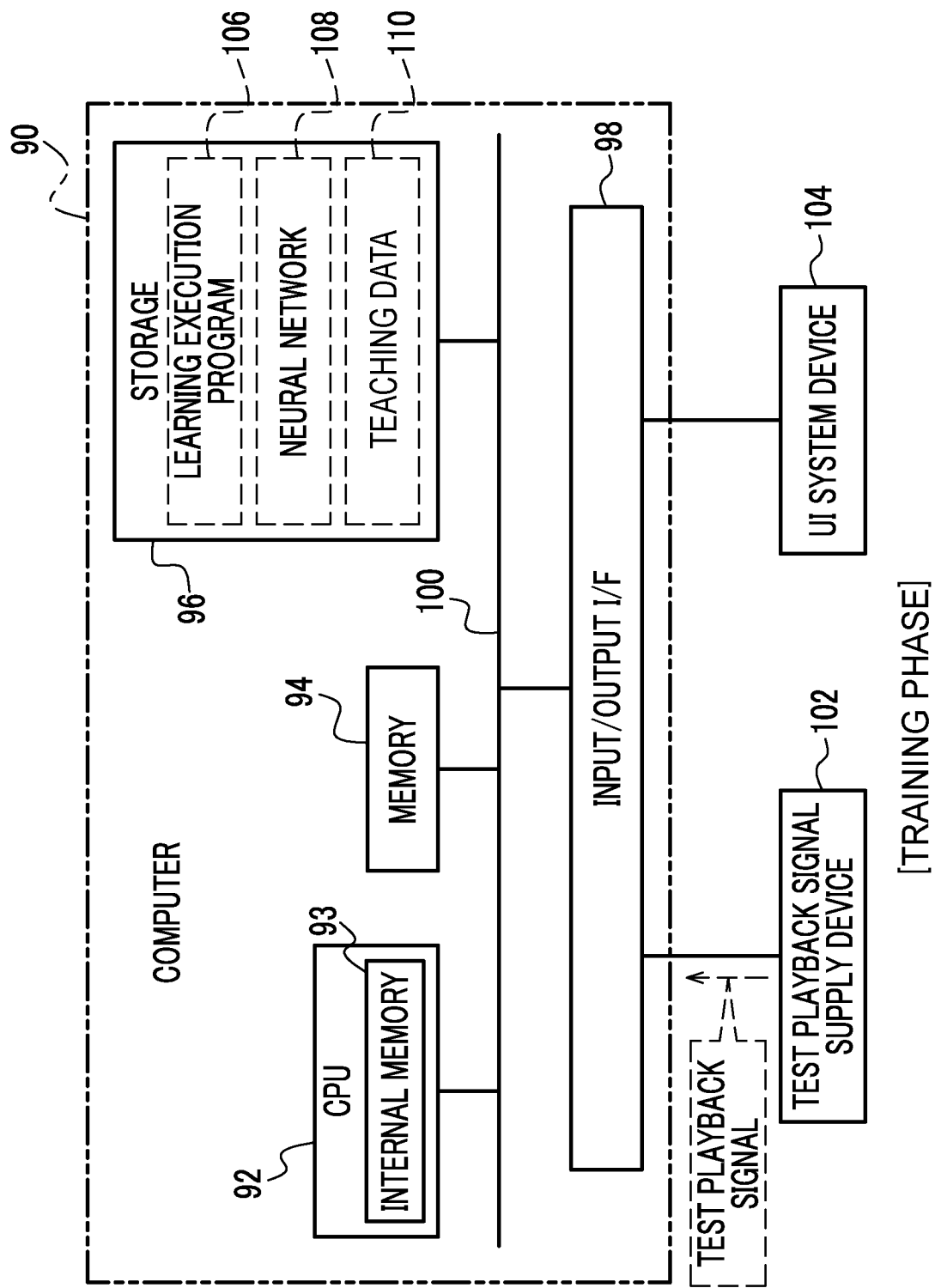
FIG. 8 is a block diagram showing an example of a configuration of a computer and peripherals thereof used for learning of a neural network according to the first embodiment.

First, the operation phase will be described with reference to FIGS. 8 to 13. The trained model 82 is generated by causing the neural network 108 (refer to FIG. 11) to learn. As shown in FIG. 8 as an example, the learning for the neural network 108 is realized by the computer 90. The computer 90 comprises a CPU 92, a memory 94, a storage 96, an input/output I/F 98, and a bus 100. The CPU 92, the memory 94, the storage 96, and the input/output I/F 98 are connected to the bus 100. A CPU 92 has an internal memory 93. The CPU 92, the memory 94, and the storage 96 are the same hardware resources as the CPU 70, the memory 72, and the storage 74 described above.

A test playback signal supply device 102 and a UI system device 104 are connected to the input/output I/F 98. The input/output I/F 98 controls the exchange of various pieces of information between the CPU 92 and the test playback signal supply device 102 and various pieces of information between the CPU 92 and the UI system device 104.

The test playback signal supply device 102 is, for example, a computer having the same hardware resources as the CPU, memory, and storage described above, and supplies the test playback signal to the computer 90. The test playback signal is acquired by the CPU 92 through the input/output I/F 98. As will be described in detail below, the test playback signal is a playback signal obtained by reading the data from the magnetic tape MT on various conditions under various environments in which the data is read from the magnetic tape MT.

The UI system device 104 comprises a display and a receiving device. The display displays various pieces of information such as an image and the like under the control of the CPU 92. The receiving device has a keyboard, a mouse, a touch panel, and the like, and receives an instruction from a user or the like of the computer 90. The CPU 92 operates according to the instruction received by the receiving device.

The storage 96 stores a learning execution program 106, the neural network 108, and teaching data 110.

Figure 9:
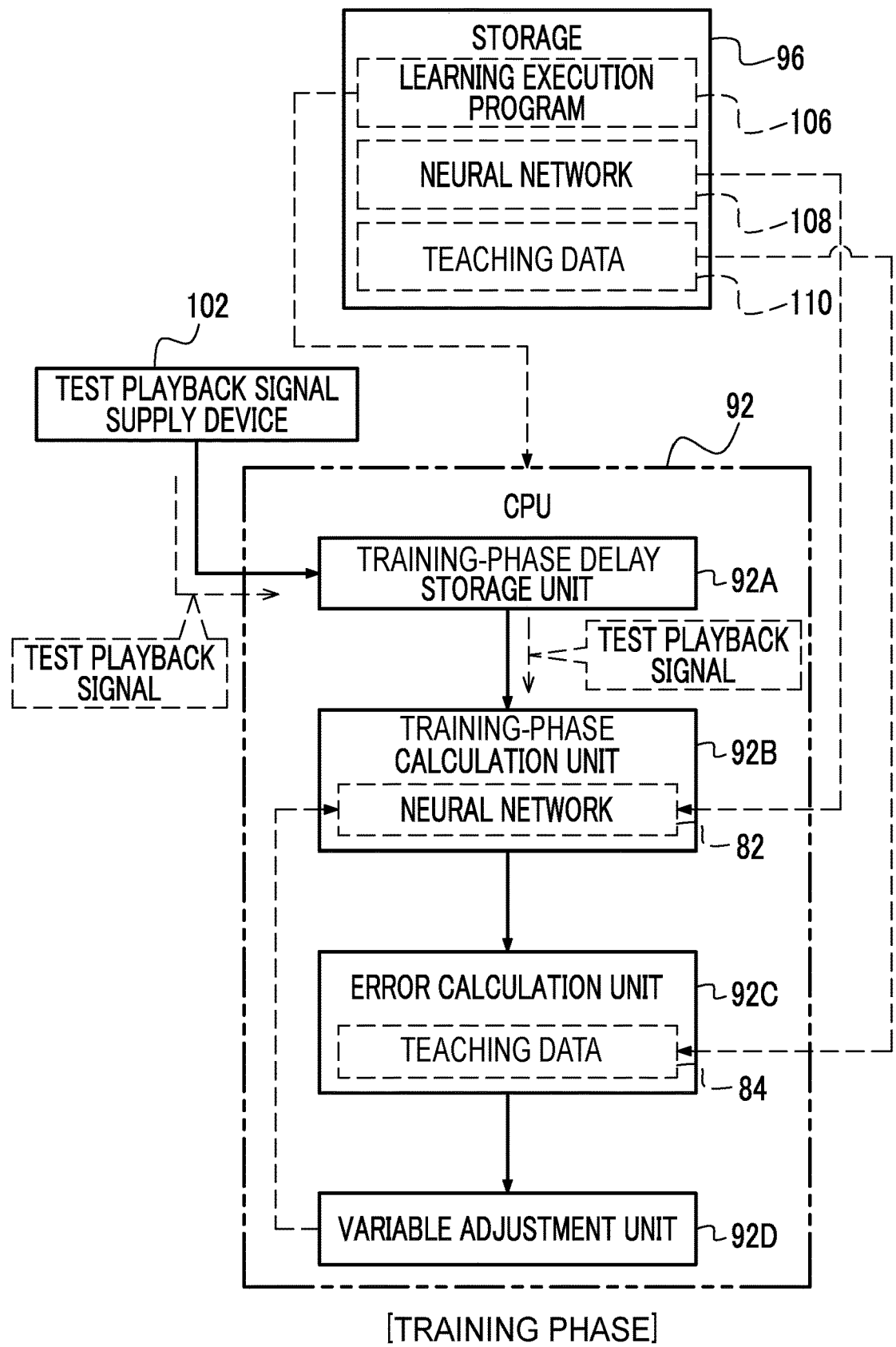
FIG. 9 is a block diagram showing an example of relevant functions of a CPU in a training phase of the neural network according to the first embodiment.

As shown in FIG. 9 as an example, the CPU 92 reads out the learning execution program 106 from the storage 96 and executes the read-out learning execution program 106 to operate as a training phase delay storage unit 92A, a training phase calculation unit 92B, an error calculation unit 92C, and a variable adjustment unit 92D.

The training phase calculation unit 92B acquires the test playback signal by one bit each from the test playback signal supply device 102 and stores the test playback signals in a first storage element group (for example, a plurality of storage elements in the internal memory 93 shown in FIG. 8) in an acquisition order. That is, each time the test playback signal is acquired one bit at a time from the test playback signal supply device 102, the training phase calculation unit 92B stores the test playback signals in the first storage element group as a time-series in the acquisition order. The test playback signal is stored in the first storage element group by the FIFO method.

The training phase calculation unit 92B performs the calculation using the test playback signal stored in time-series by the training phase delay storage unit 92A and the neural network 108 in the storage 96.

The error calculation unit 92C calculates an error between the calculation result by the training phase calculation unit 92B and the teaching data 110 in the storage 96. The teaching data 110 indicates an ideal playback signal regarding known data recorded on a learning magnetic tape in a recording pattern set in advance along a longitudinal direction (for example, running direction) of the learning magnetic tape. The teaching data 110 is an example of a "predetermined target value" according to the technology of the disclosure. The error is an example of the "deviation amount" according to the technology of the disclosure.

The neural network 108 has a plurality of optimization variables (hereinafter, also simply referred to as "optimization variables") such as a coupling weight and an offset value (hereinafter, also referred to as "threshold value"). The neural network 108 is learned by adjusting the optimization variables such that the error calculated by the error calculation unit 92C is minimized. Therefore, the variable adjustment unit 92D adjusts the optimization variables such that the error calculated by the error calculation unit 92C is minimized.

Figure 10:
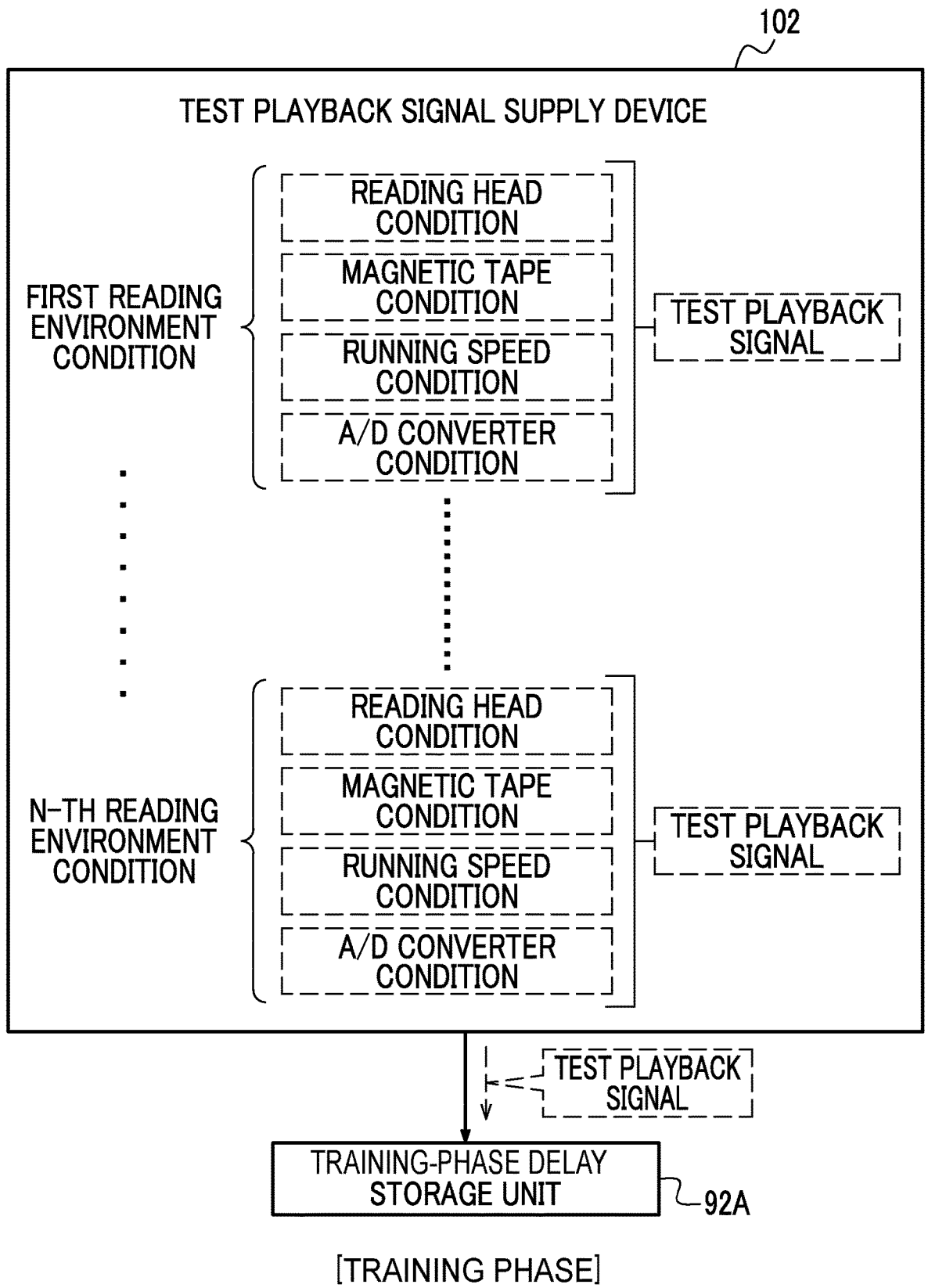
FIG. 10 is a conceptual diagram showing an example of a configuration of a test playback signal supply device according to the first embodiment.

As shown in FIG. 10 as an example, the test playback signal supply device 102 has a test playback signal for each condition under the environment in which the data is read from the magnetic tape MT (hereinafter, also referred to as "reading environment condition"). In the example shown in FIG. 10, a first reading environment condition to an N-th reading environment condition are shown, and the test playback signal is associated with each of the first reading environment condition to the N-th reading environment condition. In the following, for convenience of description, the first reading environment condition to the N-th reading environment condition are simply referred to as "reading environment condition" in a case where it is not necessary to distinguish therebetween.

The reading environment condition is a condition including a reading head condition, a magnetic tape condition, a running speed condition, and an A/D converter condition.

The reading head condition indicates a condition caused by an individual difference in the reading head 16. The individual difference in the reading head 16 indicates, for example, a difference in the characteristics of the reading element 16A for each reading head 16 (for example, non-linearity of the magnetoresistive element). The difference in the characteristics of each reading element 16A is mainly caused by a manufacturing error of the reading element 16A and/or deterioration of the reading element 16A with time. Examples of an index that quantitatively indicates a degree of deterioration of the reading element 16A with time include the number of times the reading head 16 is used, an average time during which the reading head 16 is continuously used, and a time to reach a specific time point (for example, the present time point) after the reading head 16 is manufactured.

The magnetic tape condition indicates a condition caused by an individual difference in the magnetic tape MT. The individual difference in the magnetic tape MT indicates, for example, a difference in the characteristics of each magnetic tape MT. The difference in the characteristics of each magnetic tape MT is mainly caused by a difference in the bit interval, a difference in a material of the magnetic tape MT, a manufacturing error of the magnetic tape MT, and/or deterioration of the magnetic tape MT with time. Examples of an index that quantitatively indicates a degree of deterioration of the magnetic tape MT with time include the number of times the magnetic tape MT is used, an average time during which the magnetic tape MT is continuously used, and a time to reach a specific time point (for example, the present time point) after the magnetic tape MT is manufactured.

The running speed condition indicates a condition related to the running speed of the magnetic tape MT. Examples of the speed at which the magnetic tape MT runs include 3 m/s (meters/second), 4 m/s, and 5 m/s. The speed at which the magnetic tape MT runs may be an average speed in a case where the data is read over the entire length of the magnetic tape MT, a median speed, or the most frequent speed. The speed at which the magnetic tape MT runs may be an average speed in a case where data in a part of the magnetic tape MT is read, a median speed, or the most frequent speed.

The A/D converter condition indicates a condition caused by an individual difference in the A/D converter 54. The individual difference in the A/D converter 54 indicates, for example, a difference in the characteristics of each A/D converter 54. The difference in the characteristics of each A/D converter 54 is mainly caused by a manufacturing error of the A/D converter 54 and/or deterioration of the A/D converter 54 with time. Examples of an index that quantitatively indicates a degree of deterioration of the A/D converter 54 with time include the number of times the A/D converter 54 is used, an average time during which the A/D converter 54 is continuously used, and a time to reach a specific time point (for example, the present time point) after the A/D converter 54 is manufactured.

Contents of the first reading environment condition to the N-th reading environment condition are different from each other. That is, in the first reading environment condition to the N-th reading environment condition, a combination of the reading head condition, the magnetic tape condition, the running speed condition, and the A/D converter condition is different, and a unique test playback signal is associated with each reading environment condition.

The test playback signal supply device 102 supplies the test playback signal associated with the reading environment condition selected from the first reading environment condition to the N-th reading environment condition to the training phase delay storage unit 92A. The reading environment condition is selected according to, for example, an instruction given to the UI system device 104.

Figure 11:
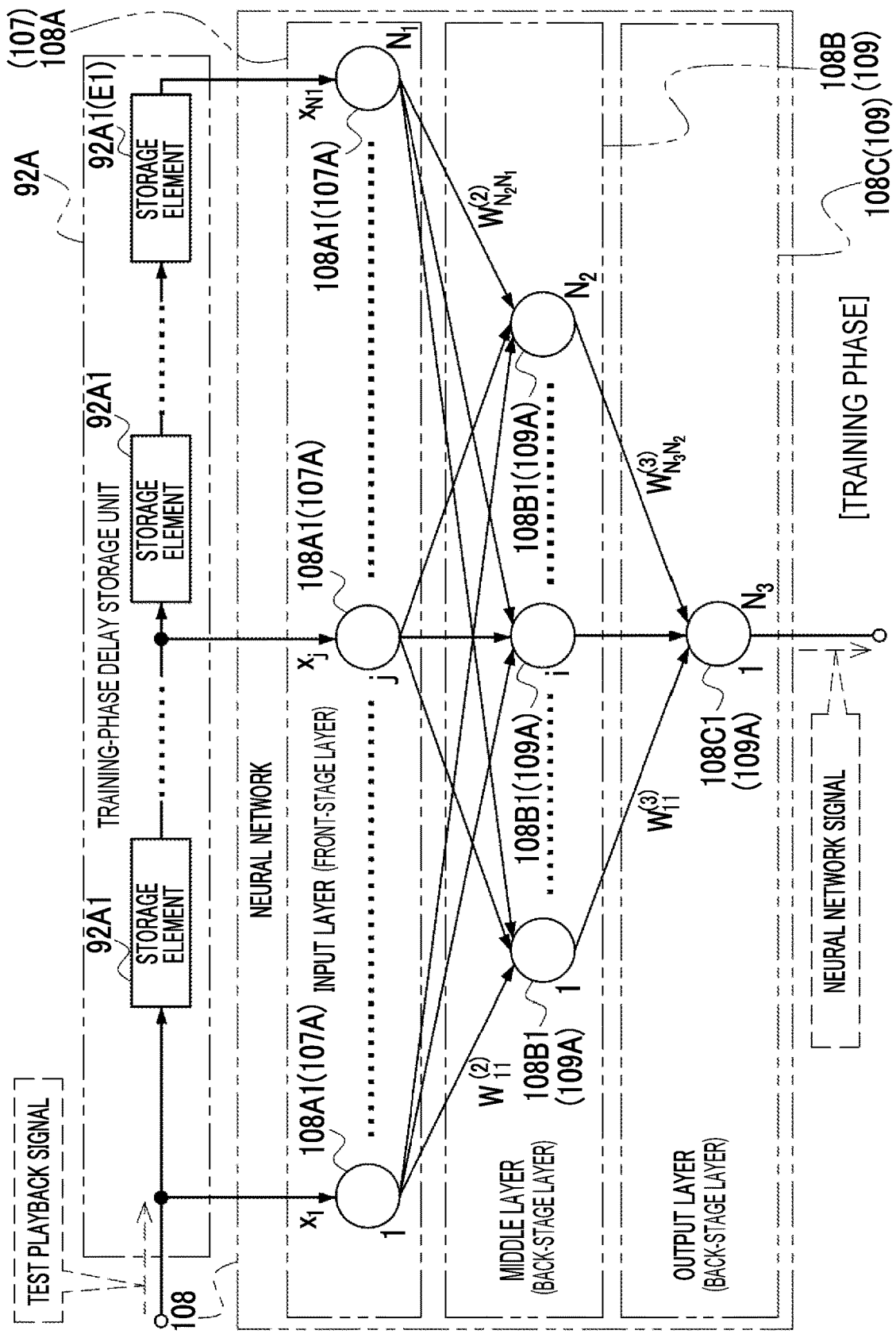
FIG. 11 is a conceptual diagram showing an example of a hierarchical structure of the neural network according to the first embodiment.

As shown in FIG. 11 as an example, the training phase delay storage unit 92A has a plurality of storage elements 92A1 as the first storage element group. The plurality of storage elements 92A1 are formed by, for example, the internal memory 93. Each of the plurality of storage elements 92A1 is a delay element, and the plurality of storage elements 92A1 receives the test playback signal with a delay of a predetermined time (hereinafter, also referred to as "delay time") described below. The plurality of storage elements 92A1 store the test playback signals in time-series. That is, each time the test playback signal for one bit is input, each storage element 92A1 stores the test playback signal with a delay by one bit each. In the example shown in FIG. 11, the plurality of storage elements 92A1 are connected in series, and the test playback signal is stored in each storage element 92A1 with the delay by one bit each. The test playback signal is stored in the plurality of storage elements 92A1 in the FIFO method. The test playback signal stored in the storage element 92A1 on a terminal end (hereinafter, also referred to as "terminal-end storage element E1") is erased from the storage element 92A1 as a new test playback signal for one bit is input to the training phase delay storage unit 92A.

The neural network 108 includes a front-stage layer 107 having a plurality of front-stage layer nodes 107A corresponding to the plurality of storage elements 92A1 and a back-stage layer 109 having a plurality of back-stage layer nodes 109A. Each of the plurality of storage elements 92A1 outputs the input test playback signal to a corresponding front-stage layer node 107A among the plurality of front-stage layer nodes 107A. Each of the plurality of front-stage layer nodes 107A outputs the test playback signal input from a corresponding storage element 92A1 among the plurality of storage elements 92A1 to the back-stage layer 109. The back-stage layer 109 converts a composite value obtained based on a sum of the products (product sum) of the test playback signal input from the plurality of front-stage layer nodes 107A ("x" in the example shown in FIG. 11) and a back-stage layer coupling weight ("w" in the example shown in FIG. 11) by an activation function. The back-stage layer 109 outputs a back-stage layer value ("neural network signal" in the example shown in FIG. 11) based on the converted value obtained by converting the composite value by the activation function. The back-stage layer value output from the back-stage layer 109 is a value regarding a test playback signal first input among the plurality of test playback signals stored in the plurality of storage elements 92A1, that is, the test playback signal being stored in the terminal-end storage element E1. The back-stage layer coupling weight is a kind of the optimization variable adjusted by the variable adjustment unit 92D (refer to FIG. 9) and is determined by learning performed on the neural network 108 to minimize the error between the back-stage layer value and the teaching data 110.

The back-stage layer value is a value based on a sum of the products (product sum) of the converted values multiplied by the back-stage layer coupling weights, and based on a threshold value (refer to formula (4) described below). The threshold value used for the product sum of the converted values and the back-stage layer coupling weights is a value that reduces the product sum of the converted values and the back-stage layer coupling weights. The threshold value used for the product sum of the converted value and the back-stage layer coupling weight is determined by learning performed on the neural network 108 to reduce the non-linear distortion. The threshold value is an example of a "first variable" and a "second variable" according to the technology of the disclosure.

In the example shown in FIG. 11, an input layer 108A is shown as an example of the front-stage layer 107, and an middle layer (hidden layer) 108B and an output layer 108C are shown as an example of the back-stage layer 109. The input layer 108A has a plurality of input layer nodes 108A1. The middle layer 108B has a plurality of middle layer nodes 108B1. The output layer 108C has an output layer node 108C1. In the example shown in FIG. 11, $N_1$ input layer nodes 108A1 are shown as an example of the plurality of front-stage layer nodes 107A, and $N_2$ middle layer nodes 108B1 and $N_3$ output layer nodes 108C1 are shown as an example of the plurality of back-stage layer nodes 109A.

Each of the plurality of input layer nodes 108A1 outputs a test playback signal input from a corresponding storage element 92A1 among the plurality of storage elements 92A1 to the middle layer 108B. The plurality of middle layer nodes 108B1 convert middle layer values obtained as the composite value described above, based on the product sum of the test playback signal input from the plurality of input layer nodes 108A1 and middle layer coupling weights and using an activation function (for example, sigmoid function shown in the following formula (3)) to generate the converted values described above and output the converted values to the output layer 108C. The output layer 108C outputs as the neural network signal the output layer value obtained as the back-stage layer value described above, based on the product sum of the converted values input from the middle layer 108B and the output layer coupling weights. The neural network signal output from the output layer 108C is a signal regarding the test playback signal first input among the plurality of test playback signals stored in the plurality of storage elements 92A1, that is, the test playback signal being stored in the terminal-end storage element E1. The middle layer coupling weights and the output layer coupling weights are determined by the learning performed on the neural network 108 to minimize the error between the neural network signal and the teaching data 110.

The middle layer values are values based on the product sum of the test playback signal and the middle layer coupling weights, and based on the threshold value (refer to formula (4) described below). The threshold value used for the product sum between the test playback signal and the middle layer coupling weight is a value to be subtracted from the product sum of the test playback signal and the middle layer coupling weights. The threshold value used for the product sum of the test playback signal and the middle layer coupling weights is determined by the learning performed on the neural network 108 to reduce the non-linear distortion. The neural network signal is a value based on the product sum of the converted values input from the middle layer 108B and the output layer coupling weights, and based on the threshold value (refer to formula (4) described below). The threshold value used for the product sum of the converted value and the output layer coupling weight is a value to be subtracted from the product sum of the converted values and the output layer coupling weights. The threshold value used for the product sum of the converted value and the output layer coupling weight is determined by the learning performed on the neural network 108 to reduce the non-linear distortion.

As described above, the neural network signal is the signal regarding the test playback signal input first among the plurality of test playback signals stored in the plurality of storage elements 92A1. That is, the neural network signal is the signal regarding the test playback signal stored in the terminal-end storage element E1. The signal regarding the test playback signal first input among the plurality of test playback signals stored in the plurality of storage elements 92A1 is an example of "value related to the playback signal first input among the plurality of playback signals stored in the plurality of delay elements" according to the technology of the disclosure. The neural network signal is an example of the "back-stage layer value" according to the technology of the disclosure.

In the following formulas (2) to (8), the delay time is calculated by the following formula (2) in a case where "m" is a natural number of one to three, "k" is a natural number of one to $N_m$, and "j" is one to $N_{m-1}$. The test playback signal, the real-time playback signal, the back-stage layer coupling weight, the composite value, the activation function, the converted value, the back-stage layer value, the middle layer coupling weight, the middle layer value, the output layer coupling weight, the neural network signal, and the waveform equalized playback signal is represented by the variables indicated by the following formulas (3) and (4). In the following, in a case where it is not necessary to distinguish between the back-stage layer coupling weight, the middle layer coupling weight, and the output layer coupling weight, they are simply referred to as "coupling weight". The coupling weight and the threshold value are examples of the optimization variables and are used for optimizing the neural network 108.

Formula 2

$$D = \exp(-j2\pi f T_c) \qquad (2)$$

$D$ : Delay time $f$ : Reference clock frequency $T_c$ : Bit interval

Formula 3

$$y_k^{(m)} = \begin{cases} x_k, & m = 1 \\ \dfrac{1}{1 + \exp(-u_k^{(2)})}, & m = 2 \\ u_k^{(3)}, & m = 3 \end{cases} \qquad (3)$$

$$u_k^{(m)} = \sum_{j=1}^{N_{m-1}} w_{kj}^{(m)} y_j^{(m-1)} - \theta_k^{(m)} \qquad (4)$$

$x_k$: test signal (real-time signal)

$w_{kj}^{(m)}$: coupling load between k-th node of m-th layer and j-th node of (m−1)-th layer $\theta_k^{(m)}$: offset value (threshold value) of k-th node of m-th layer $u_k^{(m)}$: example of composite value $$\dfrac{1}{1 + \exp(-u_k^{(2)})}:$$

sigmoid function (example of activation function)

Figure 12:
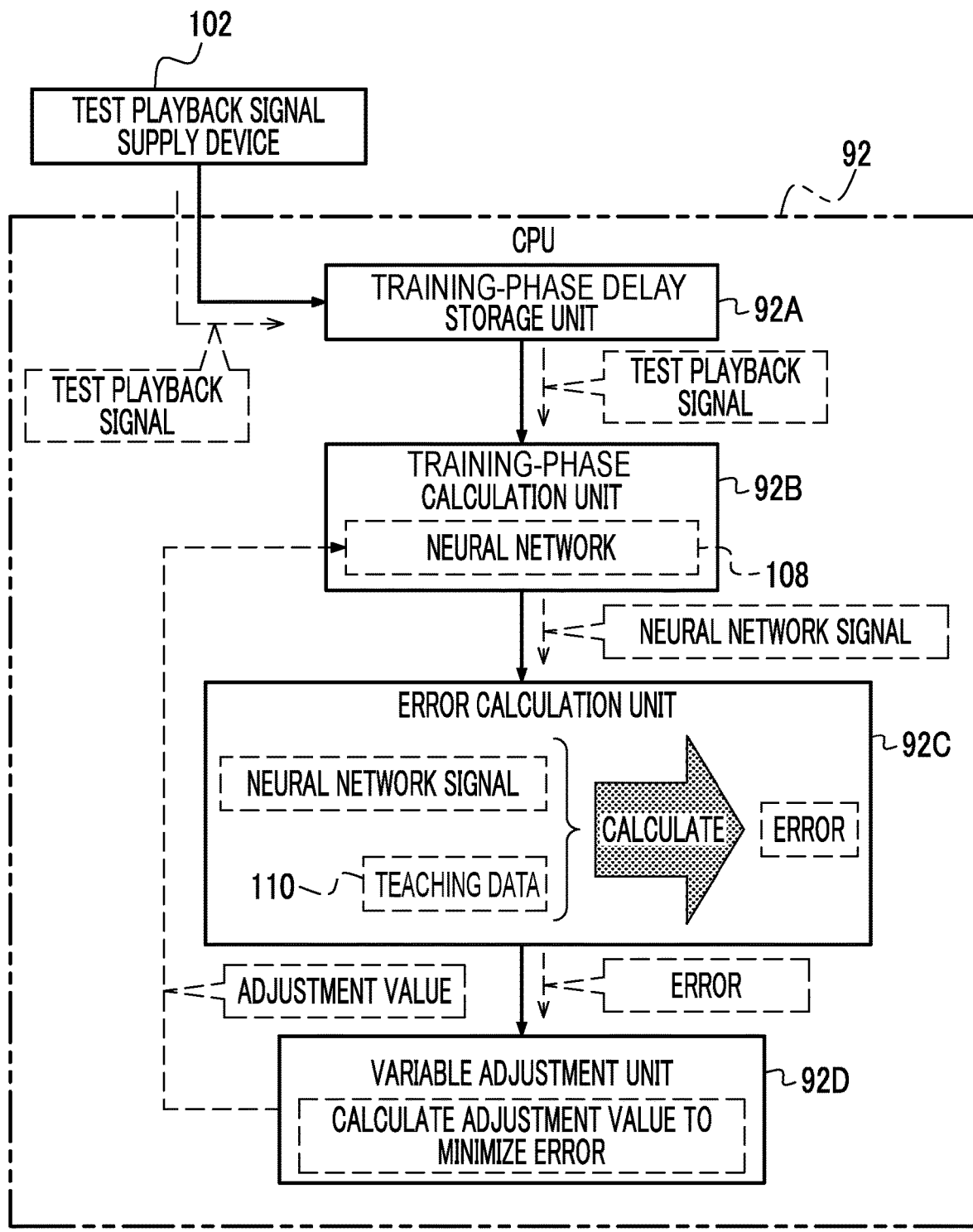
FIG. 12 is a block diagram showing an example of relevant functions of the CPU in the training phase of the neural network according to the first embodiment.

$y_k^{(m)}$: output value of m-th layer $y_k^{(m)}$ at m=2: example of interlayer value $y_k^{(m)}$ at m=3: example of neural network signal (waveform equalized playback signal)_post-stage layer value and output layer value $w_{kj}^{(m)}$ at m=2: example of post-stage layer coupling load and interlayer coupling load $w_{kj}^{(m)}$ at m=3: example of post-stage layer coupling load and post-stage layer coupling load $y_j^{(m-1)}$: example of converted value As shown in FIG. 12 as an example, the training phase calculation unit 92B outputs the neural network signal from the output layer 108C of the neural network 108 to the error calculation unit 92C as the calculation result. The error calculation unit 92C calculates the calculation result by the training phase calculation unit 92B, that is, the error between the neural network signal input from the output layer 108C of the neural network 108 and the teaching data 110, and outputs the calculated error to the variable adjustment unit 92D. The error is calculated by the following formula (5).

Formula 4

$$E = \tfrac{1}{2}\{\overline{y} - y_1^{(3)}\}^2 \quad (5)$$

E: error (example of deviation amount)
$\overline{y}$: teacher data
$y_1^{(3)}$: example of neural network signal (waveform equalized playback signal)_post-stage layer value and output layer value The variable adjustment unit 92D adjusts the optimization variable by using an error back propagation method so as to minimize the error calculated by the error calculation unit 92C. Therefore, the variable adjustment unit 92D calculates an adjustment value used for adjusting the optimization variable, that is, an amount of change in the optimization variable according to the following formulas (6) and (7). Specifically, an adjustment value of the coupling weight is calculated by formula (6), and an adjustment value of the threshold value is calculated by formula (7).

Formula 5

$$\Delta \omega_{kj}^{(m)(m-1)} = \alpha^{(m)(m-1)} \delta_k^{(m)} y_j^{(m-1)}, \, m = 2, 3 \quad (6)$$

$$\Delta \theta_k^{(m)} = \beta^{(m)(m-1)} \delta_k^{(m)}, \, m = 2, 3 \quad (7)$$

$$\delta_k^{(m)} = \begin{cases} \overline{y} - y_1^{(3)}, \\ \delta_1^{(3)} \omega_{1k}^{(3)} y_k^{(2)}(1 - y_k^{(2)}), \, m = 2 \end{cases} \quad (8)$$

$\Delta \omega_{kj}^{(m)(m-1)}$: adjustment value of coupling load (change amount of coupling load)
$\Delta \theta_k^{(m)}$: adjustment value of threshold value (change amount of threshold value)
$\alpha^{(m)(m-1)}$: coefficient determining learning speed of coupling load between m-th layer and (m−1)-th layer
$\beta^{(m)(m-1)}$: coefficient determining learning speed of threshold value between m-th layer and (m−1)-th layer The variable adjustment unit 92D adjusts the coupling weight of the neural network 108 using the adjustment value calculated from formula (6) and adjusts the threshold value of the neural network 108 using the adjustment value calculated from formula (7) to optimize the neural network 108. The neural network 108 is learned by being optimized by the variable adjustment unit 92D for each reading environment condition. As shown in FIG. 13 as an example, the neural network 108 optimized by the variable adjustment unit 92D for each reading environment condition is stored, as the trained model 82, by the training phase calculation unit 92B for each reading environment condition in the storage 96.

Next, the operation phase will be described with reference to FIGS. 14 and 15.

As shown in FIG. 14 as an example, the trained model 82 is migrated from the storage 96 of the computer 90 and stored in the storage 74. The migration of the trained model 82 from the computer 90 to the equalizer 60 is executed according to the instruction received by the UI system device 26 in a state where the computer 90 is connected to the external I/F 28 (refer to FIG. 1), for example. Specifically, the trained model 82 is selected from the storage 96 of the computer 90 according to the instruction received by the UI system device 26, and the selected trained model 82 is stored in the storage 74 by the CPU 70 of the equalizer 60.

A trained model in which a plurality of trained models 82 are integrated may be stored in the storage 74 and be used by the CPU 70. The integration of the plurality of trained models 82 indicates, for example, that the plurality of trained models 82 are combined by averaging the optimization variables corresponding to each other among the plurality of trained models 82. In this case, for example, the CPU 70 may integrate a trained model 82 of the reading environment condition including a running speed condition of 3 m/s, a trained model 82 of the reading environment condition including a running speed condition of 4 m/s, and a trained model 82 of the reading environment condition including a running speed condition of 5 m/s to generate a trained model corresponding to the running speeds of 3 m/s to 5 m/s and to store the generated model in the storage 74.

The CPU 70 reads out the waveform equalization execution program 80 from the storage 74 and executes the read-out waveform equalization execution program 80 to operate as the operation phase delay storage unit 70A and the operation phase calculation unit 70B.

The operation phase delay storage unit 70A acquires the real-time playback signal by one bit each from the phase synchronization circuit 58, and stores the real-time playback signal in a second storage element group (for example, the plurality of storage elements in the internal memory 71 shown in FIG. 7) in the acquisition order. That is, each time the real-time playback signal is acquired by one bit each from the phase synchronization circuit 58, the operation phase delay storage unit 70A stores the real-time playback signals in the second storage element group in time-series in the acquisition order. The real-time playback signal is stored in the second storage element group by the FIFO method. The operation phase calculation unit 70B performs the calculation using the real-time playback signals stored in time-series by the operation phase delay storage unit 70A and the trained model 82 in the storage 74.

As shown in FIG. 15 as an example, the operation phase delay storage unit 70A has a plurality of storage elements 70A1 as the second storage element group. The plurality of storage elements 70A1 are formed by, for example, the internal memory 71. Each of the plurality of storage elements 70A1 is the delay element, and the real-time playback signal is input to the plurality of storage elements 70A1 with the delay by the delay time each. The plurality of storage elements 70A1 store the real-time playback signals in time-series. That is, each time the real-time playback signal for one bit is input, each storage element 70A1 stores the real-time playback signal with the delay by one bit each. In the example shown in FIG. 15, the plurality of storage elements 70A1 are connected in series, and the real-time playback signal is stored in each storage element 70A1 with the delay by one bit each. The real-time playback signal is stored in the plurality of storage elements 70A1 in the FIFO method. The real-time playback signal stored in the storage element 70A1 on a terminal end (hereinafter, also referred to as "terminal-end storage element E2") is erased from the storage element 70A1 as a new real-time playback signal for one bit is input to the operation phase delay storage unit 70A.

The trained model 82 includes the front-stage layer 107 having the plurality of front-stage layer nodes 107A corresponding to the plurality of storage elements 70A1 and the back-stage layer 109 having the plurality of back-stage layer nodes 109A. Each of the plurality of storage elements 70A1 outputs the input real-time playback signal to a corresponding front-stage layer node 107A among the plurality of front-stage layer nodes 107A. Each of the plurality of front-stage layer nodes 107A outputs the real-time playback signal input from the corresponding storage element 70A1 among the plurality of storage elements 70A1 to the back-stage layer 109. The back-stage layer 109 converts the composite value obtained based on the product sum of the real-time playback signal ("x" in the example shown in FIG. 15) input from the plurality of front-stage layer nodes 107A and the back-stage layer coupling weight ("w" in the example shown in FIG. 15) by the activation function. The back-stage layer 109 outputs the back-stage layer value ("waveform equalized playback signal" in the example shown in FIG. 15) based on the converted value obtained by converting the composite value by the activation function. The back-stage layer value output from the back-stage layer 109 is a value regarding the real-time playback signal stored in the terminal-end storage element E2.

In the example shown in FIG. 15, the input layer 108A is shown as an example of the front-stage layer 107, and the middle layer 108B and the output layer 108C are shown as an example of the back-stage layer 109. The input layer 108A has the plurality of input layer nodes 108A1. The middle layer 108B has the plurality of middle layer nodes 108B1. The output layer 108C has the output layer node 108C1. In the example shown in FIG. 15, $N_1$ input layer nodes 108A1 are shown as an example of the plurality of front-stage layer nodes 107A, and $N_2$ middle layer nodes 108B1 and $N_3$ output layer nodes 108C1 are shown as an example of the plurality of back-stage layer nodes 109A.

Each of the plurality of input layer nodes 108A1 outputs the real-time playback signal input from the corresponding storage element 70A1 among the plurality of storage elements 70A1 to the middle layer 108B. The plurality of middle layer nodes 108B1 convert middle layer values obtained, as the composite value described above, based on the product sum of the real-time playback signals input from the plurality of input layer nodes 108A1 and an middle layer coupling weight by the activation function (for example, sigmoid function shown in the following formula (3)) to generate the converted value described above and output the converted value to the output layer 108C. The middle layer value is a value based on the product sum of the real-time playback signal and the middle layer coupling weight and the threshold value (refer to formula (4)). Specifically, as shown in formula (4), the middle layer value is a value to be subtracted from the product sum of the real-time playback signal and the middle layer coupling weight. The output layer 108C outputs the output layer value obtained, as the back-stage layer value described above, based on the product sum of the converted value input from the middle layer 108B and the output layer coupling weight as the waveform equalized playback signal.

The waveform equalized playback signal output from the output layer 108C is a signal regarding a real-time playback signal first input among the plurality of real-time playback signals stored in the plurality of storage elements 70A1, that is, the real-time playback signal being stored in the terminal-end storage element E2. The signal regarding the real-time playback signal first input among the plurality of real-time playback signals stored in the plurality of storage elements 70A1 is an example of "value related to the playback signal first input among the plurality of playback signals stored in the plurality of delay elements" according to the technology of the disclosure. The waveform equalized playback signal is an example of the "back-stage layer value" according to the technology of the disclosure.

The waveform equalized playback signal is a value based on the product sum of the converted value input from the middle layer 108B and the output layer coupling weight and the threshold value (refer to formula (4)). The threshold value used for the product sum of the converted value and the output layer coupling weight is a value obtained by subtracting the product sum of the converted value and the output layer coupling weight (refer to formula (4)).

Next, an action of the magnetic tape drive 10 will be described.

First, learning execution processing executed by the CPU 92 of the computer 90 will be described with reference to FIG. 16. The learning execution processing is executed by the CPU 92 of the computer 90 according to the learning execution program 106 in a case where an instruction to start the execution of the learning execution processing is received by the UI system device 104 (refer to FIG. 8). In the following, for convenience of description, the description will be made on the premise that the test playback signal is supplied for one bit each from the test playback signal supply device 102 to the training phase delay storage unit 92A (refer to FIGS. 9 to 12).

Figure 16:
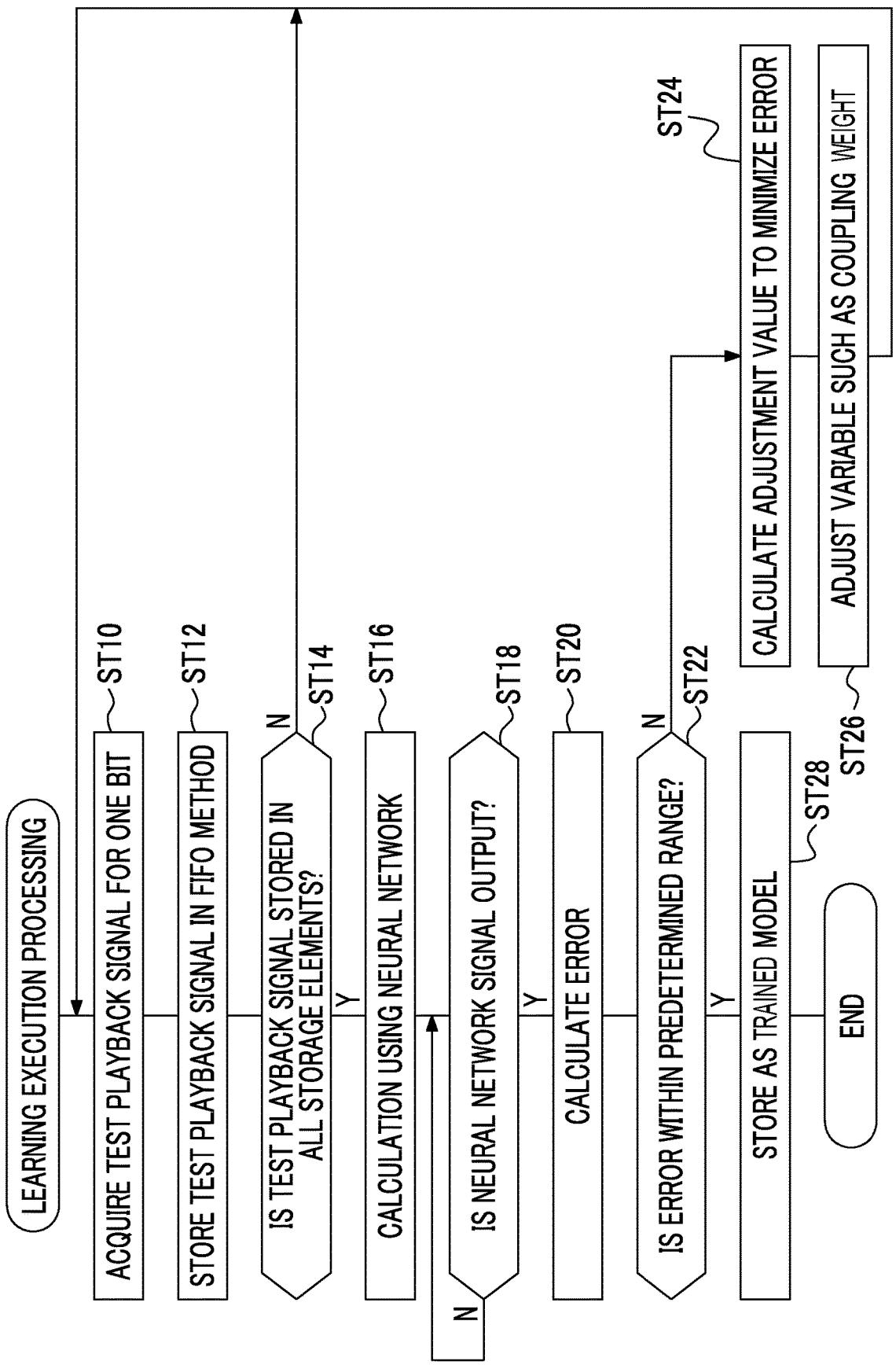
FIG. 16 is a flowchart showing an example of a flow of learning execution processing according to the first embodiment.

In the learning execution processing shown in FIG. 16, first, in step ST10, the training phase delay storage unit 92A acquires the test playback signal for one bit from the test playback signal supply device 102, and then the learning execution processing proceeds to step ST12.

In step ST12, the training phase delay storage unit 92A stores the test playback signal acquired in step ST10 in the plurality of storage elements 92A1 in the FIFO method and in time-series, and then the learning execution processing proceeds to step ST14.

In step ST14, the training phase delay storage unit 92A determines whether or not the test playback signal is stored in all the storage elements 92A1. In a case where the test playback signal is not stored in all the storage elements 92A1 in step ST14, negative determination is made, and the learning execution processing proceeds to step ST10. In a case where the test playback signal is stored in all the storage elements 92A1 in step ST14, affirmative determination is made, and the learning execution processing proceeds to step ST16.

In step ST16, the training phase calculation unit 92B performs the calculation using the test playback signal stored in the plurality of storage elements 92A1 in time-series by the training phase delay storage unit 92A and the neural network 108 in the storage 96, and then the learning execution processing proceeds to step ST18.

In step ST18, the error calculation unit 92C determines whether or not the neural network signal is output from the training phase calculation unit 92B. In a case where the neural network signal is not output from the training phase calculation unit 92B in step ST18, negative determination is made, and the determination in step ST18 is performed again. In a case where the neural network signal is output from the training phase calculation unit 92B in step ST18, affirmative determination is made, and the learning execution processing proceeds to step ST20.

In step ST20, the error calculation unit 92C calculates the error between the neural network signal input from the training phase calculation unit 92B and the teaching data 110 in the storage 96, and then the learning execution processing proceeds to step ST22.

In step ST22, the variable adjustment unit 92D determines whether or not the error calculated in step ST20 is within a predetermined range. The predetermined range indicates a range generally allowed in the technical field to which the technology of the disclosure belongs. The predetermined range may be a fixed value or a variable value that is changed according to a given condition (for example, content of the instruction received by the UI system device 104). In a case where the error calculated in step ST20 is within the predetermined range in step ST22, affirmative determination is made, and the learning execution processing proceeds to step ST28. In a case where the error calculated in step ST20 is outside the predetermined range in step ST22, negative determination is made, and the learning execution processing proceeds to step ST24.

In step ST24, the variable adjustment unit 92D calculates the adjustment value for adjusting the optimization variable so as to minimize the error calculated in step ST20, and then the learning execution processing proceeds to step ST26.

In step ST26, the variable adjustment unit 92D adjusts the optimization variable such as the coupling weight using the adjustment value calculated in step ST28, and then the learning execution processing proceeds to step ST10.

In step ST28, the training phase calculation unit 92B stores, in the storage 96, the latest neural network 108 used in the calculation in step ST16 as the trained model 82, and then the learning execution processing ends.

Next, the waveform equalization execution processing executed by the CPU 70 of the equalizer 60 will be described with reference to FIG. 17. The waveform equalization execution processing shown in FIG. 17 is executed by the CPU 70 of the equalizer 60 according to the waveform equalization execution program 80 in a case where the instruction to start the execution of the waveform equalization execution processing is received by the UI system device 26 (refer to FIG. 1).

Figure 17:
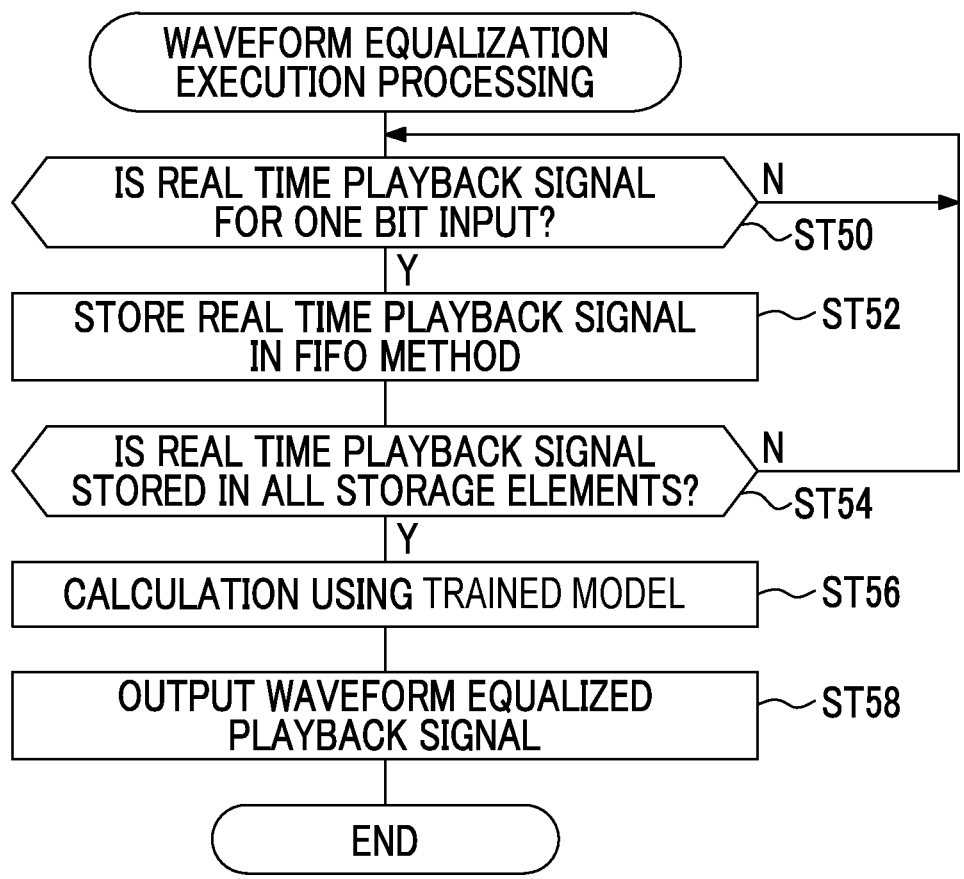
FIG. 17 is a flowchart showing an example of a flow of waveform equalization execution processing according to the first embodiment.

A flow of the waveform equalization execution processing shown in FIG. 17 is an example of a "processing method of the signal processing device" and an "operation method of the magnetic tape reading apparatus" according to the technology of the disclosure. In the following, for convenience of description, the description will be made on the premise that the real-time playback signal is supplied for one bit each from the phase synchronization circuit 58 to the operation phase delay storage unit 70A (refer to FIGS. 14 and 15). In the following, for convenience of description, the description will be made on the premise that the trained model 82 obtained by executing the learning execution processing is already stored in the storage 74 of the equalizer 60.

In the waveform equalization execution processing shown in FIG. 17, first, in step ST50, the operation phase delay storage unit 70A acquires the real-time playback signal for one bit from the phase synchronization circuit 58, and then the waveform equalization execution processing proceeds to ST52.

In step ST52, the operation phase delay storage unit 70A stores the real-time playback signal acquired in step ST50 in the plurality of storage elements 70A1 in the FIFO method and in time-series, and then the waveform equalization execution processing proceeds to step ST54.

In step ST54, the operation phase delay storage unit 70A determines whether or not the real-time playback signal is stored in all the storage elements 70A1. In a case where the real-time playback signal is not stored in all the storage elements 70A1 in step ST54, negative determination is made, and the waveform equalization execution processing proceeds to step ST50. In a case where the real-time playback signal is stored in all the storage elements 70A1 in step ST54, affirmative determination is made, and the waveform equalization execution processing proceeds to step ST56.

In step ST56, the operation phase calculation unit 70B performs the calculation using the real-time playback signal stored in the plurality of storage elements 70A1 in time-series by the operation phase delay storage unit 70A and the trained model 82 in the storage 74 to generate the waveform equalized playback signal regarding the real-time playback signal stored in the terminal-end storage element E2. Then, the waveform equalization execution processing proceeds to step ST58.

In step ST58, the operation phase calculation unit 70B outputs the waveform equalized playback signal generated in step ST56 to the decoder 62, and then the waveform equalization execution processing ends.

Figure 18:
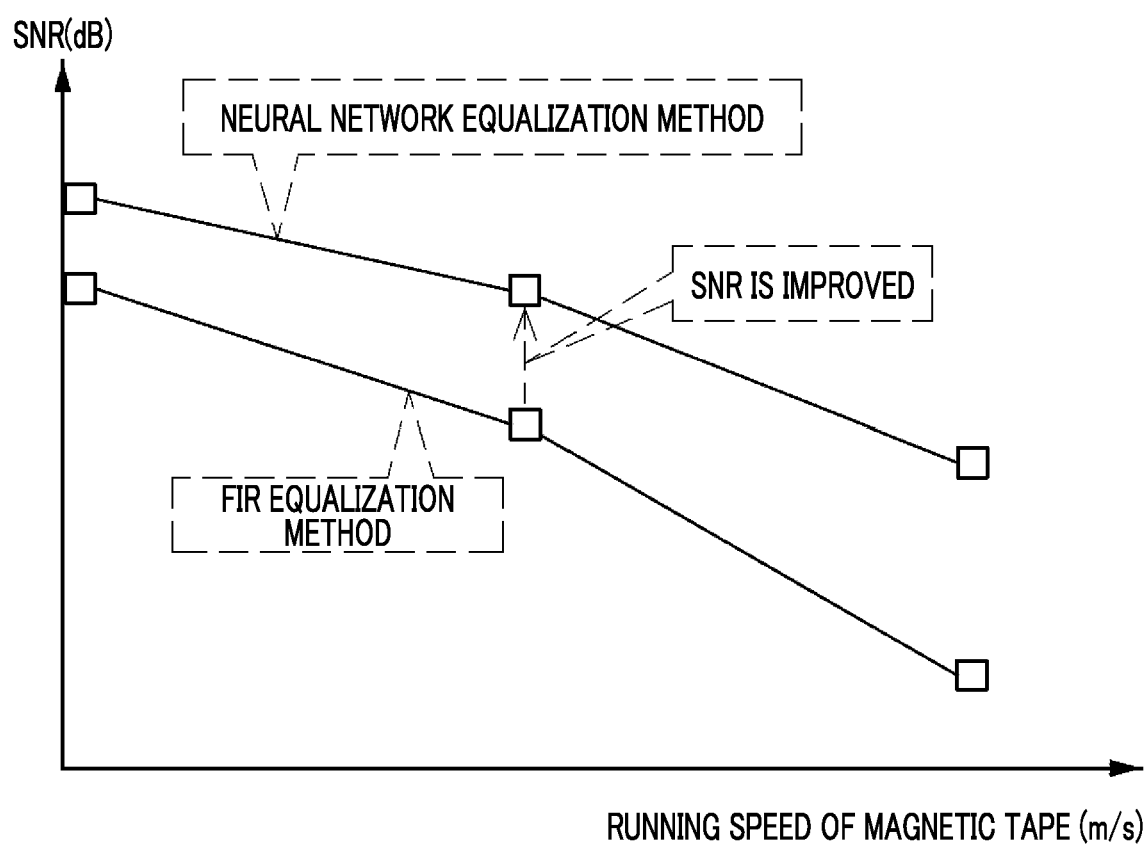
FIG. 18 is a graph showing an example of a result of comparing an FIR equalization method SNR and a neural network equalization method SNR.

Meanwhile, generally, a waveform equalization method using a conventionally known linear filter is known as a waveform equalization method for the real-time playback signal. The FIR filter is known as the linear filter. FIG. 18 shows an example of a result of comparison between an SNR of the signal obtained by performing the waveform equalization of the real-time playback signal by an FIR equalization method (hereinafter, also referred to as "FIR equalization method SNR") and an SNR of the signal obtained by performing the waveform equalization of the real-time playback signal by a neural network equalization method (hereinafter, also referred to as "neural network equalization method SNR"). The FIR equalization method indicates a waveform equalization method using the conventionally known FIR filter. The neural network equalization method indicates a waveform equalization method using the trained model 82 obtained by the learning performed on the neural network 108 to reduce the non-linear distortion according to the technology of the disclosure (for example, waveform equalization method using the waveform equalization execution processing shown in FIG. 17). In a graph shown in FIG. 18, the horizontal axis is the running speed of the magnetic tape MT, and the vertical axis is the SNR.

As shown in FIG. 18 as an example, both the FIR equalization method SNR and the neural network equalization method SNR decrease as the running speed of the magnetic tape MT increases. However, the neural network equalization method SNR is higher than the FIR equalization method SNR regardless of the running speed of the magnetic tape MT. In the example shown in FIG. 18, a ratio of the neural network equalization method SNR to the FIR equalization method SNR increases as the running speed of the magnetic tape MT increases. That is, it can be read that the waveform equalization of the real-time playback signal by the neural network equalization method contributes to the improvement in the SNR rather than the waveform equalization of the real-time playback signal by the FIR equalization method, from the example shown in FIG. 18.

Figure 19:
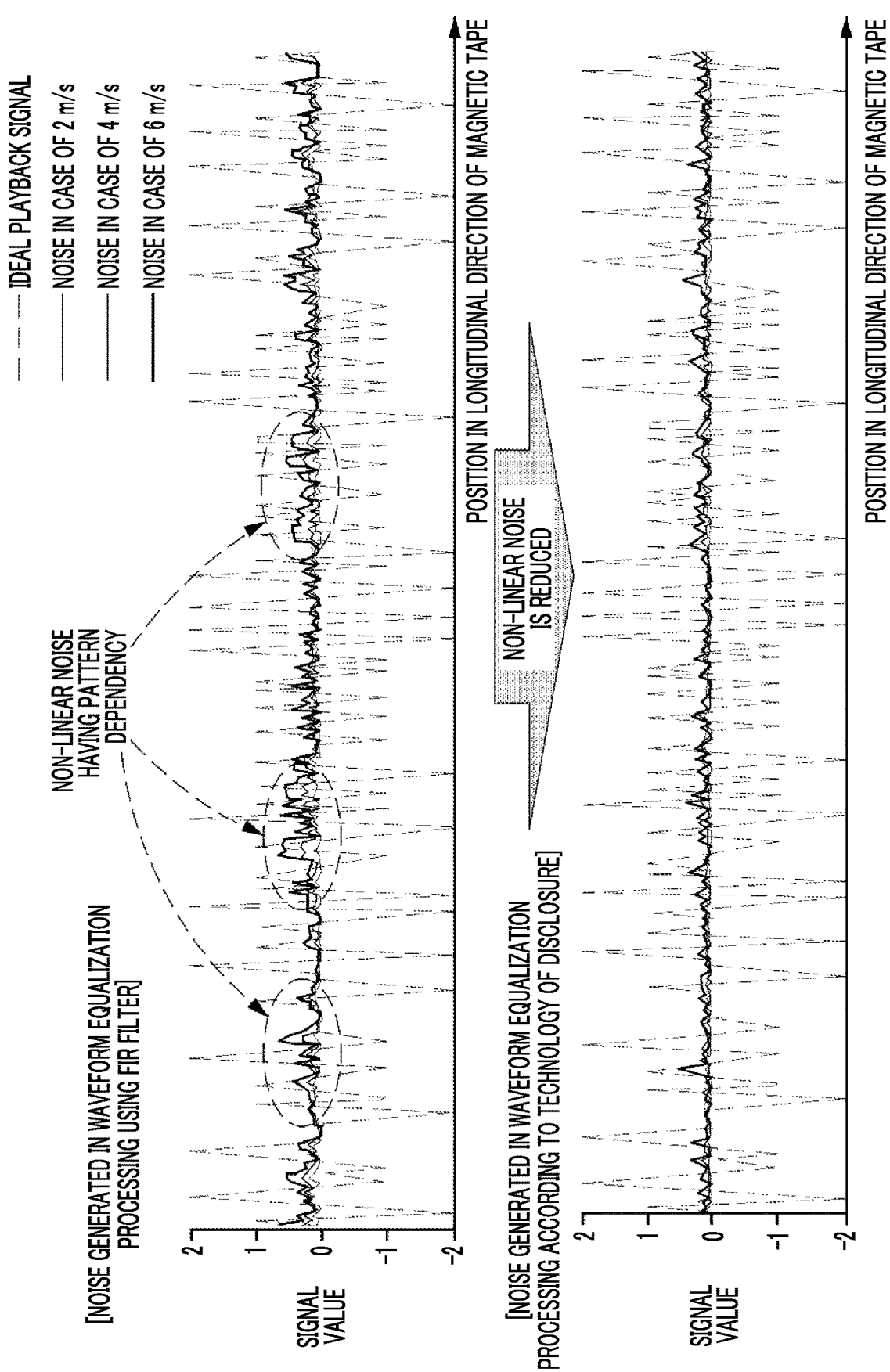
FIG. 19 is a graph showing an example of noise generated in waveform equalization processing using an FIR filter and a graph showing an example of noise generated in waveform equalization processing according to the technology of the disclosure.

FIG. 19 shows an example of a result of comparison between noise generated by performing the waveform equalization processing using the FIR filter on the real-time playback signal in a case where the running speed of the magnetic tape MT is 6 m/s, 4 m/s, and 2 m/s and noise generated by performing the waveform equalization processing (for example, waveform equalization execution processing shown in FIG. 17) by the technology of the disclosure on the real-time playback signal in the case where the running speed of the magnetic tape MT is 6 m/s, 4 m/s, and 2 m/s. In a graph shown in FIG. 19, the horizontal axis is the position of the magnetic tape MT in the longitudinal direction, and the vertical axis is the signal value of the real-time playback signal output from the phase synchronization circuit 58.

As shown in FIG. 19 as an example, in the waveform equalization processing using the FIR filter, the non-linear noise having dependency on a specific arrangement of the data recorded on the magnetic tape MT, that is, a specific recording pattern is generated, regardless of the miming speed of the magnetic tape MT. On the other hand, in the waveform equalization processing by the technology of the disclosure, the non-linear noise having dependency on the specific recording pattern is reduced as compared with the waveform equalization processing using the FIR filter.

As described above, in the magnetic tape drive 10, the equalizer 60 performs the waveform equalization of the real-time playback signal. The waveform equalization is performed using the trained model 82 obtained by the learning performed on the neural network 108 to reduce the non-linear distortion generated according to the reading environment condition (refer to FIG. 10). Therefore, with this configuration, it is possible to reduce the non-linear distortion generated in the real-time playback signal as compared with the case where the waveform equalization of the real-time playback signal is performed by using the linear filter. In the present first embodiment, as illustrated in FIG. 5, an element-specific signal processing device 50A is provided for each of the plurality of reading elements 16A, and waveform equalization of the playback signal sequence is performed by the equalizer 60 for each of the reading elements 16A. The present configuration is accordingly able to reduce non-linear distortion in the plurality of playback signal sequence in comparison to a case in which waveform equalization of the plurality of playback signal sequence is performed using a linear filter.

In the magnetic tape drive 10, the waveform equalization is performed using the trained model 82 obtained by the learning performed on the neural network 108 to reduce the non-linear distortion generated according to the reading head condition. Therefore, with this configuration, it is possible to reduce the non-linear distortion generated in the real-time playback signal due to the individual difference in the reading head 16 as compared with the case where the waveform equalization of the real-time playback signal is performed by using the linear filter.

In the magnetic tape drive 10, the waveform equalization is performed using the trained model 82 obtained by the learning performed on the neural network 108 to reduce the non-linear distortion generated according to the magnetic tape condition. Therefore, with this configuration, it is possible to reduce the non-linear distortion generated in the real-time playback signal due to the individual difference in the magnetic tape MT as compared with the case where the waveform equalization of the real-time playback signal is performed by using the linear filter.

In the magnetic tape drive 10, the waveform equalization is performed using the trained model 82 obtained by the learning performed on the neural network 108 to reduce the non-linear distortion generated according to the running speed condition. Therefore, with this configuration, it is possible to reduce the non-linear distortion generated in the real-time playback signal due to the running speed of the magnetic tape MT as compared with the case where the waveform equalization of the real-time playback signal is performed by using the linear filter.

In the magnetic tape drive 10, the waveform equalization is performed using the trained model 82 obtained by the learning performed on the neural network 108 to reduce the non-linear distortion generated according to the A/D converter condition. Therefore, with this configuration, it is possible to reduce the non-linear distortion generated in the real-time playback signal due to the individual difference in the A/D converter 54 as compared with the case where the waveform equalization of the real-time playback signal is performed by using the linear filter.

In the magnetic tape drive 10, the waveform equalization of the real-time playback signal is performed by the equalizer 60 using the trained model 82 as a learned non-linear filter to reduce the non-linear distortion. Therefore, with this configuration, it is possible to reduce the non-linear distortion generated in the real-time playback signal as compared with the case where the waveform equalization of the real-time playback signal is performed by using the linear filter.

In the magnetic tape drive 10, the trained model 82 has the front-stage layer 107 and the back-stage layer 109. The front-stage layer 107 has a plurality of front-stage layer nodes corresponding to the plurality of storage elements 70A1. Each of the plurality of storage elements 70A1 outputs the input real-time playback signal to a corresponding front-stage layer node 107A among the plurality of front-stage layer nodes 107A. Each of the plurality of front-stage layer nodes 107A outputs the real-time playback signal input from the corresponding storage element 70A1 among the plurality of storage elements 70A1 to the back-stage layer 109. The back-stage layer 109 converts the composite value obtained based on the product sum of the real-time playback signals input from the plurality of front-stage layer nodes 107A and the back-stage layer coupling weight by the activation function. The back-stage layer coupling weight is determined by the learning performed on the neural network 108 to reduce the non-linear distortion. The back-stage layer 109 outputs the waveform equalized playback signal as the back-stage layer value based on the converted value obtained by converting the composite value by the activation function. Therefore, with this configuration, it is possible to reduce the non-linear distortion generated in the real-time playback signal as compared with the case where the waveform equalization of the real-time playback signal is performed by using the linear filter.

In the magnetic tape drive 10, the value obtained by subtracting the threshold value from the product sum of the converted value and the back-stage layer coupling weight is employed as the back-stage layer value. The threshold value used for the product sum of the converted value and the back-stage layer coupling weight is determined by the learning performed on the neural network 108 to reduce the non-linear distortion. Therefore, with this configuration, it is possible to reduce the non-linear distortion generated in the real-time playback signal with high accuracy as compared with the case where the back-stage layer value is determined without using the threshold value determined by the learning performed on the neural network 108 to reduce the non-linear distortion.

In the magnetic tape drive 10, the real-time playback signal is input to the plurality of storage elements 70A1 with the delay by the delay time each. The plurality of storage elements 70A1 are the plurality of delay elements in which the real-time playback signal is input with the delay by the delay time each. The waveform equalized playback signal output from the back-stage layer 109 as the back-stage layer value is the value regarding the real-time playback signal first input among the plurality of real-time playback signals stored in the plurality of storage elements 70A1, that is, the real-time playback signal being stored in the terminal-end storage element E2. Therefore, with this configuration, it is possible to obtain the waveform equalized playback signal corresponding to the real-time playback signal from the back-stage layer 109 in the order of the real-time playback signals input to the plurality of storage elements 70A1.

In the magnetic tape drive 10, the trained model 82 has the input layer 108A as the front-stage layer 107 and the middle layer 108B and the output layer 108C as the back-stage layer 109. The input layer 108A has the plurality of input layer nodes 108A1 as the plurality of front-stage layer nodes 107A. The middle layer 108B has the plurality of middle layer nodes 108B1 as the plurality of back-stage layer nodes 109A. The back-stage layer 109 has the output layer node 108C1 as the back-stage layer node 109A. Each of the plurality of input layer nodes 108A1 outputs the real-time playback signal input from the corresponding storage element 92A1 among the plurality of storage elements 92A1 to the middle layer 108B. The plurality of middle layer nodes 108B1 convert the middle layer value obtained as the composite value based on the product sum of the real-time playback signals input from the plurality of input layer nodes 108A1 and the middle layer coupling weight by the activation function to generate the converted value and to output the converted value to the output layer 108C. The middle layer coupling weight is determined by the learning performed on the neural network 108 to minimize the error between the neural network signal and the teaching data 110. The output layer 108C outputs the waveform equalized playback signal as the output layer value based on the product sum of the converted value input from the middle layer 108B and the output layer coupling weight. The output layer coupling weight is determined by the learning performed on the neural network 108 to minimize the error between the neural network signal and the teaching data 110. Therefore, with this configuration, it is possible to reduce the non-linear distortion generated in the real-time playback signal as compared with the case where the waveform equalization of the real-time playback signal is performed by using the linear filter.

In the magnetic tape drive 10, the value obtained by subtracting the threshold value from the product sum of the real-time playback signal and the middle layer coupling weight is employed as the middle layer value. The threshold value used for the product sum of the real-time playback signal and the middle layer coupling weight is determined by the learning performed on the neural network 108 to reduce the non-linear distortion. Therefore, with this configuration, it is possible to reduce the non-linear distortion generated in the real-time playback signal with high accuracy as compared with the case where the middle layer value is determined without using the threshold value determined by the learning performed on the neural network 108 to reduce the non-linear distortion.

Further, in the magnetic tape drive 10, the teaching data 110 is the ideal playback signal regarding the known data recorded on the learning magnetic tape in the recording pattern set in advance along the longitudinal direction of the learning magnetic tape. Therefore, with this configuration, it is possible to reduce the non-linear distortion generated in the real-time playback signal as compared with the case where the teaching data unrelated to the known data recorded in the recording pattern set in advance on the learning magnetic tape is used.

In the above first embodiment, the ideal playback signal regarding the known data recorded on the learning magnetic tape in the recording pattern set in advance along the longitudinal direction of the learning magnetic tape (hereinafter, also referred to as "first ideal playback signal") is exemplified as the teaching data 110, but the technology of the disclosure is not limited thereto. For example, an ideal playback signal derived by computer simulation (hereinafter, also referred to as "second ideal playback signal") may be employed. A signal obtained by combining the first ideal playback signal and the second ideal playback signal may be used as the teaching data 110. The combining of the first ideal playback signal and the second ideal playback signal indicates, for example, an average of the first ideal playback signal and the second ideal playback signal. As described above, the second ideal playback signal may be used as the teaching data 110, or the first ideal playback signal and the second ideal playback signal may be combined and used. Accordingly, it is possible to reduce the non-linear distortion generated in the real-time playback signal with high accuracy as compared with the case where the teaching data unrelated to both the first ideal playback signal and the second ideal playback signal is used.

Figure 20:
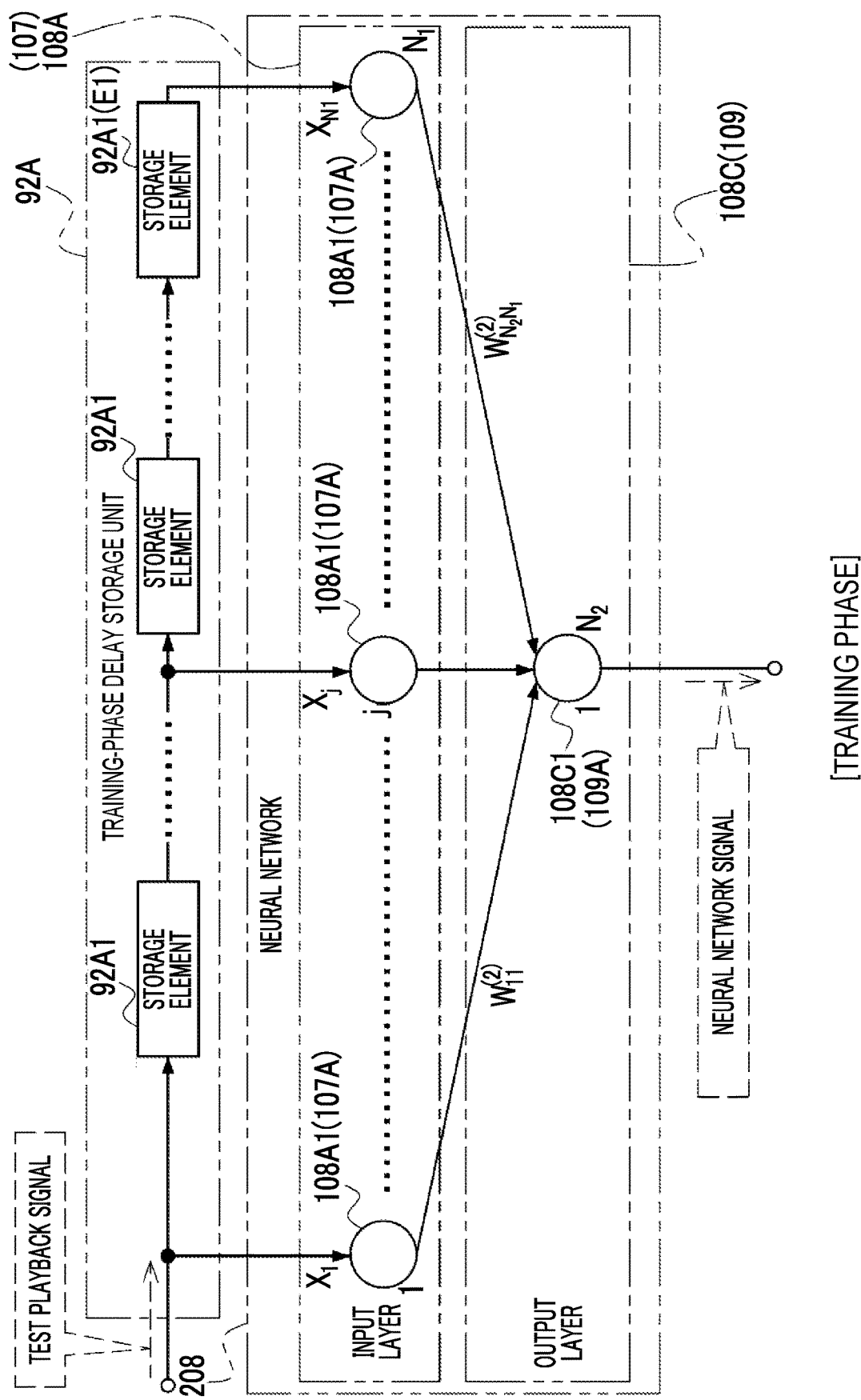
FIG. 20 is a conceptual diagram showing a first modification example of the hierarchical structure of the neural network according to the first embodiment.
Figure 21:
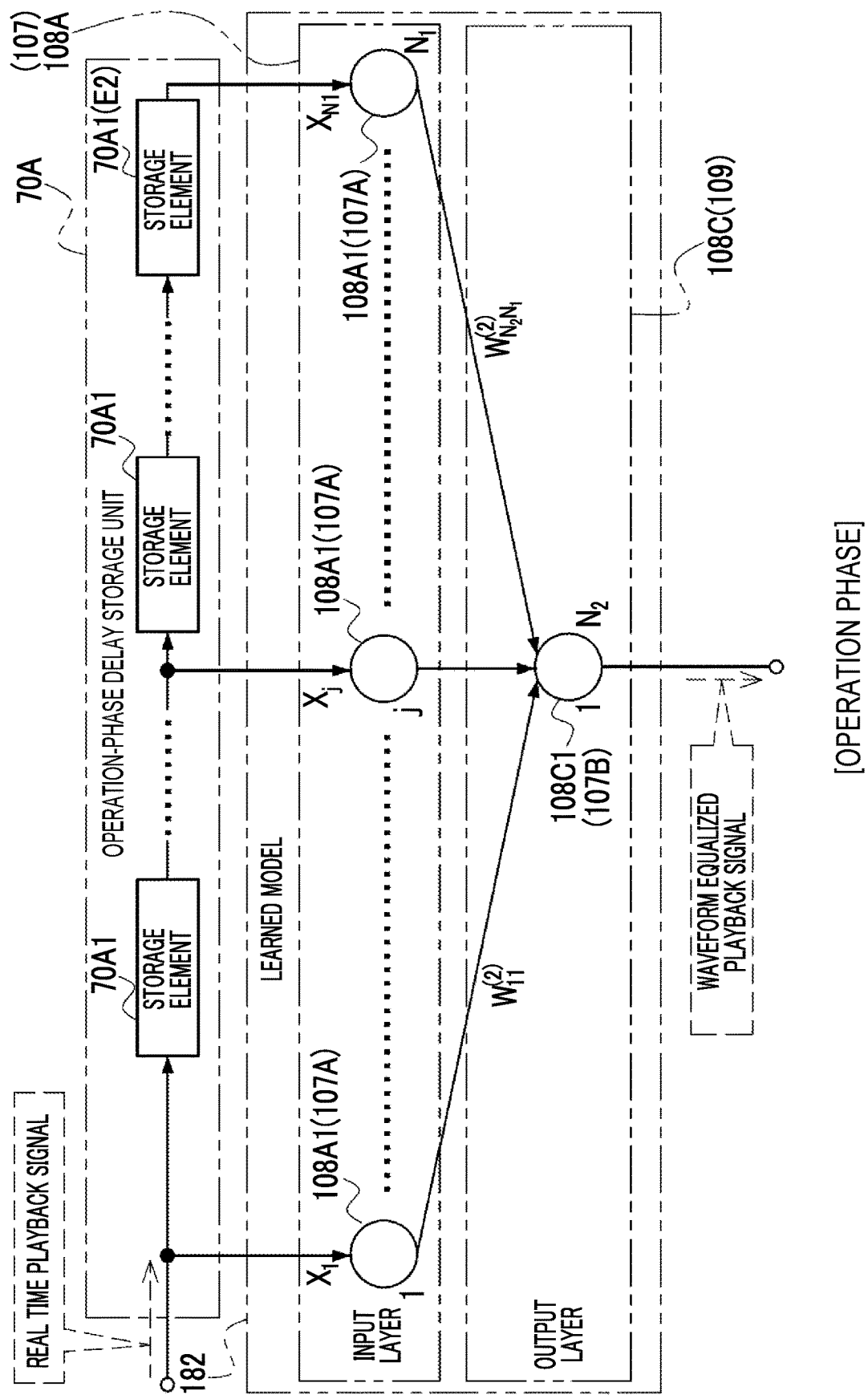
FIG. 21 is a conceptual diagram showing an example of a hierarchical structure of a trained model obtained by causing the neural network shown in FIG. 20 to train.

In the above first embodiment, the example in which each of the neural network 108 and the trained model 82 consists of three layers of the input layer 108A, the middle layer 108B, and the output layer 108C is described, but the technology of the disclosure is not limited thereto. For example, a neural network 208 may be applied instead of the neural network 108 in the training phase as shown in FIG. 20, and a trained model 182 may be applied instead of the trained model 82 in the operation phase as shown in FIG. 21. Each of the neural network 208 and the trained model 182 consists of two layers of the input layer 108A and the output layer 108C. It is possible to reduce the non-linear distortion generated in the real-time playback signal as compared with the case where the waveform equalization of the real-time playback signal is performed by using the linear filter as in the above first embodiment, even in a case where the waveform equalization of the real-time playback signal is performed using the neural network 208 and the trained model 182 configured in this way.

Figure 22:
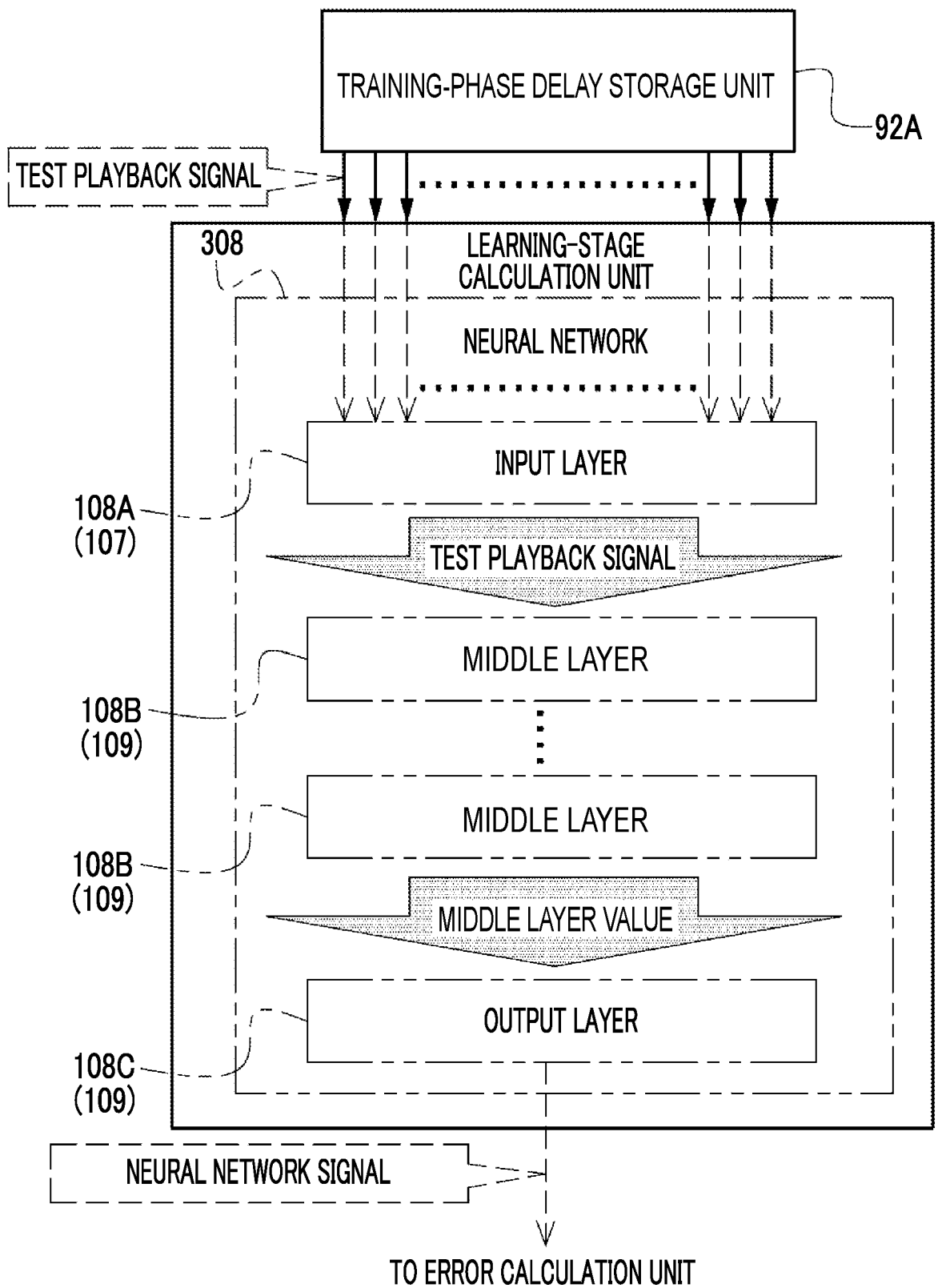
FIG. 22 is a conceptual diagram showing a second modification example of the hierarchical structure of the neural network according to the first embodiment.
Figure 23:
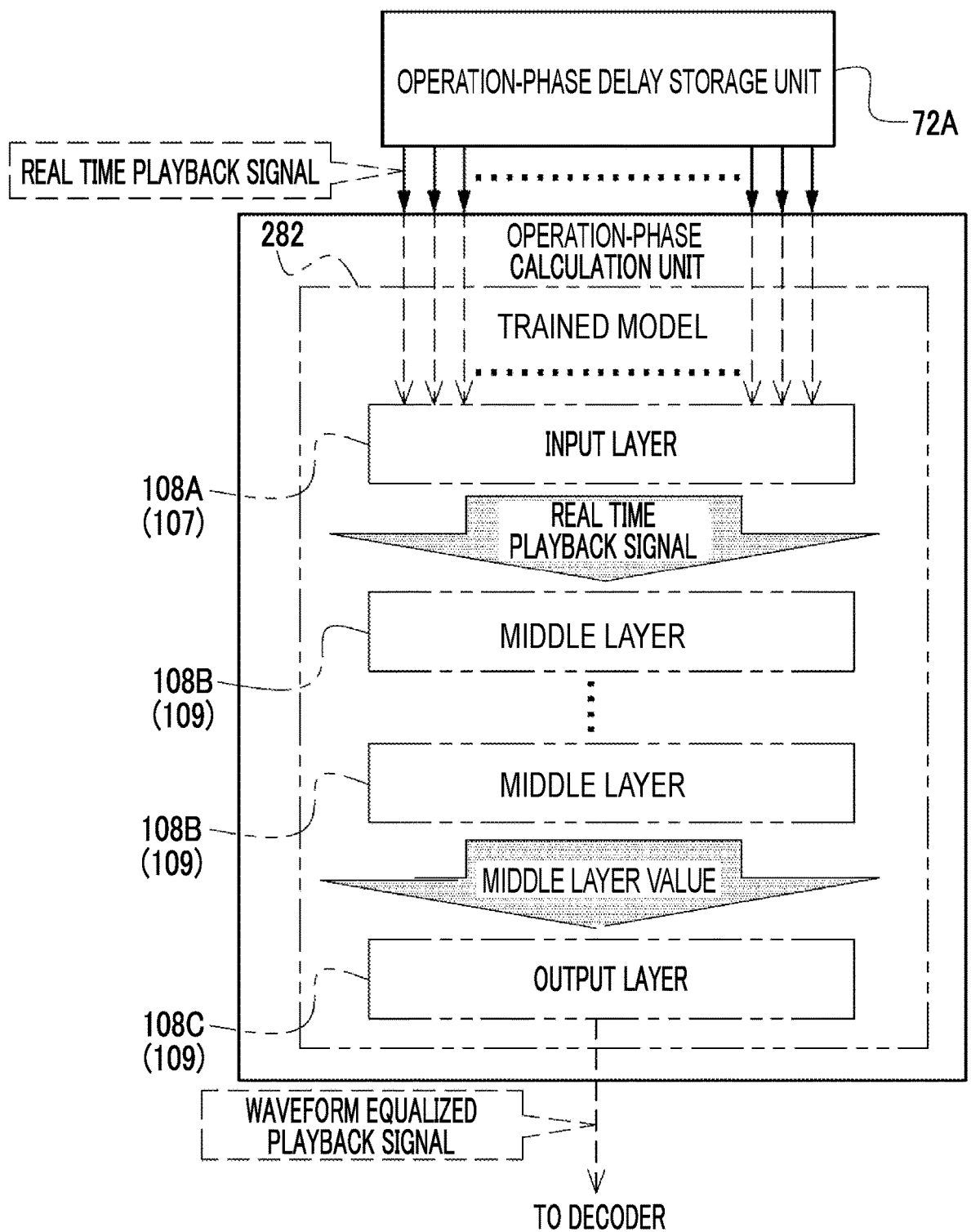
FIG. 23 is a conceptual diagram showing an example of a hierarchical structure of a trained model obtained by causing the neural network shown in FIG. 22 to learn.

In the above first embodiment, the case where the middle layer 108B is a single layer is described, but the technology of the disclosure is not limited thereto. For example, a neural network 308 having the plurality of middle layers 108B is applied instead of the neural network 108 in the training phase as shown in FIG. 22, and a trained model 282 having the plurality of middle layers 108B is applied instead of the trained model 82 in the operation phase as shown in FIG. 23. The number of layers of the middle layer 108B may be determined according to the number of nodes included in the input layer 108A and the number of nodes included in the output layer 108C.

In the above first embodiment, the example in which the output layer 108C outputs the waveform equalized playback signal regarding only the real-time playback signal stored in the terminal-end storage element E2 (refer to FIG. 15) is described, but the technology of the disclosure is not limited thereto. For example, the output layer 108C may have a plurality of output layer nodes 108C1 (for example, the same number of output layer nodes 108C1 as the input layer nodes 108A1). In this case, for example, a two-dimensional real-time playback signal in which the real-time playback signal is regarded as a two-dimensional image may be input to the plurality of input layer nodes 108A1, and the waveform equalized playback signal which is regarded as the two-dimensional image may be output from the plurality of output layer nodes 108C1 using a convolutional neural network having a convolutional layer and a pooling layer.

In the above first embodiment, the combination of the reading head condition, the magnetic tape condition, the running speed condition, and the A/D converter condition is exemplified as the reading environment condition, but the technology of the disclosure is not limited thereto. The reading environment condition may be at least one of the reading head condition, the magnetic tape condition, the running speed condition, or the A/D converter condition.

The reading environment condition is not limited to at least one of the reading head condition, the magnetic tape condition, the running speed condition, or the A/D converter condition, and other conditions may be applied instead of these conditions or together with at least one of the conditions. An example of the other conditions includes a condition caused by an individual difference (type) of the recording pattern determined according to the running speed and the bit interval. An example of the other conditions also includes a condition (hereinafter, referred to as "processing circuit condition") caused by an individual difference of at least one of a plurality of processing circuits (hereinafter, simply referred to as "processing circuit") that affect the waveform equalization such as the amplifier 52, the LPF 56, the phase synchronization circuit 58, and the decoder 62 included in the signal processing device 50. The processing circuit condition indicates the condition caused by the individual difference in the processing circuit. The individual difference in the processing circuit indicates, for example, a difference in the characteristics of each processing circuit. The difference in characteristics of each processing circuit is mainly caused by a manufacturing error of the processing circuit and/or deterioration of the processing circuit with time. Examples of an index that quantitatively indicates a degree of deterioration of the processing circuit with time include the number of times the processing circuit is used, an average time during which the processing circuit is continuously used, and a time to reach a specific time point (for example, the present time point) after the processing circuit is manufactured.

In the above first embodiment, the example in which the equalizer 60 operates the trained model 82 is described, but the technology of the disclosure is not limited thereto. The trained model 82 of the equalizer 60 may be finely adjusted by the CPU 70 of the equalizer 60. In this case, for example, the CPU 70 of the equalizer 60 may use the real-time playback signal as the test playback signal described above to execute the learning execution processing according to the learning execution program 106.

In the above first embodiment, the sigmoid function is exemplified as an example of the "activation function" according to the technology of the disclosure, but the technology of the disclosure is not limited thereto. Other activation functions such as hyperbolic tangent function, ramp function, and/or softmax function may be applied instead of or together with the sigmoid function.

In the above first embodiment, the trained model 82 is exemplified as the non-linear filter, but the technology of the disclosure is not limited thereto. For example, an IIR filter that has been learned to reduce the non-linear distortion described in the above first embodiment may be used.

Figure 24:
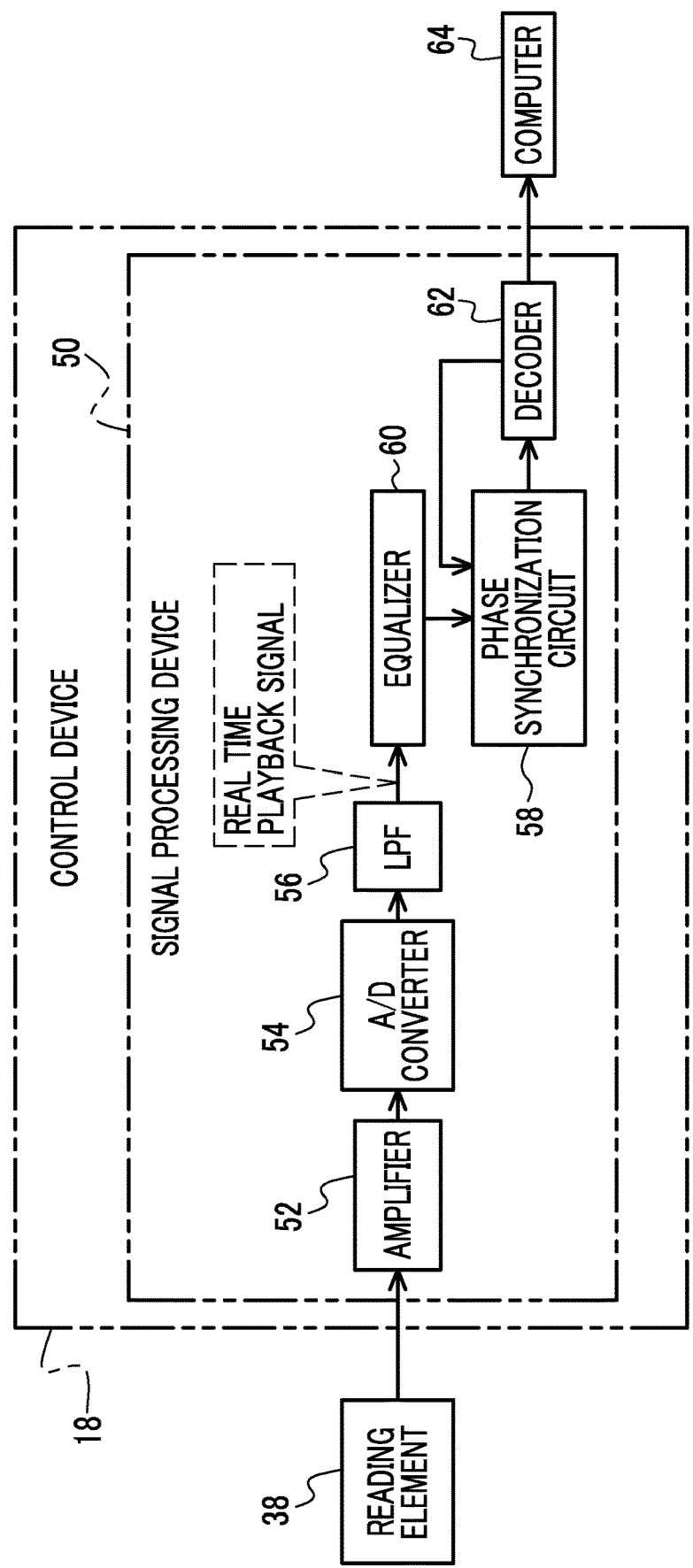
FIG. 24 is a block diagram showing a modification example of a configuration of the signal processing device according to the first embodiment.

In the above first embodiment, the example in which the real-time playback signal subjected to the phase synchronization processing is input from the phase synchronization circuit 58 to the equalizer 60 is described, but the technology of the disclosure is not limited thereto. For example, as shown in FIG. 24, the position of the phase synchronization circuit 58 and the position of the equalizer 60 may be interchanged. That is, the equalizer 60 may receive the real-time playback signal from the LPF 56 without through the phase synchronization circuit 58. The phase synchronization circuit 58 may receive the waveform equalized playback signal obtained by the equalizer 60 performing the waveform equalization of the real-time playback signal and may perform the phase synchronization processing on the waveform equalized playback signal based on the decoding result of the decoder 62.

In the above first embodiment, the example in which the plurality of storage elements 70A1 (refer to FIG. 15) are formed by the internal memory 71 (refer to FIG. 7) and the plurality of storage elements 92A1 (refer to FIG. 11) are realized by the internal memory 93 (refer to FIG. 8) is described, but the technology of the disclosure is not limited thereto. For example, instead of the operation phase delay storage unit 70A, a delay circuit formed by connecting the plurality of storage elements 70A1 in series may be used as a circuit separate from the CPU 70. For example, instead of the training phase delay storage unit 92A, a delay circuit formed by connecting the plurality of storage elements 92A1 in series may be used as a circuit separate from the CPU 92.

Second Embodiment

The reading head 16 is exemplified in the above first embodiment, however, in the present second embodiment an example will be described of a mode in which multichannel recording and reading (namely replay) is performed by a tape head (for example, a magnetic head 112 illustrated in FIG. 27). The same reference numerals are appended to configuration elements in the present second embodiment that are the same as configuration element described in the above first embodiment and explanation thereof will be omitted, such that parts different to those of the above first embodiment will be described.

Figure 27:
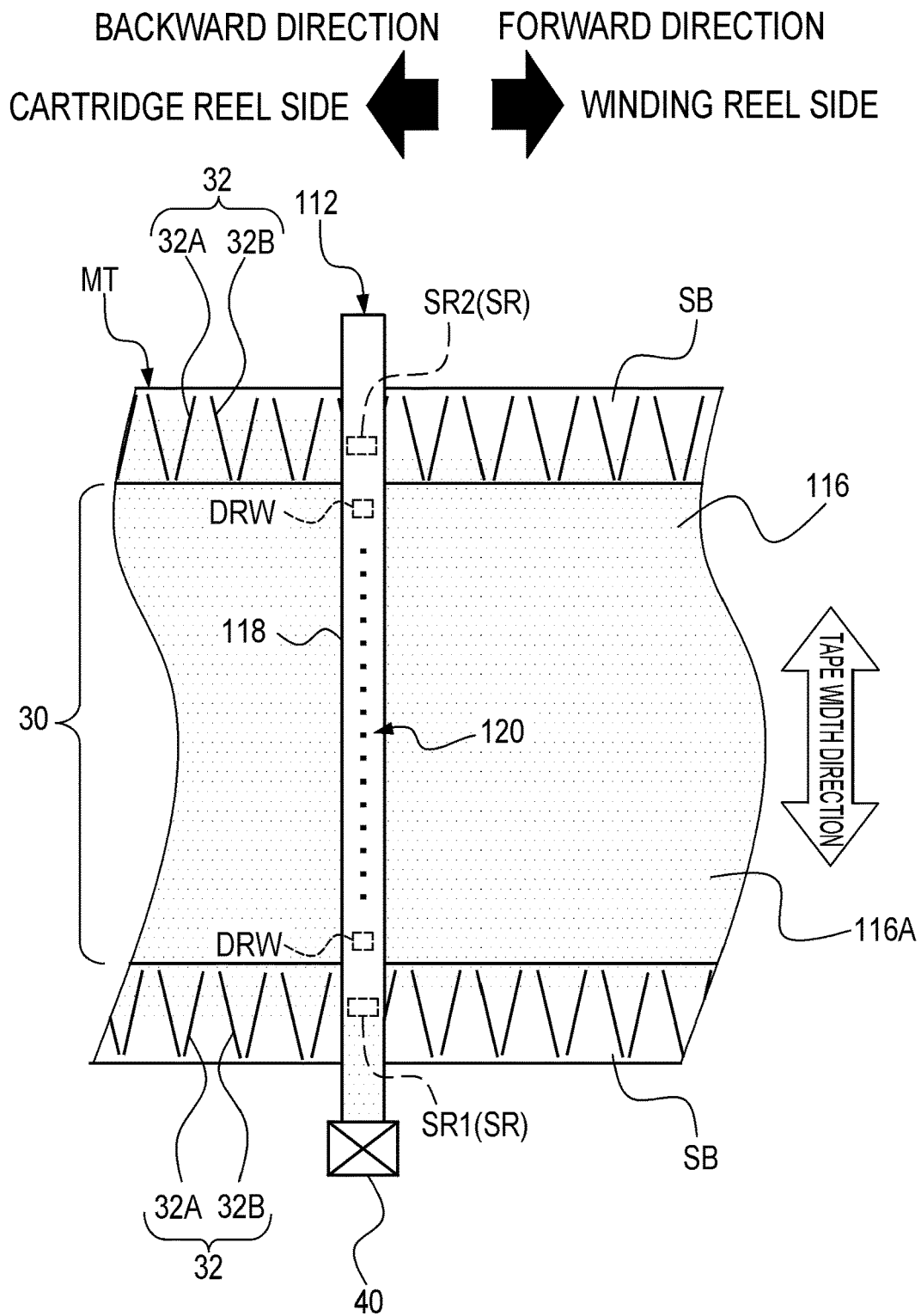
FIG. 27 is a conceptual diagram showing an example of a configuration of a magnetic head and a configuration of a specific region of a magnetic tape.
Figure 28:
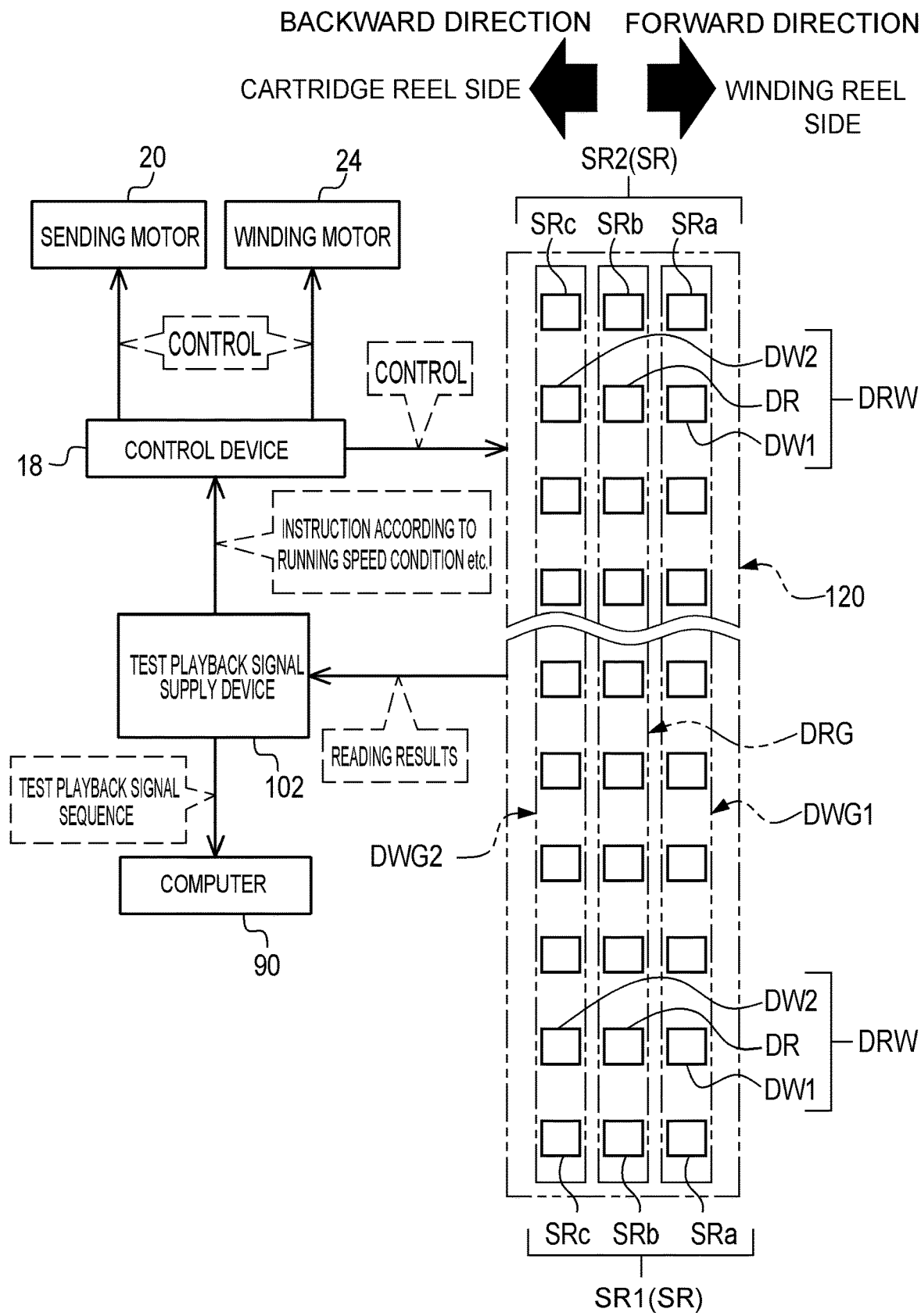
FIG. 28 is conceptual diagram showing an example of a configuration of a magnetic element unit and periphery of the magnetic element unit.

For example, there are 32 of the magnetic elements for use in recording and reading installed in the tape head (for example, the data magnetic elements DRW illustrated in FIG. 27 and FIG. 28). This accordingly enables recording and reading at a higher data transfer rate compared to a tape head installed with merely a few magnetic elements. However a significant problem is variation in performance between the magnetic elements. The main causes of such variation in performance between the magnetic elements are thought to include, for example, manufacturing tolerances during tape head manufacture, and variation in the degree of deterioration with time due to repeated use of the tape head.

Examples of the deterioration with time due to repeated use of the tape head include, for example, wear and scratches of the magnetic elements that occur due to abrasive particles contained in the magnetic tape MT, together with deterioration of the magnetic performance and the like from exposure to repeated physical impact with protruding particles on the magnetic tape MT.

Such deterioration is affected by cumulative incidental phenomenon occurring during use of the magnetic tape MT (for example, impact with foreign mater and/or projections present in an irregular manner in the magnetic tape MT). This leads, in particular, to significant variation arising in performance between the plurality of magnetic elements in a tape head that has deteriorated with the passage of time due to repeated use of the tape head. In a deteriorated magnetic element there is a reduction in the signal-to-noise ratio due to an increase in non-linearity of the playback signal. There is accordingly in particular a large difference in the signal-to-noise ratio between magnetic elements in a tape head that has deteriorated with the passage of time.

In order to make the magnetic tape drive 10 function appropriately as a storage system, there is a need to ensure a minimum level of signal-to-noise ratio permitted by the storage system in all recording magnetic elements and in all reading magnetic elements. To improve the reliability of a high capacity tape system it accordingly becomes important to achieve in particular an improvement in the quality of playback signal of magnetic elements that have significant deterioration and increased non-linearity (for example, non-linear playback signals not compatible with FIR filters that are effective for linear waveform equalization).

Figure 25:
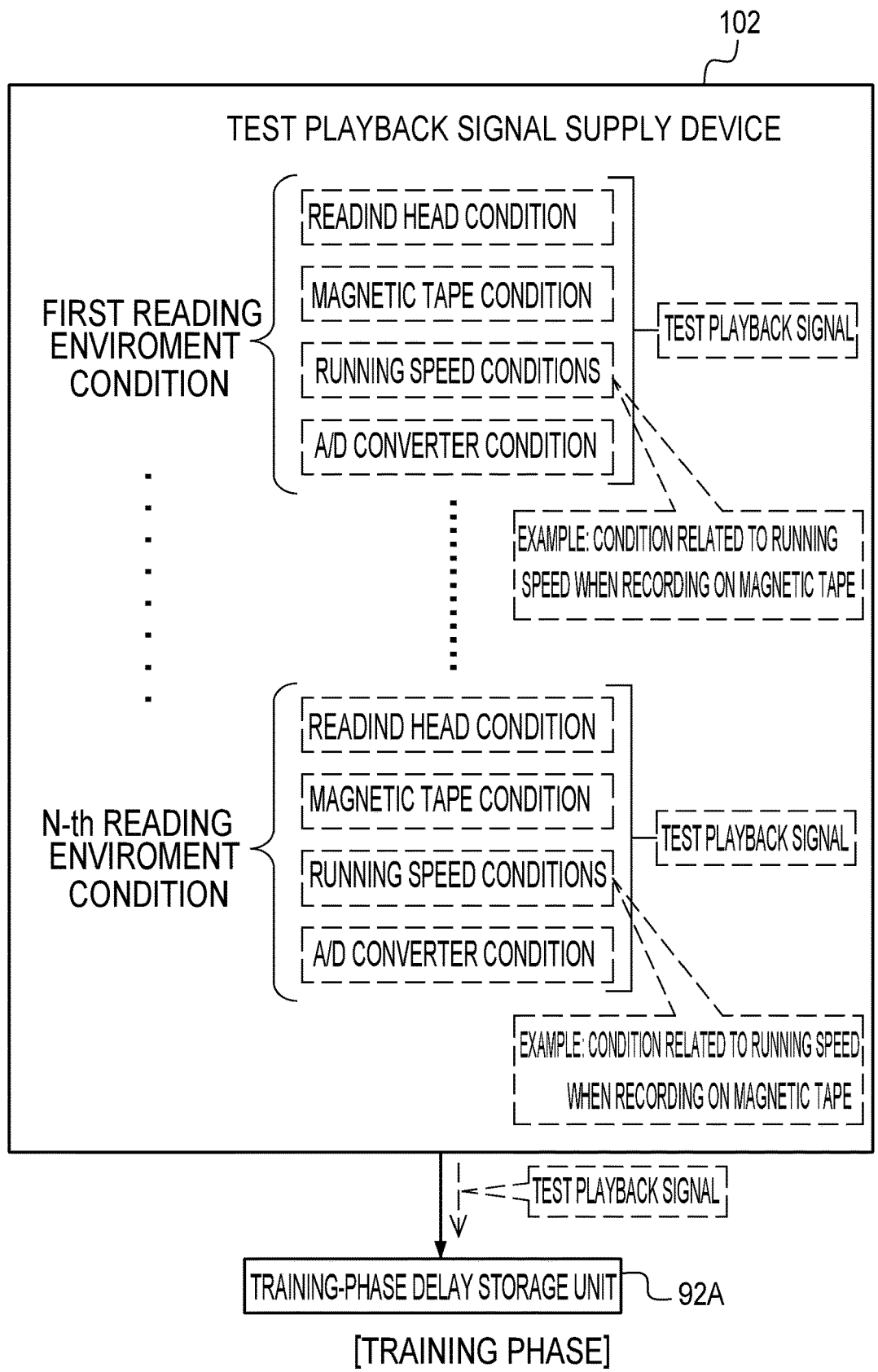
FIG. 25 is a conceptual diagram showing an example of a configuration of a test playback signal supply device according to a second embodiment.

Due to such deterioration in magnetic elements being a significant cause of an increase in the non-linearity of playback signals, even in cases in which multichannel recording and reading is performed, an effective approach is, for example as illustrated in FIG. 25 and similarly to in the above first embodiment, to employ a neural network 108 that is an example of a non-linear filter (see FIG. 9) to optimize an appropriate characteristic for each of the magnetic elements based on a test playback signal generated according to each of a first reading environment condition to an Nth reading environment condition. Such an approach enables a reduction in the variation in signal quality between the magnetic elements to be achieved.

Moreover, the degree of deterioration in the quality of the playback signals also varies according to a combination of the magnetic elements and medium. For example, in cases in which the magnetic element employed has a reduced recording performance due to repeated use of the tape head, the quality of playback signal does not change so much when employed with a medium (for example a magnetic tape) using magnetic particles having a small coercivity, but there is a significant deterioration of quality in the playback signal due to recording defects for a medium using magnetic particles having a high coercivity.

There is accordingly a need to optimize the above non-linear filter (for example the neural network 108) for each instance of playing back data with each different combination of tape head and medium. An effective method to achieve this is to secure a region on the magnetic tape MT (for example the specific region 116 illustrated in FIG. 26) for optimizing a non-linear filter as a separate region to the region used by a user for recording data. A known pattern (for example a specific pattern 116A illustrated in FIG. 26 and FIG. 27) that configures teaching data 110 (see FIG. 9) is then recorded in the region for non-linear filter optimization, and the non-linear filter is optimized for each instance based on a characteristic of the playback signal therefrom (for example, the test playback signal sequence illustrated in FIG. 28).

As a result, for example, it is possible to improve the quality of playback signal as compared with cases in which the non-linear filter optimized by the combination of a specific tape head and medium is also diverted to the combination of other tape heads and medium.

Moreover, due to there being multiple magnetic elements installed in the tape head as described above, recording and reading can be performed at a higher data transfer rate compared to a tape head installed with merely a few magnetic elements. The magnetic tape drive 10 needs to transport the magnetic tape MT at high speed in order to achieve this.

However, as illustrated in FIG. 6, in cases in which the magnetic tape MT is transported at high speed to record data on the magnetic tape MT, deviation occurs in the recording positions of bits due to a delay in the rise time of the recording magnetic field generated by the reading element 16A. The larger such deviation amount is, the larger the non-linearity in the playback signal. Thus in the present second embodiment the neural network 108 (see FIG. 9) which is the above non-linear filter is configured so as to be optimized according to the running speed of the magnetic tape MT. A specific example of a mode for such a case will now be described.

As illustrated as an example in FIG. 25, the present second embodiment is applied with, as an example of a running speed condition, a condition related to the running speed of the magnetic tape MT when recording data on the magnetic tape MT, namely for a case in which recording is being performed on the magnetic tape MT (namely, the speed the magnetic tape MT is running at). The condition related to the running speed may, for example, be the running speed itself, or may be a signal to control rotational driving of the sending motor 20 and the winding motor 24 (i.e. a signal to control the sending motor 20 and the winding motor 24 so as to realize the running speed). As an example of the running speed of the magnetic tape MT, the running speed may, for example, be a speed of from 2 m/s to 7 m/s. For example, respective running speed conditions included in the first reading environment condition to the Nth reading environment condition may be conditions related to running speeds that differ from each other.

Note that the first reading environment condition to the Nth reading environment condition may be changed according to a usage state and/or usage environment of the plurality of magnetic heads 112 and/or the plurality of the magnetic tape drives 10, may be changed with the passage of time, and may be changed according to instructions given by a user or the like. The first reading environment condition to the Nth reading environment condition may also, for example, be associated with each of the magnetic heads 112, with each of the magnetic element units 120 (see FIG. 27), or with each of the magnetic tape drives 10. The first reading environment condition to the Nth reading environment condition may, for example, be stored in a storage device of a host computer (not illustrated in the drawings) such as a mainframe or cloud server capable of communicating with at least one of the magnetic tape drives 10. In such a case, a test playback signal may be generated by the test playback signal supply device 102 according to an instruction received by the UI system device 26 (see FIG. 1) of the magnetic tape drive 10, an instruction directly or indirectly input to the test playback signal supply device 102, or an instruction directly or indirectly input to the host computer, and based on the reading environment condition corresponding to the magnetic head 112 or the magnetic tape drive 10 among a plurality of reading environment conditions stored in the storage device of the host computer. Alternatively, a test playback signal may be generated by the test playback signal supply device 102 based on a reading environment condition selected from among the plurality of reading environment conditions stored in the storage device of the host computer by selection according to an instruction received by the UI system device 26 (see FIG. 1) of the magnetic tape drive 10, an instruction directly or indirectly input to the test playback signal supply device 102, or an instruction directly or indirectly input to the host computer. Moreover, a reading environment condition acquired from the host computer may be written to a storage medium (for example, to a cartridge memory 122 (see FIG. 30) and/or to a BOT region 114 of the magnetic tape MT (see FIG. 26)), such that the test playback signal is generated by the test playback signal supply device 102 according to the reading environment condition stored to the storage medium.

Alternatively, a plurality of mutually different running speed conditions (for example a plurality of running speed conditions contained in the first reading environment condition to the Nth reading environment condition) may be changed according to a usage state of the plurality of magnetic heads 112 and/or the plurality of magnetic tape drives 10, may be changed with the passage of time, or may be changed according to an instruction input by a user or the like. Moreover, a plurality of running speed conditions may be respectively associated with each of the magnetic heads 112, with each of the magnetic element units 120 (see FIG. 27), or with each of the magnetic tape drives 10. The plurality of running speed conditions may also be stored on a storage device of the host computer (not illustrated in the drawings) such as a mainframe or cloud server capable of communicating with at least one of the magnetic tape drives 10. In such a case, a test playback signal may be generated by the test playback signal supply device 102 according to an instruction received by the UI system device 26 (see FIG. 1) of the magnetic tape drive 10, an instruction directly or indirectly input to the test playback signal supply device 102, or an instruction directly or indirectly input to the host computer, and based on the running speed condition corresponding to the magnetic head 112 or the magnetic tape drive 10 from among the plural running speed conditions stored in the storage device of the host computer. Alternatively, a test playback signal may be generated by the test playback signal supply device 102 based on a running speed condition selected from among the plurality of running speed condition stored in the storage device of the host computer by selection according to an instruction received by the UI system device 26 (see FIG. 1) of the magnetic tape drive 10, an instruction directly or indirectly input to the test playback signal supply device 102, or an instruction directly or indirectly input to the host computer. Moreover, a running speed condition acquired from the host computer may be written to a storage medium (for example, to the cartridge memory 122 (see FIG. 30) and/or to the BOT region 114 of the magnetic tape MT (see FIG. 26)), such that a test playback signal is generated by the test playback signal supply device 102 according to the reading environment condition stored in the storage medium.

Moreover, although the example illustrated in FIG. 25 includes a reading head condition, a magnetic tape condition, and an A/D converter condition, these conditions may or may not be included in the present second embodiment. In order to avoid confusion, explanation follows regarding a case in which the test playback signal is generated according to the running speed condition alone and not according to the reading head condition, the magnetic tape condition, and the A/D converter condition.

Figure 26:
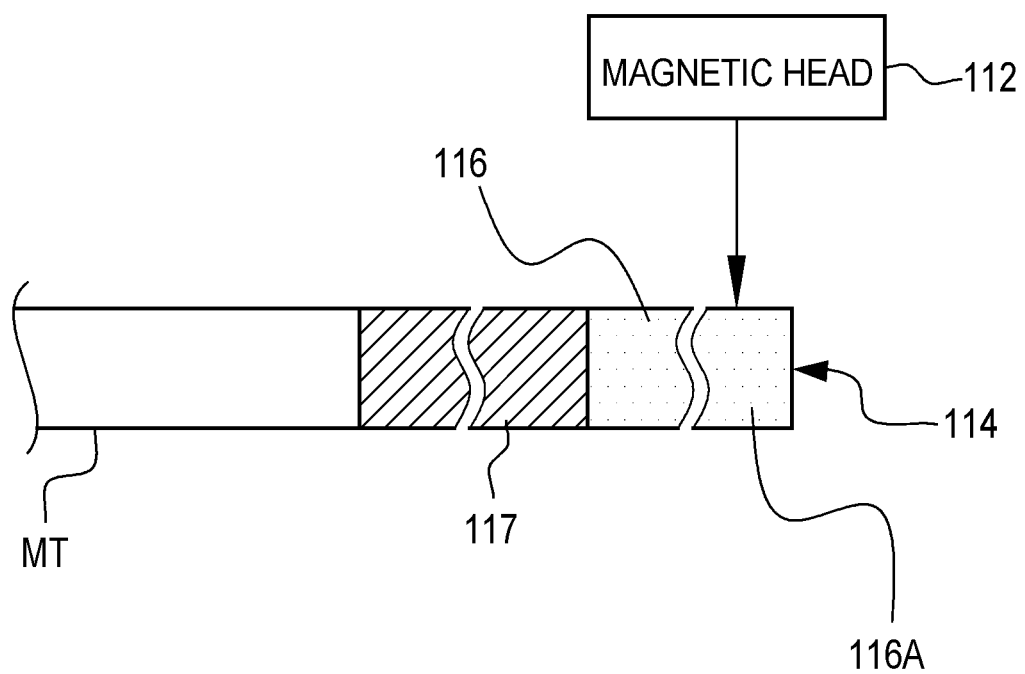
FIG. 26 is a conceptual diagram showing an example of a configuration of a BOT region of a magnetic tape.

As in the example illustrated in FIG. 26, the present second embodiment employs a magnetic head 112 instead of the reading head 16 described in the above first embodiment. The magnetic head 112 reads data from the magnetic tape MT. The magnetic tape MT includes a BOT region 114. The BOT region 114 is a data band provided at the head of the magnetic tape MT. The BOT region 114 includes a specific region 116 and a magnetic tape cartridge related information region 117. The specific region 116 and the magnetic tape cartridge related information region 117 are adjacent to each other, and are arranged from the head side of the magnetic tape MT in the order of the specific region 116 followed by the magnetic tape cartridge related information region 117.

A specific pattern 116A is recorded in the specific region 116 as data to be read by the magnetic head 112. The data recorded in the specific pattern 116A is an ideal playback signal sequence. The ideal playback signal sequence is, for example, employed as the teaching data 110 (see FIG. 9).

Information related to the magnetic tape cartridge 12 (such as, for example, information related to a type of the magnetic tape MT, a summary of information stored in a main part of the magnetic tape MT, and/or information related to a mechanism housed in the magnetic tape cartridge 12) is recorded in the magnetic tape cartridge related information region 117.

As illustrated in the example of FIG. 27, the magnetic head 112 includes a holder 118 and a magnetic element unit 120. The magnetic element unit 120 is supported by the holder 118 so as to contact the magnetic tape MT during running. The magnetic element unit 120 includes servo reading elements SR and a plurality of data magnetic elements DRW. In the example illustrated in FIG. 27 servo reading elements SR1 and SR2 serve as examples of the servo reading elements SR. In the following, for ease of explanation, the servo reading elements SR1 and SR2 are sometimes notated as servo reading elements SR in cases in which there is no particular need to discriminate therebetween.

The servo reading elements SR are each provided at a position corresponding to a servo band SB (see FIG. 2 and FIG. 27). In the example illustrated in FIG. 27 the servo reading element SR1 is arranged at a position facing toward a servo pattern 32 at one end of the magnetic tape MT in the tape width direction. The servo reading element SR2 is arranged at a position facing toward a servo pattern 32 at another end of the magnetic tape MT in the tape width direction. The servo reading element SR1 reads the servo pattern 32 at the width direction one end of the magnetic tape MT in the tape width direction while the magnetic tape MT is running in the forward direction or in the backward direction. The servo reading element SR2 reads the servo pattern 32 at the width direction other end of the magnetic tape MT in the tape width direction while the magnetic tape MT is running in the forward direction or in the backward direction. Note that the magnetic head 112 is moved in the tape width direction according to the servo patterns 32 read by the servo reading elements SR. As described in the above first embodiment, movement of the magnetic head 112 in the tape width direction is implemented by the movement mechanism 40 (see FIG. 3).

In a default state of the magnetic tape drive 10, the plurality of data magnetic elements DRW are arranged at positions facing toward the track region 30. The plurality of data magnetic elements DRW are arranged at prescribed positions over the track region 30 by the magnetic head 112 moving in the tape width direction according to the servo pattern 32, as described above.

The plurality of data magnetic elements DRW record data on the magnetic tape MT while the magnetic tape MT is running in the forward direction or the backward direction, and read data from the magnetic tape MT while the magnetic tape MT is running in the forward direction or the backward direction.

As illustrated in the example of FIG. 28, the magnetic element unit 120 includes a first data recording element group DWG1, a second data recording element group DWG2, and a data reading element group DRG. The servo reading element SR1 is positioned at one end of the magnetic element unit 120, and the servo reading element SR2 is positioned at the other end of the magnetic element unit 120.

The example illustrated in FIG. 28 is an example in which the servo reading elements SR and a plurality of data magnetic elements DRW serve as a plurality of the magnetic elements included in the magnetic element unit 120. The data magnetic elements DRW include first data recording elements DW1, second data recording elements DW2, and data reading elements DR.

There are a plurality of the first data recording elements DW1 included in the first data recording element group DWG1. There are a plurality of the second data recording elements included in the second data recording element group DWG2. There are a plurality of the data reading elements DR included in the data reading element group DRG.

Each of the first data recording elements DW1 and the second data recording elements DW2 records data in the track region 30 (see FIG. 27). The data reading elements DR read data from the track region 30 (see FIG. 27). Note that in the following the first data recording elements DW1 and the second data recording elements DW2 are referred to as data recording elements DW in cases in which there is no particular need to discriminate therebetween.

The first data recording element group DWG1, the second data recording element group DWG2, and the data reading element group DRG are arranged with a fixed spacing therebetween along the overall longitudinal direction of the magnetic tape MT from the winding reel 22 (see FIG. 1) side to the cartridge reel CR (see FIG. 1) side, in an order of the first data recording element group DWG1, then the data reading element group DRG, and then the second data recording element group DWG2. The fixed spacing referred to here indicates, for example, a spacing predetermined by actual testing and/or by computer simulation as a spacing such that crosstalk does not occur between the data reading elements DR and the data writing elements DW. In addition to the meaning of completely fixed, the meaning of "fixed" also includes the meaning of substantially fixed including an error permitted by the technical field of the present disclosure and falling within a range not departing from the spirit of the technology of the disclosure.

The servo reading elements SR include first servo reading elements SRa, second servo reading elements SRb, and third servo reading elements SRc. The first servo reading elements SRa, the second servo reading elements SRb, and the third servo reading elements SRc are provided along the overall longitudinal direction of the magnetic tape MT from the winding reel 22 side to the cartridge reel CR side, in an order of the first servo reading elements SRa, then the second servo reading elements SRb then the third servo reading elements SRc.

Note that although the example illustrated here includes the first servo reading elements SRa, the second servo reading elements SRb, and the third servo reading elements SRc, the technology of the disclosure is not limited thereto, and one or two servo reading elements may be provided from among the first servo reading elements SRa, the second servo reading elements SRb, or the third servo reading elements SRc.

The first data recording element group DWG1 includes the first servo reading element SRa of the servo reading element SR1, the first servo reading element SRa of the servo reading element SR2, and the plurality of first data recording elements DW1 (for example, 32 of the first data recording elements DW1). The plurality of first data recording elements DW1 are arranged in a straight line shape spanning from the side of the first servo reading element SRa of the servo reading element SR1 to the side of the first servo reading element SRa of the servo reading element SR2.

The second data recording element group DWG2 includes the third servo reading element SRc of the servo reading element SR1, the third servo reading element SRc of the servo reading element SR2, and the plurality of second data recording elements DW2 (for example, 32 of the second data recording elements DW2). The plurality of second data recording elements DW2 are arranged in a straight line shape spanning from the side of the third servo reading element SRc of the servo reading element SR1 to the side of the third servo reading element SRc of the servo reading element SR2.

The data reading element group DRG includes the second servo reading element SRb of the servo reading element SR1, the second servo reading element SRb of the servo reading element SR2, and the plurality of data reading elements DR (for example, 32 of the data reading elements DR). The plurality of data reading elements DR are arranged in a straight line shape spanning from the side of the second servo reading element SRb of the servo reading element SR1 to the side of the second servo reading element SRb of the servo reading element SR2.

In the magnetic element unit 120, the data reading elements DR are configured in a structure interposed in the overall longitudinal direction of the magnetic tape MT between the first data recording elements DW1 and the second data recording elements DW2, and so not only are data simply read from a single track region 30 (see FIG. 27) by the data reading elements DR, but verification is also implemented thereby. For example, in cases in which the magnetic tape MT is extracted from the magnetic tape drive 10 (cases in which the running direction of the magnetic tape MT is the forward direction), after each of the second data recording elements DW2 has recorded data in a data track (for example, the track region 30), the data recorded in the data tracks by the second data recording elements DW2 are read by the data reading elements DR for use in error checking. Moreover, in cases in which the magnetic tape MT is being returned to the magnetic tape drive 10 (cases in which the running direction of the magnetic tape MT is the backward direction), after the data has been recorded in the data tracks DT by the first data recording elements DW1, the data recorded in the track region 30 (see FIG. 27) by the first data writing elements DW1 are then read by the data reading elements DR for use in error checking.

In the present second embodiment, the running speed of the magnetic tape MT is adjusted by control of the rotational driving of the sending motor 20 and the winding motor 24 by the control device 18. In the example illustrated in FIG. 28, the control device 18 is connected to the test playback signal supply device 102, and the running speed of the magnetic tape MT is controlled according to instruction input from the test playback signal supply device 102.

For example, in cases in which the specific pattern 116A is recorded in the specific region 116, the test playback signal supply device 102 inputs the control device 18 with an instruction according to the reading environment condition, namely an instruction according to the running speed condition and the like, such that the running speed of the magnetic tape MT is controlled by the control device 18. The running speed condition employed here is a condition related to a predetermined speed (for example a prescribed speed of from 2 m/s to 7 m/s) as the running speed of the magnetic tape MT for cases in which recording is performed on the magnetic tape MT. The control device 18 controls the running speed of the magnetic tape MT according to the instruction input from the test playback signal supply device 102, such that the running speed of the magnetic tape MT becomes the prescribed speed for cases in which recording is performed on the magnetic tape MT.

In a state in which the magnetic tape MT is run in the forward direction according to the running speed condition and the like, the control device 18 causes the plurality of first data recording elements DW1 to record the specific pattern 116A in the specific region 116 by actuating the plurality of first data recording elements DW1 (for example, all of the first data recording elements DW1) included in the first data recording element group DWG1. The specific pattern 116A is recorded at each position of the specific region 116 corresponding to each of the respective plurality of data magnetic elements DRW. In parallel to the action of recording the specific pattern 116A in the specific region 116 by the plurality of first data recording elements DW1 included in the first data recording element group DWG1 arranged upstream of the data reading element group DRG in the forward direction, the control device 18 causes the plurality of data reading elements DR to read the specific pattern 116A from the specific region 116 by actuating the plurality of data reading elements DR included in the data reading element group DRG.

The magnetic element unit 120 is connected to the test playback signal supply device 102. The test playback signal supply device 102 acquires a plurality of reading results read from the specific pattern 116A by the plurality of data reading elements DR (namely, reading results read by each of the plurality of data reading elements DR). The reading results from the specific pattern 116A being read by the data reading elements DR are acquired by the test playback signal supply device 102 as a test playback signal sequence which is data in a time-series (namely, a time-series playback signal).

By acquiring the test playback signal sequence for each of the running speed conditions and supplying the acquired test playback signal sequence to the computer 90, the test playback signal supply device 102 learns the neural network 108 for each of the running speed conditions so as to generate a trained model 82 for each of the running speed conditions, similarly to in the above first embodiment. Namely, based on the plurality of reading results, the neural network 108 is optimized for a suitable characteristic for the plurality of data reading elements DR in the running speed condition.

Reference here to a suitable characteristic in the running speed condition indicates, for example, a characteristic to maximize the SNR of the waveform equalized playback signal sequence, or a characteristic to minimize a mean square error (MSE) of differences between the playback signal sequence after being waveform equalized and an ideal test playback signal sequence.

Although in the above example the specific pattern 116A is recorded in the specific region 116 by the plurality of first data recording elements DW1 in a state in which the magnetic tape MT is being run in the forward direction according to the running speed condition and the like, the technology of the disclosure is not limited thereto. For example, the specific pattern 116A may be recorded in the specific region 116 by the plurality of second data recording elements DW2 in a state in which the magnetic tape MT is being run in the backward direction according to the running speed condition and the like.

In such cases, in parallel to the action of recording the specific pattern 116A in the specific region 116 by the plurality of second data recording elements DW2 included in the second data recording element group DWG2 arranged upstream of the data reading element group DRG in the backward direction, the control device 18 causes the specific pattern 116A to be read from the specific region 116 by the plurality of data reading elements DR by actuating the plurality of data reading elements DR included in the data reading element group DRG.

Parameters (for example, the coupling weights and/or threshold included in the trained model 82) related to the trained model 82 obtained by optimizing the neural network 108 for the suitable characteristic for the plurality of data reading elements DR based on the plurality of reading results may recorded as parameters on the magnetic tape MT by the magnetic head 112. In such cases, for example as illustrated in FIG. 29, the magnetic head 112 records the parameters related to the trained model 82 in the magnetic tape cartridge related information region 117.

Figure 29:
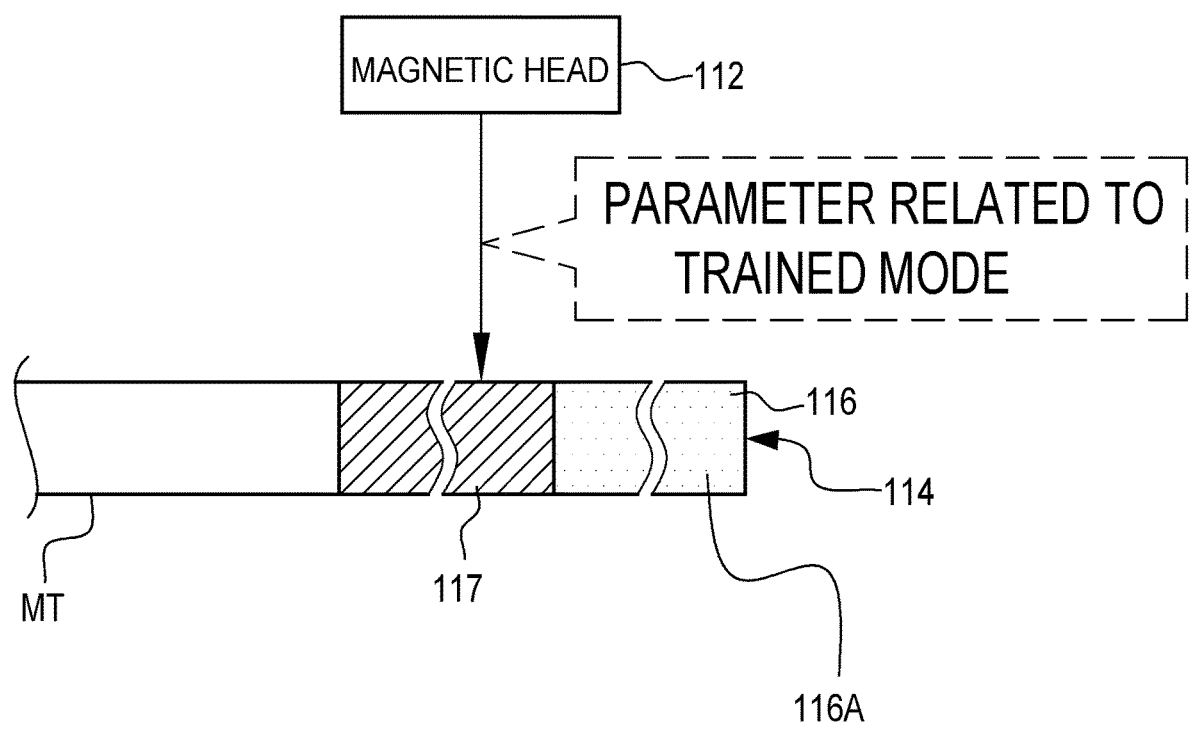
FIG. 29 a conceptual diagram showing an example of a mode for recording a parameter related to a trained model in a BOT region.

Note that although the example illustrated in FIG. 29 illustrates an example of a mode in which the parameters related to the trained model 82 are recorded in the magnetic tape cartridge related information region 117 of the BOT region 114, this is merely an example, and the parameters related to the trained model 82 may also be recorded in an EOT region (not illustrated in the drawings) provided at the end of the magnetic tape MT, either in addition to being recorded in the BOT region 114, or instead of being recorded in the BOT region 114.

Figure 30:
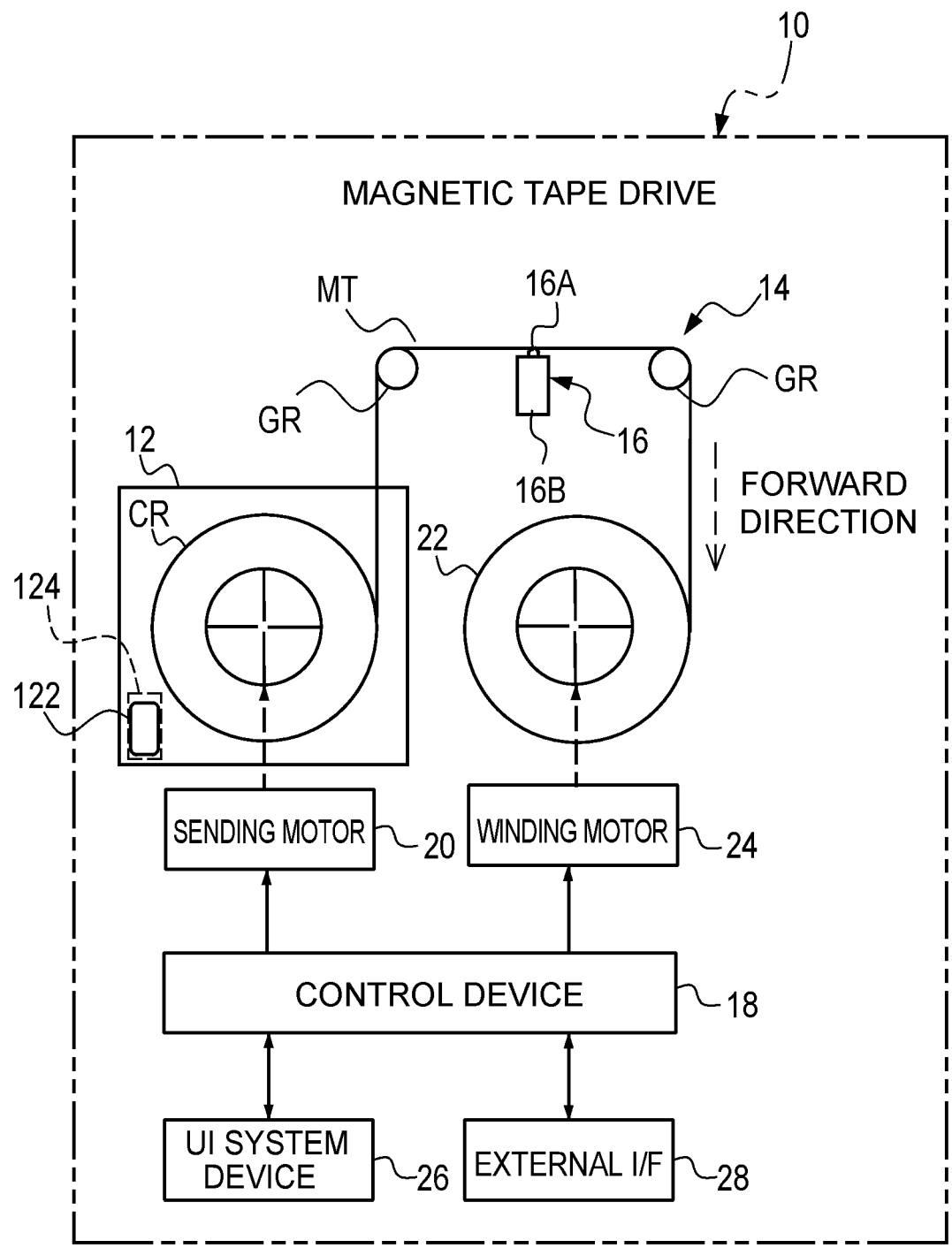
FIG. 30 is a schematic configuration diagram showing a modified example of a configuration of a magnetic tape drive.

Moreover, for example as illustrated in FIG. 30, in cases in which a cartridge memory 122 is installed to the magnetic tape cartridge 12 serving as a non-contact storage medium, the parameters related to the trained model 82 may be stored in the cartridge memory 122. Information related to the magnetic tape MT is generally stored in the cartridge memory 122. Information related to the magnetic tape MT indicates, for example, management information for managing the magnetic tape cartridge 12. Management information is, for example, information related to the cartridge memory 122, information enabling identification of the magnetic tape cartridge 12, a recording capacity of the magnetic tape MT, a summary of data recorded on the magnetic tape MT, and information indicating items in the data, recording format of the data, and the like.

The cartridge memory 122 performs non-contact communication with a non-contact reading device 124. Examples of the non-contact reading device 124 include a non-contact reading device employed in manufacturing processes of the magnetic tape cartridge 12, and a non-contact reading device employed in the magnetic tape drive 10.

As described above, the present second embodiment generates in advance the trained models 82 (see FIG. 13) respectively optimized under each of different running speed conditions of the magnetic tape MT (in this case a miming speed of, for example, from 2 m/s to 7 m/s). This enables a reduction to be made in the non-linearity of the playback signal in an entire speed range (for example, a speed range of from 2 m/s to 7 m/s) by employing the trained model 82 corresponding to the running speed of the magnetic tape MT. As a result, this enables a reduction to be achieved in the variation of quality of playback signal between the data magnetic elements DRW (namely, between the data reading elements DR).

Note that although the above second embodiment illustrates an example in which there is a first data recording element group DWG1, a second data recording element group DWG2, and a data reading element group DRG, technology of the disclosure is not limited thereto. For example when the specific pattern 116A is recorded and read only in the forward direction, the second data recording element group DWG2 is redundant from among the first data recording element group DWG1, the second data recording element group DWG2, and the data reading element group DRG. Moreover, for example when the specific pattern 116A is recorded and read only in the backward direction, the first data recording element group DWG1 is redundant from among the first data recording element group DWG1, the second data recording element group DWG2, and the data reading element group DRG.

Moreover, although in the above second embodiment an example has been described of a mode in which the first data recording element group DWG1, the second data recording element group DWG2, and the data reading element group DRG are integrated and installed together in the magnetic head 112, the technology of the disclosure is not limited thereto. The first data recording element group DWG1, the second data recording element group DWG2, and the data reading element group DRG may be each be installed in separate heads. In such cases too, the order in which the first data recording element group DWG1, the second data recording element group DWG2, and the data reading element group DRG are arranged along the running direction of the magnetic tape MT is the same as in the above second embodiment.

In each of the above embodiments, the example in which the waveform equalization execution program 80 is stored in the storage 74 is described, but the technology of the disclosure is not limited thereto. For example, the waveform equalization execution program 80 may be stored in a storage medium 200 as shown in FIG. 25. The storage medium 200 is a non-transitory storage medium (non-transitory computer-readable storage medium). An example of the storage medium 200 includes any portable storage medium such as an SSD or a USB memory.

The waveform equalization execution program 80 stored in the storage medium 200 is installed in the equalizer 60. The CPU 70 executes the waveform equalization execution processing according to the waveform equalization execution program 80. In the example shown in FIG. 25, the CPU 70 is a single CPU, but may be a plurality of CPUs.

The waveform equalization execution program 80 may be stored in a storage unit, such as another computer or a server device, connected to the magnetic tape drive 10 through a communication network (not shown), downloaded in response to a request from the magnetic tape drive 10, and installed in the equalizer 60.

All of the waveform equalization execution program 80 may not be stored in a storage unit such as another computer or a server device connected to the equalizer 60, or the storage 74. A part of the waveform equalization execution program 80 may be stored.

As the hardware resource for executing the waveform equalization execution processing described in the above embodiments, the following various processors can be used. An example of the processor includes a CPU which is a general-purpose processor functioning as the hardware resource for executing the waveform equalization execution processing by executing software, that is, a program. An example of the processor includes a dedicated electric circuit which is a processor having a circuit configuration designed to be dedicated to executing specific processing such as an FPGA, a PLD, or an ASIC. A memory is built in or connected to each processor, and each processor executes the waveform equalization execution processing by using the memory.

The hardware resource for executing the waveform equalization execution processing may be configured with one of the various processors or may be configured with a combination of two or more processors that are the same type or different types (for example, combination of a plurality of FPGAs or combination of CPU and FPGA). The hardware resource for executing the waveform equalization execution processing may be one processor.

As a configuring example of one processor, first, there is a form in which one processor is configured of a combination of one or more CPUs and software and the processor functions as the hardware resource for executing the waveform equalization execution processing. Secondly, as represented by an SoC, there is a form in which a processor that realizes functions of the entire system including the plurality of hardware resources for executing the waveform equalization execution processing with one IC chip is used. As described above, the waveform equalization execution processing is realized by using one or more of various processors as the hardware resource.

Further, as a hardware structure of the various processors, more specifically, an electric circuit obtained by combining circuit elements such as semiconductor elements can be used. The above waveform equalization execution processing is merely an example. Therefore, it is needless to say that removal of an unnecessary step, addition of a new step, and change of a processing procedure may be employed within a range not departing from the gist.

The contents described and the contents shown hereinabove are specific descriptions regarding the part according to the technology of the disclosure and are merely an example of the technology of the disclosure. For example, the descriptions regarding the configurations, the functions, the actions, and the effects are descriptions regarding an example of the configurations, the functions, the actions, and the effects of the part according to the technology of the disclosure. Accordingly, in the contents described and the contents shown hereinabove, it is needless to say that removal of an unnecessary part, or addition or replacement of a new element may be employed within a range not departing from the gist of the technology of the disclosure. In order to avoid complication and easily understand the part according to the technology of the disclosure, in the contents described and the contents shown hereinabove, the description regarding common general technical knowledge which is not necessarily particularly described for performing the technology of the disclosure is omitted.

In the specification, "A and/or B" is identical to "at least one of A or B". That is, "A and/or B" may be only A, only B, or a combination of A and B. In the specification, the same description regarding "A and/or B" is applied also in a case of expressing three or more items with the expression of "and/or".

In a case where all of documents, patent applications, and technical standard described in the specification are incorporated in the specification as references, to the same degree as a case where the incorporation of each of documents, patent applications, and technical standard as references is specifically and individually noted.

What is claimed is:

1. A signal processing device comprising:
   a receiver that receives a plurality of playback signal sequence obtained by digitizing a plurality of reading results by a plurality of A/D converters, the plurality of reading results being obtained by reading a specific pattern recorded as the data in a specific region of a magnetic tape by reading with a plurality of reading elements installed in a reading head from the magnetic tape on which the data is recorded; and a plurality of equalizers that perform waveform equalization of the plurality of playback signal sequence received by the receiver, wherein the plurality of equalizers perform the waveform equalization by using a plurality of non-linear filters that have been learned to reduce distortion that occurs non-linearly in the plurality of playback signal sequence according to a condition under an environment in which the data is read from the magnetic tape, and the plurality of non-linear filters are optimized to a suitable characteristic for the plurality of reading elements, based on the plurality of reading results;

wherein the condition includes a condition caused by an individual difference in the reading head.

2. The signal processing device according to claim 1, wherein the specific pattern is read by the plurality of data reading elements in parallel to an action of the specific pattern being recorded in the specific region by a plurality of recording elements arranged upstream of the plurality of reading elements in a forward direction of the magnetic tape.

3. The signal processing device according to claim 1, wherein the condition includes a condition caused by an individual difference in the magnetic tape.

4. The signal processing device according to claim 1, wherein the condition includes a speed condition regarding a speed at which the magnetic tape runs.

5. The signal processing device according to claim 4, wherein the speed condition includes a condition regarding a running speed of the magnetic tape for a case in which recording is performed on the magnetic tape.

6. The signal processing device according to claim 1, wherein the condition includes a condition caused by an individual difference in a processing circuit that affects the waveform equalization.

7. The signal processing device according to claim 1, wherein the non-linear filter is a filter having a neural network on which the learning has been performed.

8. The signal processing device according to claim 7, further comprising:

a plurality of storage elements that are each respectively provided to each of the reading elements and in which the playback signal sequence is stored in time-series, wherein the neural network has a front-stage layer having a plurality of front-stage layer nodes corresponding to the plurality of storage elements and a back-stage layer, each of the plurality of storage elements outputs the input playback signal sequence to a corresponding front-stage layer node among the plurality of front-stage layer nodes, each of the plurality of front-stage layer nodes outputs the playback signal sequence input from a corresponding storage element among the plurality of storage elements to the back-stage layer, the back-stage layer converts a composite value obtained based on a product sum of the playback signal sequence input from the plurality of front-stage layer nodes and a back-stage layer coupling weight by an activation function, and outputs a back-stage layer value based on the converted value obtained by converting the composite value with the activation function, and the back-stage layer coupling weights are determined by learning performed on the neural network to minimize a deviation amount between the back-stage layer value and a predetermined target value as the learning.

9. The signal processing device according to claim 8, wherein the neural network has an input layer as the front-stage layer and has a middle layer and an output layer as the back-stage layer, the plurality of front-stage layer nodes are a plurality of input layer nodes, the middle layer has a plurality of middle layer nodes, each of the plurality of input layer nodes outputs the playback signal sequence input from a corresponding storage element among the plurality of storage elements to the middle layer, the plurality of middle layer nodes convert an middle layer value obtained as the composite value based on a product sum of the playback signal sequence input from the plurality of input layer nodes and an middle layer coupling weight by the activation function to generate the converted value and output the converted value to the output layer, the output layer outputs an output layer value obtained as the back-stage layer value based on a product sum of the converted value input from the middle layer and an output layer coupling weight, and the middle layer coupling weight and the output layer coupling weight are determined by learning performed on the neural network to minimize a deviation amount between the output layer value and a predetermined target value as the learning.

10. The signal processing device according to claim 9, wherein the middle layer value is a value based on the product sum of the playback signal sequence and the middle layer coupling weight and a first variable, and the first variable is determined by the learning performed on the neural network.

11. The signal processing device according to claim 8, wherein the neural network consists of two layers, the front-stage layer and the back-stage layer.

12. The signal processing device according to claim 8, wherein the back-stage layer value is a value based on a product sum of the converted value and the back-stage layer coupling weight and a second variable, and the second variable is determined by the learning performed on the neural network.

13. The signal processing device according to claim 8, wherein the plurality of storage elements are a plurality of delay elements in which the playback signal sequence is input with a delay of a predetermined time, and the back-stage layer value is a value regarding the playback signal sequence input first among the plurality of playback signal sequence stored in the plurality of delay elements.

14. The signal processing device according to claim 8, wherein the target value is teaching data set in advance based on at least one of an ideal playback signal sequence regarding known data recorded on a learning magnetic tape in a recording pattern set in advance along a longitudinal direction of the learning magnetic tape or an ideal playback signal sequence derived by computer simulation.

15. A magnetic tape cartridge comprising:
a magnetic tape,
wherein the magnetic tape is recorded with a parameter related to the plurality of non-linear filters employed by the signal processing device of claim 1.

16. A magnetic tape cartridge comprising:
a non-contact storage medium,
wherein the non-contact storage medium is stored with a parameter related to the plurality of non-linear filters employed by the signal processing device of claim 1.

17. A magnetic tape reading apparatus comprising:
a reading head installed with a plurality of reading elements that read data from a magnetic tape on which the data is recorded;
a receiver that receives a plurality of playback signal sequence obtained by digitizing a plurality of reading results with a plurality of A/D converters, the plurality of reading results being obtained by reading a specific pattern recorded as the data in a specific region of the magnetic tape by reading with the plurality of reading elements; and
a plurality of equalizers that perform waveform equalization of the plurality of playback signal sequence received by the receiver,
wherein
the plurality of equalizers perform the waveform equalization by using a plurality of non-linear filters that have been learned to reduce distortion that occurs non-linearly in the plurality of playback signal sequence according to a condition under an environment in which the data is read from the magnetic tape, and
the plurality of non-linear filters is optimized to a suitable characteristic for the plurality of reading elements, based on the plurality of reading results;
wherein the condition includes a condition caused by an individual difference in the reading head.

18. The magnetic tape reading apparatus according to claim 17,
wherein the specific pattern is read by the plurality of data reading elements in parallel to an action of the specific pattern being recorded in the specific region by a plurality of recording elements arranged upstream of the plurality of reading elements in a forward direction of the magnetic tape.

19. The magnetic tape reading apparatus according to claim 17,
wherein the condition includes a condition caused by an individual difference in the magnetic tape.

20. The magnetic tape reading apparatus according to claim 17,
wherein the condition includes a speed condition regarding a speed at which the magnetic tape runs.

21. The magnetic tape reading apparatus according to claim 20,
wherein the speed condition includes a condition regarding a running speed of the magnetic tape for a case in which recording is performed on the magnetic tape.

22. The magnetic tape reading apparatus according to claim 17,
wherein the condition includes a condition caused by an individual difference in a processing circuit that affects the waveform equalization.

23. The magnetic tape reading apparatus according to claim 17,
wherein the non-linear filter is a filter having a neural network on which the learning has been performed.

24. The magnetic tape reading apparatus according to claim 23, further comprising:
a plurality of storage elements that are respectively provided to each of the reading elements and in which the respective playback signal sequence are stored in time-series,
wherein the neural network has a front-stage layer having a plurality of front-stage layer nodes corresponding to the plurality of storage elements and a back-stage layer,
each of the plurality of storage elements outputs the input playback signal sequence to a corresponding front-stage layer node among the plurality of front-stage layer nodes,
each of the plurality of front-stage layer nodes outputs the playback signal sequence input from a corresponding storage element among the plurality of storage elements to the back-stage layer,
the back-stage layer
converts a composite value obtained based on a product sum of the playback signal sequence input from the plurality of front-stage layer nodes and a back-stage layer coupling weight by an activation function, and
outputs a back-stage layer value based on the converted value obtained by converting the composite value with the activation function, and
the back-stage layer coupling weight is determined by learning performed on the neural network to minimize a deviation amount between the back-stage layer value and a predetermined target value as the learning.

25. The magnetic tape reading apparatus according to claim 24,
wherein the neural network has an input layer as the front-stage layer and has a middle layer and an output layer as the back-stage layer,
the plurality of front-stage layer nodes are a plurality of input layer nodes,
the middle layer has a plurality of middle layer nodes,
each of the plurality of input layer nodes outputs the playback signal sequence input from a corresponding storage element among the plurality of storage elements to the middle layer,
the plurality of middle layer nodes convert an middle layer value obtained as the composite value based on a product sum of the playback signal sequence input from the plurality of input layer nodes and an middle layer coupling weight by the activation function to generate the converted value and output the converted value to the output layer,
the output layer outputs an output layer value obtained as the back-stage layer value based on a product sum of the converted value input from the middle layer and an output layer coupling weight, and
the middle layer coupling weight and the output layer coupling weight are determined by learning performed on the neural network to minimize a deviation amount between the output layer value and a predetermined target value as the learning.

26. The magnetic tape reading apparatus according to claim 25,
wherein the middle layer value is a value based on the product sum of the playback signal sequence and the middle layer coupling weight and a first variable, and
the first variable is determined by the learning performed on the neural network.

27. The magnetic tape reading apparatus according to claim 24,
wherein the neural network consists of two layers, the front-stage layer and the back-stage layer.

28. The magnetic tape reading apparatus according to claim 24,
wherein the back-stage layer value is a value based on a product sum of the converted value and the back-stage layer coupling weight and a second variable, and
the second variable is determined by the learning performed on the neural network.

29. The magnetic tape reading apparatus according to claim 24,
wherein the plurality of storage elements are a plurality of delay elements in which the playback signal sequence is input with a delay of a predetermined time, and
the back-stage layer value is a value regarding the playback signal sequence input first among the plurality of playback signal sequence stored in the plurality of delay elements.

30. The magnetic tape reading apparatus according to claim 24,
wherein the target value is teaching data set in advance based on at least one of an ideal playback signal sequence regarding known data recorded on a learning magnetic tape in a recording pattern set in advance along a longitudinal direction of the learning magnetic tape or an ideal playback signal sequence derived by computer simulation.

31. A processing method of a signal processing device including a receiver that receives a plurality of playback signal sequence obtained by digitizing a plurality of reading results with a plurality of A/D converters, the plurality of reading results being obtained by reading a specific pattern recorded as the data in a specific region of a magnetic tape by reading with a plurality of reading elements installed in a reading head from the magnetic tape on which the data is recorded and a plurality of equalizers that perform waveform equalization of the plurality of playback signal sequence received by the receiver, the method comprising:
performing the waveform equalization by using a plurality of non-linear filters that have been learned to reduce distortion that occurs non-linearly in the plurality of playback signal sequence according to a condition under an environment in which the data is read out from the magnetic tape, by the plurality of equalizers, and
optimizing the plurality of non-linear filters to a suitable characteristic for the plurality of reading elements, based on the plurality of reading results;
wherein the condition includes a condition caused by an individual difference in the reading head.

32. An operation method of a magnetic tape reading apparatus including a reading head installed with a plurality of reading elements that read data from a magnetic tape on which the data is recorded, a receiver that receives a plurality of playback signal sequence obtained by digitizing a plurality of reading results with a plurality of A/D converters, the plurality of reading results being obtained by reading a specific pattern recorded as the data in a specific region of the magnetic tape by reading with the plurality of reading elements, and a plurality of equalizers that perform waveform equalization of the plurality of playback signal sequence received by the receiver, the method comprising:
performing the waveform equalization by using a plurality of non-linear filters that have been learned to reduce distortion that occurs non-linearly in the plurality of playback signal sequence according to a condition under an environment in which the data is read out from the magnetic tape, by equalization with the plurality of equalizers, and
optimizing the plurality of non-linear filters to a suitable characteristic for the plurality of reading elements, based on the plurality of reading results;
wherein the condition includes a condition caused by an individual difference in the reading head.

33. A non-transitory computer-readable storage medium stored with program causing a computer applied to a signal processing device to execute processing, the signal processing device including a receiver that receives a plurality of playback signal sequence obtained by digitizing a plurality of reading result with a plurality of A/D converters, the plurality of reading results being obtained by reading a specific pattern recorded as the data in a specific region of a magnetic tape by reading by a plurality of reading elements installed to a reading head from the magnetic tape on which the data is recorded and a plurality of equalizers that perform waveform equalization of the plurality of playback signal sequence received by the receiver, the processing including:
performing the waveform equalization by using a plurality of non-linear filters that have been learned to reduce distortion that occurs non-linearly in the plurality of playback signal sequence according to a condition under an environment in which the data is read out from the magnetic tape, and
optimizing the plurality of non-linear filters to a suitable characteristic for the plurality of reading elements, based on the plurality of reading results;
wherein the condition includes a condition caused by an individual difference in the reading head.

34. A non-transitory computer-readable storage medium stored with program causing a computer applied to a magnetic tape reading apparatus to execute processing, the magnetic tape reading apparatus including a reading head installed with a plurality of reading elements that read data from a magnetic tape on which the data is recorded, a receiver that receives a plurality of playback signal sequence obtained by digitizing a plurality of reading result with a plurality of A/D converters, the plurality of reading results being obtained by reading a specific pattern recorded as the data in a specific region of the magnetic tape by reading the plurality of reading elements, and a plurality of equalizers that performs waveform equalization of the plurality of playback signal sequence received by the receiver, the processing including:
performing the waveform equalization by using a plurality of non-linear filters that have been learned to reduce distortion that occurs non-linearly in the plurality of playback signal sequence according to a condition under an environment in which the data is read out from the magnetic tape, and
optimizing the plurality of non-linear filters to a suitable characteristic for the plurality of reading elements, based on the plurality of reading results;
wherein the condition includes a condition caused by an individual difference in the reading head.

\* \* \* \* \*